United States Patent
Sengoku et al.

(10) Patent No.: US 8,565,542 B2
(45) Date of Patent: Oct. 22, 2013

(54) DATA PROCESSING APPARATUS AND DATA PROCESSING METHOD

(75) Inventors: Tomoyuki Sengoku, Tokyo (JP); Akira Ueno, Tokyo (JP); Masami Shimamura, Hanno (JP); Yoshinobu Tanaka, Tokyo (JP); Takashi Yanada, Tokyo (JP); Ryusuke Tsuchida, Tokyo (JP)

(73) Assignee: Olympus Corporation, Tokyo (JP)

( * ) Notice: Subject to any disclaimer, the term of this patent is extended or adjusted under 35 U.S.C. 154(b) by 14 days.

(21) Appl. No.: 13/428,562

(22) Filed: Mar. 23, 2012

(65) Prior Publication Data

US 2012/0308149 A1    Dec. 6, 2012

(30) Foreign Application Priority Data

Mar. 24, 2011    (JP) .............................. P2011-066057

(51) Int. Cl.
*G06K 9/36*    (2006.01)

(52) U.S. Cl.
USPC .......................................... 382/232

(58) Field of Classification Search
USPC ................................. 382/232–253
See application file for complete search history.

(56) References Cited

U.S. PATENT DOCUMENTS

| | | | | |
|---|---|---|---|---|
| 4,797,945 A | * | 1/1989 | Suzuki et al. | 382/253 |
| 4,823,129 A | * | 4/1989 | Nelson | 341/139 |
| 5,054,103 A | * | 10/1991 | Yasuda et al. | 382/250 |
| 5,216,694 A | * | 6/1993 | Wei | 375/286 |
| 5,502,495 A | * | 3/1996 | Bannai et al. | 358/447 |
| 5,768,438 A | * | 6/1998 | Etoh | 382/251 |
| 5,894,546 A | * | 4/1999 | Yoshida | 358/1.18 |
| 6,282,244 B1 | * | 8/2001 | Hu | 375/240.2 |

FOREIGN PATENT DOCUMENTS

| | | |
|---|---|---|
| JP | 10-314681 A | 12/1998 |
| JP | 2000-148605 A | 5/2000 |
| JP | 2007-312358 A | 11/2007 |

* cited by examiner

*Primary Examiner* — Alex Liew
(74) *Attorney, Agent, or Firm* — Westerman, Hattori, Daniels & Adrian, LLP

(57) ABSTRACT

A data processing apparatus includes a data conversion unit for converting a plurality of sequentially input data into transfer data and sequentially transferring the transfer data, arranging the input data in each conversion unit using one transfer data as one transfer unit and a prescribed number of transfer units as one conversion unit, and the data conversion unit includes a first bit division unit for dividing the input data into first and second divided data, a bit comparison unit for comparing first divided data of an n-th time (n is a natural number equal to or more than 1) and an (n+1)-th time, a bit determination unit for determining whether the first divided data is to be inverted based on the determination result to output inversion information, a first bit inversion unit for outputting data selected based on the inversion information, and a first bit coupling unit.

18 Claims, 26 Drawing Sheets

FIG. 4A
INPUT DATA DIN

| DECIMAL | BINARY CODE | | | | | | | | BIT CHANGE NUMBER (3:0) | |
|---|---|---|---|---|---|---|---|---|---|---|
| | (7) | (6) | (5) | (4) | (3) | (2) | (1) | (0) | | |
| 192 | 1 | 1 | 0 | 0 | 0 | 0 | 0 | 0 | — | |
| 199 | 1 | 1 | 0 | 0 | 0 | 1 | 1 | 1 | 3 BIT | |
| 197 | 1 | 1 | 0 | 0 | 0 | 1 | 0 | 1 | 3 BIT | |
| 188 | 1 | 0 | 1 | 1 | 1 | 1 | 0 | 0 | 2 BIT | A |
| 194 | 1 | 1 | 0 | 0 | 0 | 0 | 1 | 0 | 3 BIT | |
| 205 | 1 | 1 | 0 | 0 | 1 | 1 | 0 | 1 | 0 BIT | |
| 209 | 1 | 1 | 0 | 1 | 0 | 0 | 0 | 1 | 2 BIT | |
| 208 | 1 | 1 | 0 | 1 | 0 | 0 | 0 | 0 | 1 BIT | |
| 207 | 1 | 1 | 0 | 0 | 1 | 1 | 1 | 1 | 4 BIT | |
| 211 | 1 | 1 | 0 | 1 | 0 | 0 | 1 | 1 | 2 BIT | |
| 215 | 1 | 1 | 0 | 1 | 0 | 1 | 1 | 1 | 1 BIT | |
| 222 | 1 | 1 | 0 | 1 | 1 | 1 | 1 | 0 | 2 BIT | |
| 231 | 1 | 1 | 1 | 0 | 0 | 1 | 1 | 1 | 2 BIT | |

FIG. 4B
OUTPUT DATA DOUT

| BINARY CODE | | | | | | | | INVERSION BIT | BIT CHANGE NUMBER | |
|---|---|---|---|---|---|---|---|---|---|---|
| (7) | (6) | (5) | (4) | (3) | (2) | (1) | (0) | | | |
| 1 | 1 | 0 | 0 | 0 | 0 | 0 | 0 | 0 | — | |
| 1 | 1 | 0 | 0 | 0 | 0 | 0 | 0 | 1 | 1 BIT | |
| 1 | 1 | 0 | 0 | 1 | 0 | 1 | 0 | 1 | 1 BIT | |
| 1 | 0 | 1 | 1 | 1 | 1 | 0 | 0 | 0 | 5 BIT | B |
| 1 | 1 | 0 | 0 | 1 | 1 | 0 | 1 | 1 | 4 BIT | |
| 1 | 1 | 0 | 0 | 1 | 1 | 0 | 1 | 0 | 0 BIT | |
| 1 | 1 | 0 | 1 | 0 | 0 | 0 | 1 | 0 | 3 BIT | |
| 1 | 1 | 0 | 1 | 0 | 0 | 0 | 0 | 0 | 1 BIT | |
| 1 | 1 | 0 | 0 | 0 | 0 | 0 | 0 | 1 | 1 BIT | |
| 1 | 1 | 0 | 1 | 0 | 0 | 1 | 1 | 0 | 3 BIT | |
| 1 | 1 | 0 | 1 | 0 | 1 | 1 | 1 | 0 | 1 BIT | |
| 1 | 1 | 0 | 1 | 1 | 1 | 1 | 0 | 0 | 2 BIT | |
| 1 | 1 | 1 | 0 | 0 | 1 | 1 | 1 | 0 | 4 BIT | |

BIT CHANGE NUMBER (SUM)

| 26 BIT |
|---|

FIG. 5A

OUTPUT DATA DOUT

| BINARY CODE | | | | | | | | INVERSION BIT | BIT CHANGE NUMBER | |
|---|---|---|---|---|---|---|---|---|---|---|
| (7) | (6) | (5) | (4) | (3) | (2) | (1) | (0) | | | |
| 1 | 1 | 0 | 0 | 0 | 0 | 0 | 0 | 0 | – | |
| 1 | 1 | 0 | 0 | 1 | 0 | 0 | 0 | 1 | 2 BIT | |
| 1 | 1 | 0 | 0 | 1 | 0 | 1 | 0 | 1 | 1 BIT | |
| 1 | 0 | 1 | 1 | 1 | 1 | 0 | 0 | 0 | 6 BIT | ⎫ C |
| 1 | 1 | 0 | 0 | 1 | 1 | 0 | 1 | 1 | 5 BIT | |
| 1 | 1 | 0 | 0 | 1 | 1 | 0 | 0 | 0 | 1 BIT | |
| 1 | 1 | 0 | 1 | 0 | 0 | 0 | 1 | 0 | 3 BIT | |
| 1 | 1 | 0 | 1 | 0 | 0 | 0 | 0 | 0 | 1 BIT | |
| 1 | 1 | 0 | 0 | 0 | 0 | 0 | 0 | 1 | 2 BIT | |
| 1 | 1 | 0 | 0 | 0 | 1 | 1 | 1 | 0 | 4 BIT | |
| 1 | 1 | 0 | 1 | 0 | 1 | 1 | 1 | 0 | 1 BIT | |
| 1 | 1 | 0 | 1 | 1 | 1 | 1 | 0 | 0 | 2 BIT | |
| 1 | 1 | 1 | 0 | 0 | 1 | 1 | 1 | 0 | 4 BIT | |

BIT CHANGE NUMBER (SUM)

32 BIT

FIG. 5B

OUTPUT DATA DOUT

| BINARY CODE | | | | | | | | INVERSION BIT | BIT CHANGE NUMBER | |
|---|---|---|---|---|---|---|---|---|---|---|
| (7) | (6) | (5) | (4) | (3) | (2) | (1) | (0) | | | |
| 1 | 1 | 0 | 0 | 0 | 0 | 0 | 0 | 0 | – | |
| 1 | 1 | 0 | 0 | 1 | 0 | 0 | 0 | 1 | 2 BIT | |
| 1 | 1 | 0 | 0 | 1 | 0 | 1 | 0 | 1 | 1 BIT | |
| 1 | 0 | 1 | 1 | 0 | 0 | 1 | 1 | 1 | 5 BIT | ⎫ D |
| 1 | 1 | 0 | 0 | 0 | 0 | 1 | 0 | 0 | 3 BIT | |
| 1 | 1 | 0 | 0 | 0 | 0 | 0 | 1 | 1 | 1 BIT | |
| 1 | 1 | 0 | 1 | 0 | 0 | 0 | 1 | 0 | 4 BIT | |
| 1 | 1 | 0 | 1 | 0 | 0 | 0 | 0 | 0 | 1 BIT | |
| 1 | 1 | 0 | 0 | 0 | 0 | 0 | 0 | 1 | 1 BIT | |
| 1 | 1 | 0 | 1 | 1 | 1 | 0 | 0 | 1 | 3 BIT | |
| 1 | 1 | 0 | 1 | 1 | 0 | 0 | 0 | 1 | 1 BIT | |
| 1 | 1 | 0 | 1 | 0 | 0 | 0 | 1 | 1 | 2 BIT | |
| 1 | 1 | 1 | 0 | 1 | 0 | 0 | 0 | 1 | 4 BIT | |

BIT CHANGE NUMBER (SUM)

28 BIT

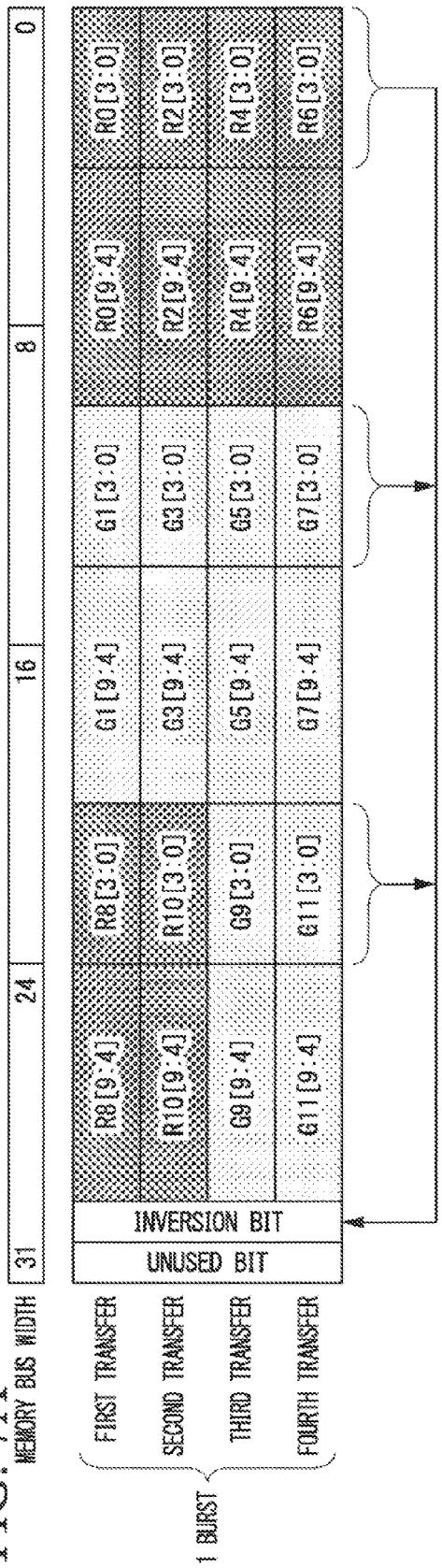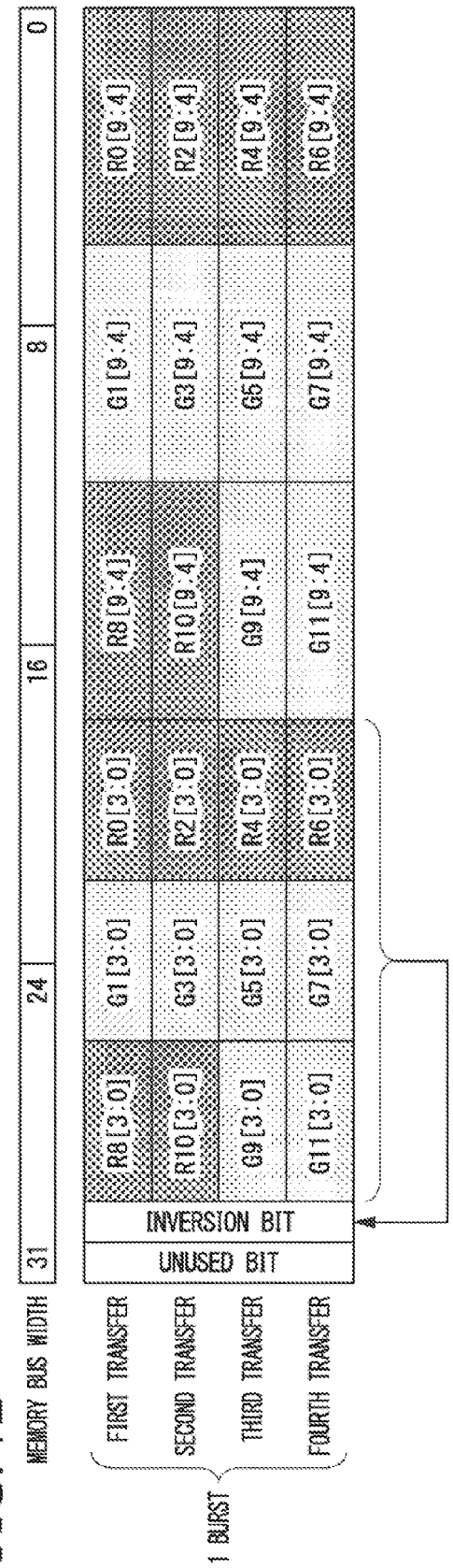

FIG. 10A

| INPUT DATA DIN | DECIMAL | BINARY CODE | | | | | | | | BIT CHANGE NUMBER (UPPER) | BIT CHANGE NUMBER (LOWER) | UPPER BIT (DECIMAL) |
|---|---|---|---|---|---|---|---|---|---|---|---|---|
| | | (7) | (6) | (5) | (4) | (3) | (2) | (1) | (0) | | | |
| Vicinity of 128 | 129 | 1 | 0 | 0 | 0 | 0 | 0 | 0 | 1 | 4 BIT | — | 8 |
| | 125 | 0 | 1 | 1 | 1 | 1 | 1 | 0 | 1 | 4 BIT | 2 BIT | 7 |
| | 128 | 1 | 0 | 0 | 0 | 0 | 0 | 0 | 0 | 0 BIT | 3 BIT | 8 |
| | 135 | 1 | 0 | 0 | 0 | 0 | 1 | 1 | 1 | 4 BIT | 3 BIT | 8 |
| | 127 | 0 | 1 | 1 | 1 | 1 | 1 | 1 | 1 | 0 BIT | 1 BIT | 7 |
| | 122 | 0 | 1 | 1 | 1 | 1 | 0 | 1 | 0 | 4 BIT | 2 BIT | 7 |
| | 131 | 1 | 0 | 0 | 0 | 0 | 0 | 1 | 1 | 2 BIT | 2 BIT | 8 |
| Vicinity of 64 | 64 | 0 | 1 | 0 | 0 | 0 | 0 | 0 | 0 | 3 BIT | 1 BIT | 4 |
| | 59 | 0 | 0 | 1 | 1 | 1 | 0 | 1 | 1 | 3 BIT | 3 BIT | 3 |
| | 63 | 0 | 0 | 1 | 1 | 1 | 1 | 1 | 1 | 0 BIT | 1 BIT | 3 |
| | 68 | 0 | 1 | 0 | 0 | 0 | 1 | 0 | 0 | 3 BIT | 1 BIT | 4 |
| | 64 | 0 | 1 | 0 | 0 | 0 | 0 | 0 | 0 | 0 | 1 | 4 |
| | 62 | 0 | 0 | 1 | 1 | 1 | 1 | 1 | 0 | 3 BIT | 3 BIT | 3 |

BIT CHANGE NUMBER (SUM) 27 BIT | 26 BIT

FIG. 10B

| OUTPUT DATA DOUT | GRAY CODE | | | | BINARY CODE | | | | BIT CHANGE NUMBER (UPPER) | INVERSION BIT | BIT CHANGE NUMBER (LOWER) |
|---|---|---|---|---|---|---|---|---|---|---|---|
| | (7) | (6) | (5) | (4) | (3) | (2) | (1) | (0) | | | |
| | 1 | 1 | 0 | 0 | 0 | 0 | 0 | 1 | 1 BIT | 0 | — |
| | 1 | 0 | 0 | 0 | 0 | 0 | 1 | 1 | 1 BIT | 0 | 2 BIT |
| | 1 | 1 | 0 | 0 | 0 | 0 | 0 | 0 | 0 BIT | 1 | 1 BIT |
| | 1 | 1 | 0 | 0 | 1 | 0 | 0 | 1 | 1 BIT | 0 | 1 BIT |
| | 1 | 0 | 0 | 0 | 0 | 0 | 0 | 1 | 0 BIT | 0 | 1 BIT |
| | 1 | 0 | 0 | 0 | 1 | 1 | 1 | 1 | 2 BIT | 0 | 2 BIT |
| | 1 | 1 | 0 | 0 | 0 | 0 | 1 | 0 | 1 BIT | 0 | 2 BIT |
| | 0 | 1 | 1 | 0 | 0 | 0 | 0 | 0 | 2 BIT | 1 | 1 BIT |
| | 0 | 0 | 1 | 0 | 1 | 0 | 1 | 1 | 1 BIT | 0 | 1 BIT |
| | 0 | 0 | 1 | 0 | 0 | 0 | 0 | 0 | 0 BIT | 1 | 1 BIT |
| | 0 | 1 | 1 | 0 | 0 | 1 | 0 | 0 | 1 BIT | 0 | 1 BIT |
| | 0 | 1 | 1 | 0 | 0 | 0 | 0 | 0 | 0 | 1 | — |
| | 0 | 0 | 1 | 0 | 0 | 0 | 0 | 1 | 1 BIT | 1 | 1 BIT |

BIT CHANGE NUMBER (SUM) 9 BIT | 16 BIT

FIG. 12

| INVERSION PROCESS APPLICATION RANGE | FUNCTION SELECTION BIT |
|---|---|
| INVERSION CASE a (AS IT IS) NO INVERSION | "00" |
| INVERSION CASE b LOWER 2-BIT INVERSION | "01" |
| INVERSION CASE c LOWER 4-BIT INVERSION | "10" |
| INVERSION CASE d ALL-BIT INVERSION | "11" |

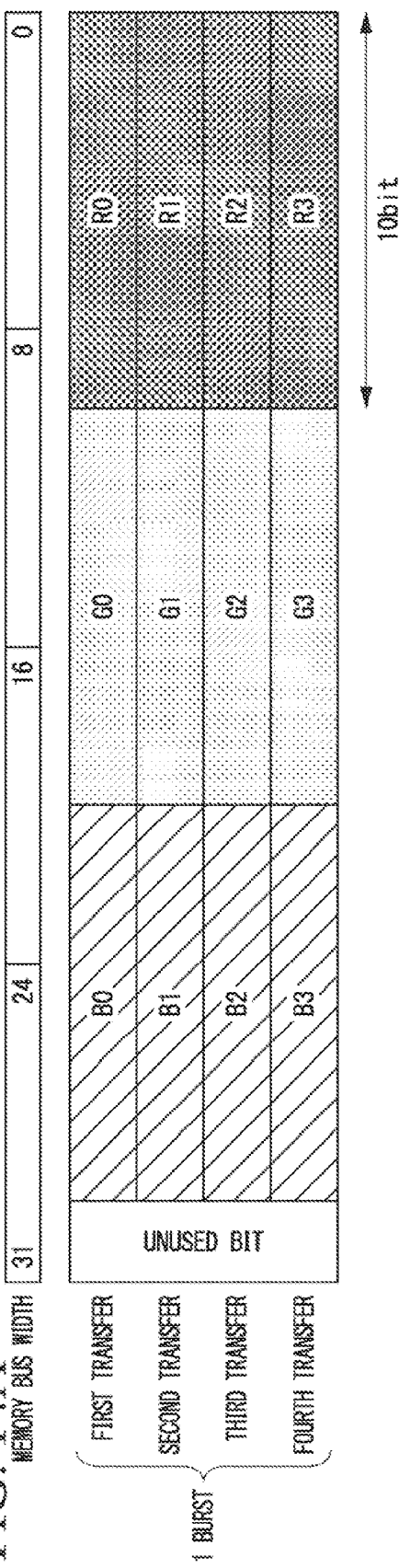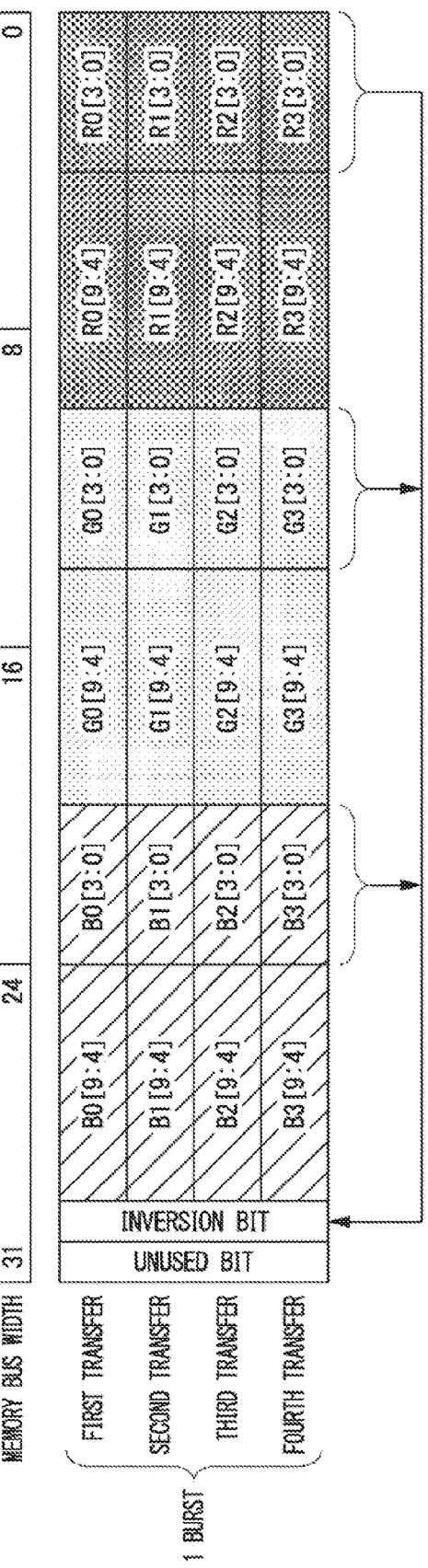

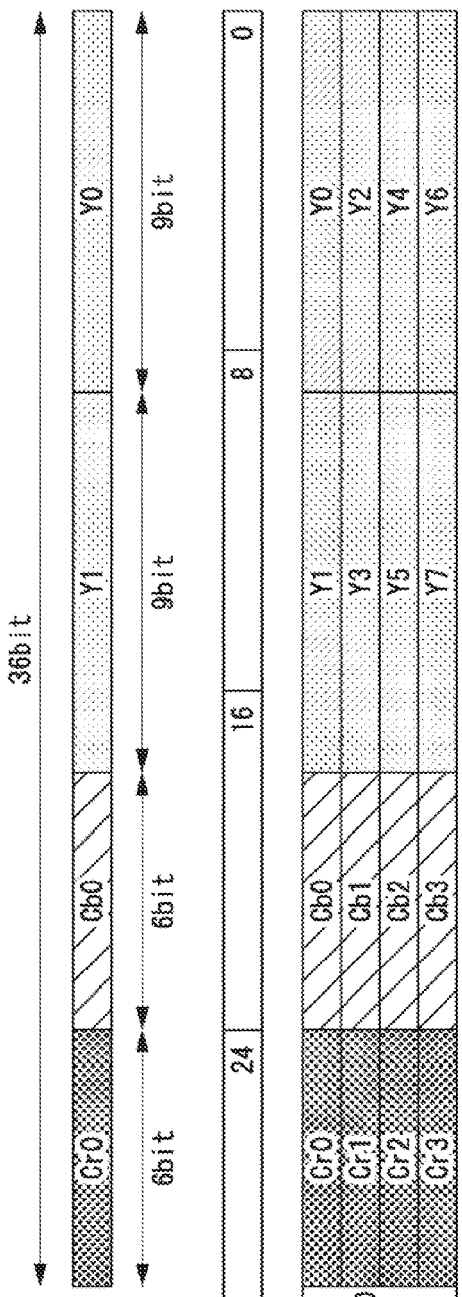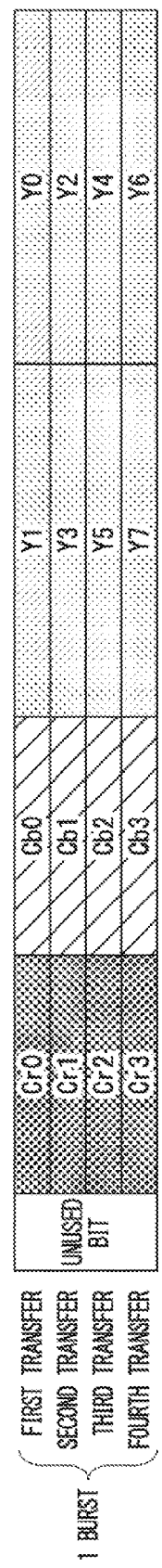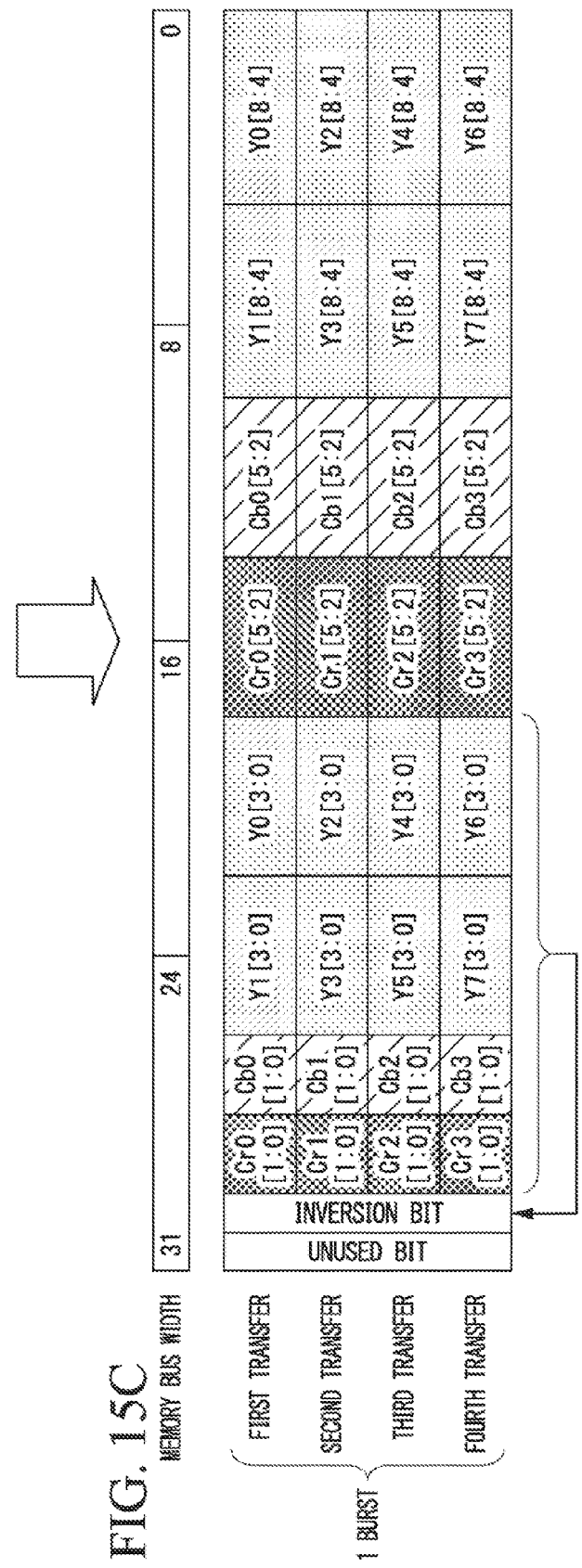

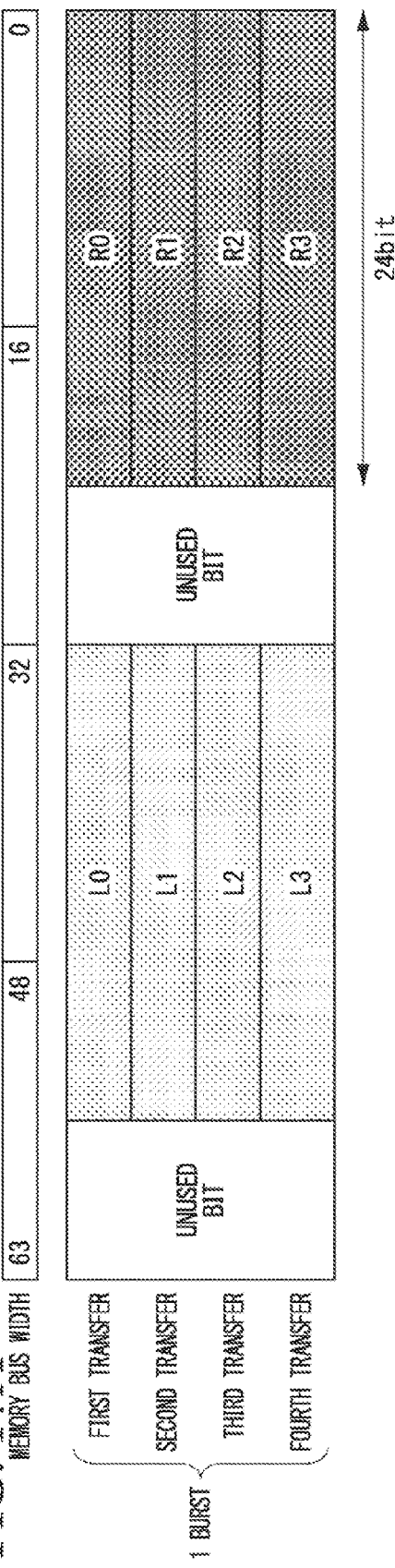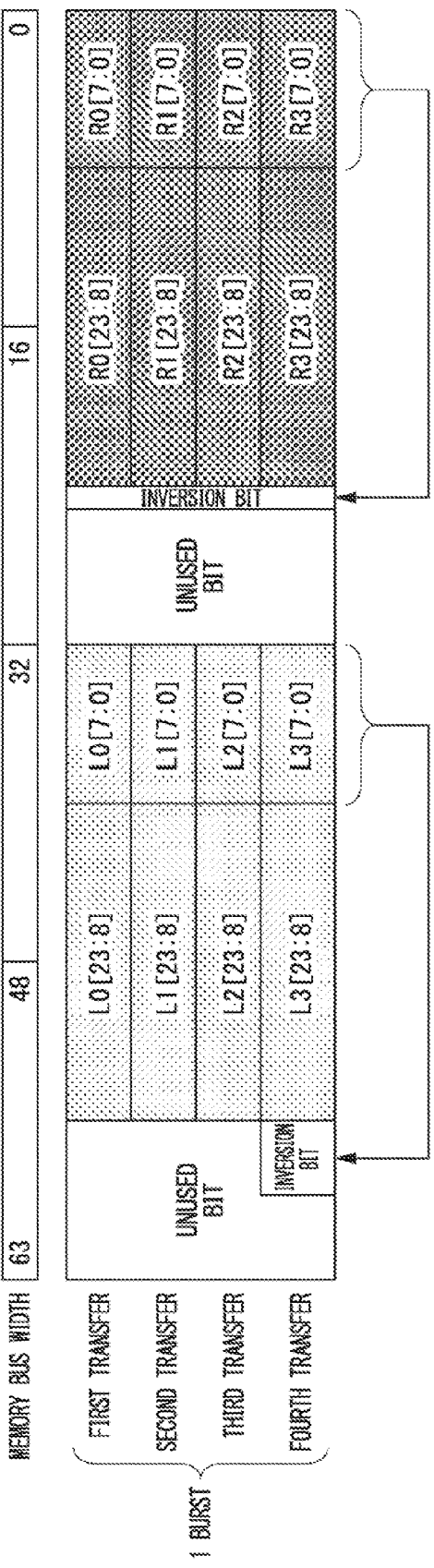

FIG. 19

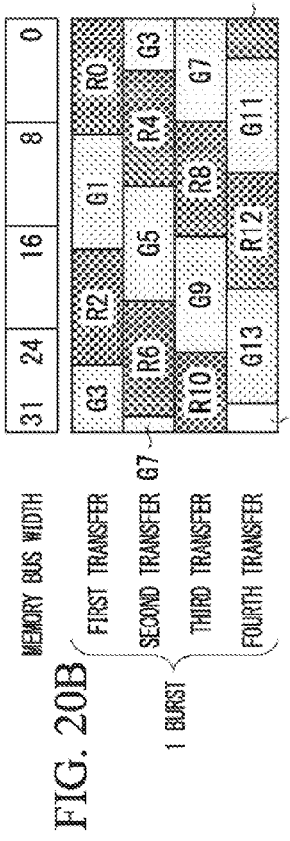
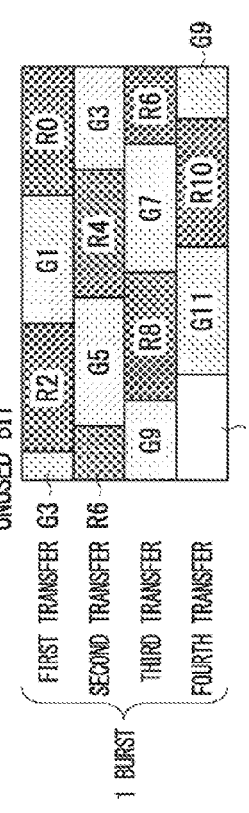
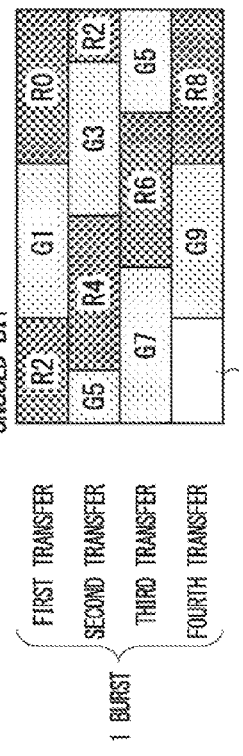
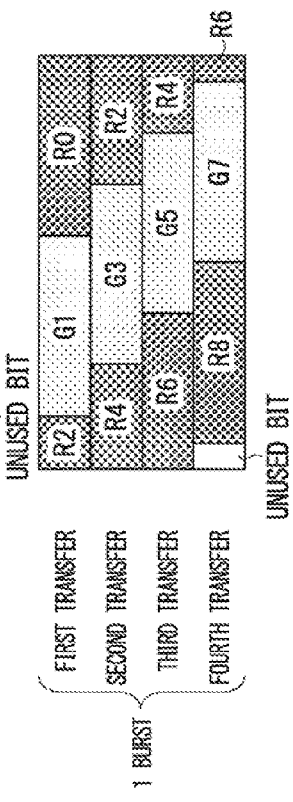
FIG. 20A
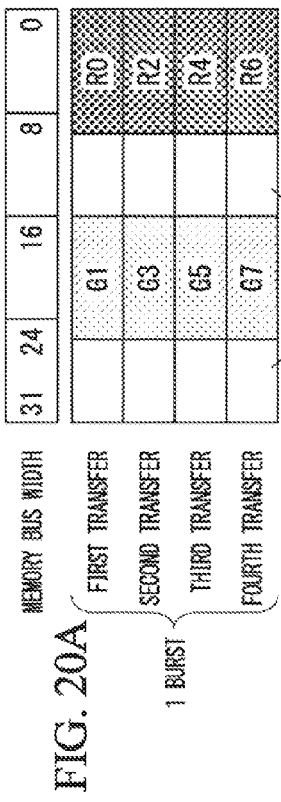
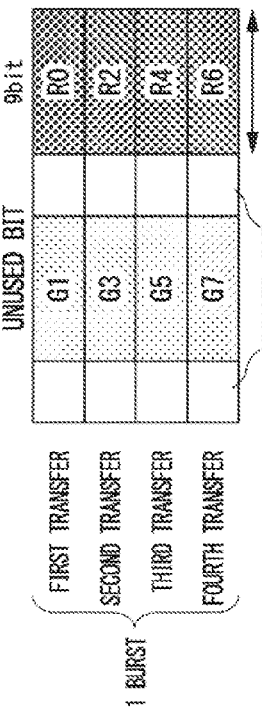
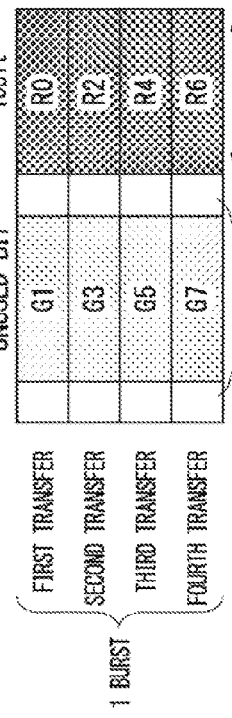
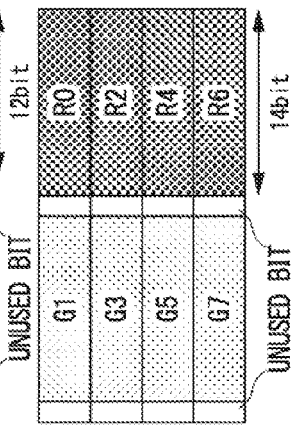
FIG. 20B

FIG. 25A
INPUT DATA DIN

| DECIMAL | BINARY CODE | | | | | | | | BIT CHANGE NUMBER |
|---|---|---|---|---|---|---|---|---|---|
| | (7) | (6) | (5) | (4) | (3) | (2) | (1) | (0) | |
| 192 | 1 | 1 | 0 | 0 | 0 | 0 | 0 | 0 | — |
| 199 | 1 | 1 | 0 | 0 | 0 | 1 | 1 | 1 | 3 BIT |
| 197 | 1 | 1 | 0 | 0 | 0 | 1 | 0 | 1 | 1 BIT |
| 188 | 1 | 0 | 1 | 1 | 1 | 1 | 0 | 0 | 5 BIT |
| 194 | 1 | 1 | 0 | 0 | 0 | 0 | 1 | 0 | 6 BIT |
| 205 | 1 | 1 | 0 | 0 | 1 | 1 | 0 | 1 | 4 BIT |
| 209 | 1 | 1 | 0 | 1 | 0 | 0 | 0 | 1 | 3 BIT |
| 208 | 1 | 1 | 0 | 1 | 0 | 0 | 0 | 0 | 1 BIT |
| 207 | 1 | 1 | 0 | 0 | 1 | 1 | 1 | 1 | 5 BIT |
| 211 | 1 | 1 | 0 | 1 | 0 | 0 | 1 | 1 | 3 BIT |
| 215 | 1 | 1 | 0 | 1 | 0 | 1 | 1 | 1 | 1 BIT |
| 222 | 1 | 1 | 0 | 1 | 1 | 1 | 1 | 0 | 2 BIT |
| 231 | 1 | 1 | 1 | 0 | 0 | 1 | 1 | 1 | 4 BIT |

BIT CHANGE NUMBER (SUM)

38 BIT

FIG. 25B
OUTPUT DATA DOUT

| BINARY CODE | | | | | | | | INVERSION BIT | BIT CHANGE NUMBER |
|---|---|---|---|---|---|---|---|---|---|
| (7) | (6) | (5) | (4) | (3) | (2) | (1) | (0) | | |
| 1 | 1 | 0 | 0 | 0 | 0 | 0 | 0 | 0 | — |
| 1 | 1 | 0 | 0 | 0 | 1 | 1 | 1 | 0 | 3 BIT |
| 1 | 1 | 0 | 0 | 0 | 1 | 0 | 1 | 0 | 1 BIT |
| 0 | 1 | 0 | 0 | 0 | 0 | 1 | 1 | 1 | 3 BIT |
| 1 | 1 | 0 | 0 | 0 | 0 | 1 | 0 | 0 | 2 BIT |
| 1 | 1 | 0 | 0 | 1 | 1 | 0 | 1 | 0 | 4 BIT |
| 1 | 1 | 0 | 1 | 0 | 0 | 0 | 1 | 0 | 3 BIT |
| 1 | 1 | 0 | 1 | 0 | 0 | 0 | 0 | 0 | 1 BIT |
| 0 | 0 | 1 | 1 | 0 | 0 | 0 | 0 | 1 | 3 BIT |
| 0 | 0 | 1 | 0 | 1 | 1 | 0 | 0 | 1 | 3 BIT |
| 0 | 0 | 1 | 0 | 1 | 0 | 0 | 0 | 1 | 1 BIT |
| 0 | 0 | 1 | 0 | 0 | 0 | 0 | 1 | 1 | 2 BIT |
| 0 | 0 | 0 | 1 | 1 | 0 | 0 | 0 | 1 | 4 BIT |

BIT CHANGE NUMBER (SUM)

30 BIT

FIG. 26A

NATURAL IMAGE DATA

| DECIMAL | BINARY CODE | | | | | | | |
|---|---|---|---|---|---|---|---|---|
| | (7) | (6) | (5) | (4) | (3) | (2) | (1) | (0) |
| 192 | 1 | 1 | 0 | 0 | 0 | 0 | 0 | 0 |
| 199 | 1 | 1 | 0 | 0 | 0 | 1 | 1 | 1 |

A ← DATA CHANGE FREQUENCY IS LOW

B ← DATA CHANGE FREQUENCY IS HIGH (NOISE COMPONENT)

| | BIT CHANGE NUMBER |
|---|---|
| | – |
| | 3 BIT |

FIG. 26B

| | MAJORITY DECISION | INVERSION BIT |
|---|---|---|
| A: DECISION BASED ON ALL BIT | 3/8 | 0 |
| B: DECISION BASED ON LOWER BIT | 3/4 | 1 |

DATA PROCESSING APPARATUS AND DATA PROCESSING METHOD

BACKGROUND

1. Field of the Invention

The present invention relates to a data processing apparatus and a data processing method. This application claims priority to Japanese Patent Application No. 2011-066057 filed in Japan on Mar. 24, 2011, and the contents of which are incorporated hereby.

2. Description of Related Art

An imaging apparatus, such as a still camera, a video camera, a medical endoscope camera, or an industrial endoscope camera, processes image data containing data of a great number of pixels (hereinafter referred to as "pixel data") in conjunction with the increase of the number of pixels and speed of the imaging apparatus. In such an imaging apparatus, a memory for temporarily storing data is used when each processing block in the imaging apparatus processes image data obtained by photographing. Image data in each processing step is temporarily stored in the memory.

FIG. 18 is a block diagram showing a schematic configuration of a conventional imaging apparatus. For example, image data processing in a photographing operation of the imaging apparatus shown in FIG. 18 is performed in the following order.

(Step 1): First, an imaging processing unit, for example, transmits image data obtained by a CCD (Charge Coupled Device) solid-state imaging device to a memory via an output DMA (Direct Memory Access) unit to temporarily store the image data.

(Step 2): Subsequently, an image processing unit reads the image data temporarily stored in the memory via an input DMA unit. The image processing unit performs image processing for recording or display on the read image data. The image processing unit then transmits the processed image data to the memory via the output DMA unit to temporarily store the image data.

(Step 3): Subsequently, a display processing unit reads the image data subjected to image processing for display via an input DMA unit and causes a display device to display the image data.

Thus, in the imaging apparatus, the preceding processing block temporarily stores the image data in the memory. The subsequent processing block reads the image data stored in the memory and performs a next process. Thus, as respective processing blocks in the imaging apparatus perform delivery of the image data, which is a processing target, via the memory, entire processes of the imaging apparatus are sequentially performed.

In recent years, it has been preferable for an imaging apparatus such as a still camera, a video camera or the like to be able to be continuously used for a long time. Accordingly, there is a need for a technique for reducing power consumption of an electrical circuit of the imaging apparatus. One method of reducing the power consumption of the imaging apparatus includes a method of increasing a transfer speed for image data between each processing block (electrical circuit) and a memory. The increase of the transfer speed for image data, for example, may be realized by increasing a frequency of an operation clock of the imaging apparatus or shortening a transfer period of time of the image data between the processing block and the memory. This method reduces power consumption concerning transfer of the image data by increasing the transfer speed of the image data.

As a technique of shortening a transfer period of time of image data between the processing block and the memory, a packing technique as disclosed in Japanese Unexamined Patent Application, First Publication No. 2007-312358 is known. The packing technique disclosed in Japanese Unexamined Patent Application, First Publication No. 2007-312358 is a technique of extending a bus width of a data bus used when each pixel data in the image data is transferred to a memory and arranging (packing) a plurality of adjacent pixel data in the data bus to transfer a plurality of pixel data at a time. Using this technique, the number of data transfers required to transfer all pixel data can be further reduced over conventional data transfer in which pixel data is transferred pixel by pixel, and the period of time for data transfer of the image data can be shortened. For example, when pixel data obtained from a 16×16 Bayer arrangement CCD is transferred to a memory as shown in FIG. 19, in the packing technique disclosed in Japanese Unexamined Patent Application, First Publication No. 2007-312358, pixel data for 4 pixels is one transfer unit, thus reducing a transfer period of the image data to 1/4. Accordingly, it is possible to reduce power consumption of an electrical circuit in the imaging apparatus, relative to a case in which pixel data is transferred to the memory pixel by pixel.

As a technique of further shortening the transfer period of image data, a packing method using burst transfer of DMA is considered. This is a method in which one burst, which is a unit for accessing a memory at a prescribed certain number of cycles, is considered a unit for packing a pixel data. FIGS. 20A and 20B show an example of packing of pixel data. FIG. 20A illustrates an example in which the pixel data shown in FIG. 19 is packed by the packing method disclosed in Japanese Unexamined Patent Application, First Publication No. 2007-312358. FIG. 20B shows an example in which the pixel data shown in FIG. 19 is packed in a burst unit. An example in which a bus width (hereinafter referred to as "memory bus width") of a data bus used when the pixel data is transferred to the memory (hereinafter referred to as "memory bus") is 32 bit, and memory access for one cycle in burst transfer (hereinafter referred to as "one transfer") is performed four times, that is, one burst transfer is performed through four transfers, is shown in FIGS. 20A and 20B. An example in which resolution of pixel data of one pixel, that is, a bit number of the pixel data, is 9, 10, 12, and 14 from top to bottom, is shown in FIGS. 20A and 20B.

As can be seen from FIGS. 20A and 20B, in the packing method disclosed in Japanese Unexamined Patent Application, First Publication No. 2007-312358 shown in FIG. 20A, pixel data for two pixels per one transfer can be arranged on a memory bus, and pixel data for 8 pixels per one burst can be transferred to the memory. On the other hand, in the packing method in the burst unit shown in FIG. 20B, pixel data for 14, 12, 10, and 9 pixels can be transferred to the memory. In the packing method disclosed in Japanese Unexamined Patent Application, First Publication No. 2007-312358, since pixel data is arranged (packed) in the memory bus width, that is, in a unit of one transfer, a sum of bit numbers of a plurality of arranged pixel data must not exceed the memory bus width. Accordingly, in the packing method disclosed in Japanese Unexamined Patent Application, First Publication No. 2007-312358, there are many bit to which pixel data cannot be allocated within the memory bus width (hereinafter referred to as "unused bit"). On the other hand, in the packing method in the burst unit, since pixel data is arranged (packed) in units of bursts, even when a sum of bit numbers of a plurality of arranged pixel data exceeds the memory bus width, the pixel data can be arranged (packed) in a next transfer as long as the sum does not exceed one burst, as in FIG. 20B. That is, in the packing method in the burst unit, even when the memory bus width is not an integer times the resolution of pixel data, the pixel data can be arranged (mapped) over one transfer unit, which can reduce the number of unused bit. Accordingly, in the packing method in the burst unit, much pixel data can be transferred to the memory in the same time, that is, the transfer period of time of the image data can be shortened, and the power consumption of the electrical circuit in the imaging apparatus can be further reduced than the packing method disclosed in Japanese Unexamined Patent Application, First Publication No. 2007-312358.

However, in general, it is known that when data change (change (inversion) of data "0"→"1" or "1"→"0") is less, power consumption to be lower. Accordingly, reducing the power consumption of the imaging apparatus by reducing the data change on the memory bus between each processing block (electrical circuit) and a memory in the imaging apparatus is also considered. FIGS. 21A to 21D are diagrams illustrating a relationship between the data change on the data bus (memory bus) between the processing block and the memory in the imaging apparatus and the power consumption. FIG. 21A shows an example in which a bus width of a memory bus between the imaging processing unit and the memory in the imaging apparatus shown in FIG. 18 is 32 bit. The data change on the memory bus is schematically shown in FIGS. 21 to 21D. In the example of FIGS. 21A to 21D, power consumption is lowest in the case of FIG. 21B in which there is no data change on the memory bus, and highest in the case of FIG. 21D in which there is the most data change on the memory bus.

It can be seen from the above that if there is a great amount of change in pixel data between two continuous transfers (e.g., pixel data in first and second transfers of each burst transfer shown in FIGS. 20A and 20B) in the burst transfer between each processing block and the memory in the imaging apparatus, power consumption concerning the transfer of the image data increases. That is, the power consumption due to the transfer of the image data varies in proportion to the number of the bit (bit number) on the memory bus that the same bit have changed between the two transfers.

In general, there is expected that an amount of change in data between adjacent pixels in image data is small, and bit whose values are being inverted are expected to be less than bit whose values are not being inverted when the same bit of pixel data of adjacent pixels are compared. Here, when the packing method disclosed in Japanese Unexamined Patent Application, First Publication No. 2007-312358 and the burst unit-based packing method, which are shown in FIGS. 20A and 20B, are compared with each other, the power consumption due to the transfer of the image data is lower in the packing method disclosed in Japanese Unexamined Patent Application, First Publication No. 2007-312358 in which the same bit are aligned in pixel data with the same colors, as shown in FIGS. 22A and 22B. Further, FIGS. 22A and 22B show a case in which the bit number of pixel data of one pixel is 9 in the packing method disclosed in Japanese Unexamined Patent Application, First Publication No. 2007-312358 and the burst unit-based packing method shown in FIGS. 20A and 20B.

More specifically, in the packing method disclosed in Japanese Unexamined Patent Application, First Publication No. 2007-312358 shown in FIG. 22A, least significant bit of the memory bus shown in a range A are all the same bit (least significant bit) of pixel data with the same colors. On the other hand, in the packing method in the burst unit shown in FIG. 22B, least significant bit of the memory bus shown in a range B are all different bit of pixel data having different colors. It can be seen from this that, when locations of bit of pixel data arranged on the memory bus are made different between two continuous transfers by packing the image data in a burst unit, a change amount of the same bit on the memory bus becomes great and the power consumption concerning the transfer of the image data increases.

That is, in the packing method disclosed in Japanese Unexamined Patent Application, First Publication No. 2007-312358 shown in FIG. 22A, the power consumption concerning the transfer of the image data is low, but data transfer efficiency is low. In the packing method in the burst unit shown in FIG. 22B, the data transfer efficiency is high, but the power consumption concerning the transfer of the image data is high.

Thus, more pixel data is arranged on the memory bus when packing the pixel data in the burst units. As a result, the transfer period of time of the pixel data can be shortened and the power consumption concerning transfer of the image data can be reduced. However, since locations of bit of the pixel data arranged on the memory bus are different between two continuous transfers, sufficient reduction of the power consumption concerning the transfer of the image data cannot be obtained.

Further, in the packing method disclosed in Japanese Unexamined Patent Application, First Publication No. 2007-312358, for example, pixel data for three pixels can be arranged (packed) in one transfer in which the pixel data is packed, as shown in FIG. 23. However, in this case, for example, least significant bit of the memory bus shown in a range C are the same bit (least significant bit) of the pixel data, but with different colors. The pixel data having different colors is highly likely to be greatly different in value, and even in the packing method disclosed in Japanese Unexamined Patent Application, First Publication No. 2007-312358, the power consumption concerning the transfer of the image data is not reduced depending on the pixel data arrangement in one transfer.

As a technique of reducing change in data arranged on the memory bus between two continuous transfers, a technique such as that in Japanese Unexamined Patent Application, First Publication No. 2000-148605 is disclosed. In Japanese Unexamined Patent Application, First Publication No. 2000-148605, a technique for a method of reducing a change amount of transferred data a method of determining the change amount, and a method of using the change amount when image data changing in time series is transmitted to a display device such as a liquid crystal panel is disclosed. EMI (Electro Magnetic Interference) radiation and power consumption reduce by reducing a change amount of image data transferred to the display device.

In the technique disclosed in Japanese Unexamined Patent Application, First Publication No. 2000-148605, a data sending side compares input n-bit data with n-bit data input at an immediately previous timing for each bit to majority-decide the number of bit whose values have changed. In the majority decision, the input data is decided to be inverted if the number of bit of the input data whose values have changed exceeds half, and the input data is not to be inverted if the number of bit whose values have changed is equal to or less than half. The sending side outputs data obtained by inverting the input data or data that is the input data as it is to the receiving side according to the majority decision result.

In this case, a signal indicating whether or not the data has been inverted is also output to the receiving side. The data receiving side inverts and then receives the received data or receives the data as it is according to the signal indicating whether or not the data has been inverted, and restores the data input to the sending side.

Here, a concrete example of a method of reducing a data change amount of data to be transferred (transfer data), which is disclosed in Japanese Unexamined Patent Application, First Publication No. 2000-148605, will be described. FIG. 24 is a block diagram showing a schematic configuration of a conventional data processing apparatus disclosed in Japanese Unexamined Patent Application, First Publication No. 2000-148605. A data transmitting side (a sending side) of the conventional data processing apparatus disclosed in Japanese Unexamined Patent Application, First Publication No. 2000-148605 transfers input data in time series to a data reception side (a receiving side) in the following flows.

(Flow 1): If data to be transferred is input, first, an EXOR (exclusive OR) 1 circuit compares currently input 36 bit data (hereinafter referred to as "data D1") with 36 bit data input at an immediately previous timing (hereinafter referred to as "data D0") for each bit.

(Flow 2): Subsequently, a majority circuit detects the number of bit of the data D1 whose values have changed (hereinafter referred to as "bit change number") from the comparison result of each bit input from the EXOR1 circuit. The majority circuit determines whether the detected bit change number occupies a majority of a data width (bit number: n bit) of the data D1. The majority circuit outputs a control signal (hereinafter referred to as "inversion bit") indicating whether the data D1 is to be inverted and then output or to be output in a non-inverted state according to the determined majority result. The majority circuit of the conventional data processing apparatus shown in FIG. 24 determines that all bit of the data D1 are to be inverted and outputs value "1" as the inversion bit if the bit change number occupies a majority of the data bit number (>n/2). Also, the majority circuit determines that all the bit of the data D1 are not to be inverted and outputs value "0" as the inversion bit if the bit change number is equal to or less than half of the data bit number (≤n/2). Here, the inversion refers to a change of a value of each bit of data from "1" to "0" or from "0" to "1".

(Flow 3): Subsequently, an EXOR2 circuit compares the value of the inversion bit corresponding to the data D1, which is output from the majority circuit in flow 2, with the value of the inversion bit corresponding to the data D0. The comparison result of the EXOR2 circuit is a control signal (hereinafter referred to as "inversion bit") indicating whether all bit of data of the data D1 are finally to be inverted and then output or to be output in a non-inverted state. That is, the conventional data processing apparatus shown in FIG. 24 determines whether to perform an inversion process to invert and then output all the bit of the data D1 or a non-inversion process to output all the bit of the data D1 in a non-inverted state based on whether or not the data D0 input at an immediately previous timing has been inversion-processed and then output. More specifically, in the conventional data processing apparatus, when the value of the inversion bit corresponding to the data D0 is "0" (non-inversion), the inversion bit corresponding to the data D1 input from the majority circuit finally becomes the inversion bit corresponding to the data of the data D1. On the other hand, in the conventional data processing apparatus, if the value of the inversion bit corresponding to the data D0 is "1" (inversion), a signal reverse to the inversion bit corresponding to the data D1 input from the majority circuit finally becomes the inversion bit corresponding to the data of the data D1. This is intended so that, for example, when the data D0 is inversion-processed and output and then the data D1 is inversion-processed and output even at a next timing, the data D1 is prevented from being data inverted from the inverted and output data D0, that is, non-inverted data resulting from twice inversions since the data D0 output at an immediately previous timing is already inverted data.

(Flow 4): At a next timing, an EXOR3 circuit performs an inversion process or a non-inversion-process on all the bit of the data D1 according to the inversion bit to output (transfer) data D1. At the same timing, the inversion bit is output (transferred) together. Through such a flow, in the conventional data processing apparatus shown in FIG. 24, when the number of bit of data input in time series whose values have changed exceeds half, the input data is subjected to the inversion process such that the number of bit whose values have changed is reduced to half or less for transfer. Accordingly, a change amount of respective bit when the input data is transferred can be reduced and power consumption concerning the data transfer can be reduced.

At the data reception side, an EXOR4 circuit performs an inversion process or a non-inversion process on all the bit of the data D1 received from the data transmission side according to the inversion bit received therewith. Accordingly, the original data D1 input to the data reception side can be restored.

An example of concrete data values showing that a change amount of output data becomes small in the conventional data processing apparatus will be described herein. FIGS. 25A and 25B are diagrams showing an example in which the data change amount is reduced in the conventional data processing apparatus disclosed in Japanese Unexamined Patent Application, First Publication No. 2000-148605. FIG. 25A shows input data input to the conventional data processing apparatus and a bit change number, and FIG. 25B shows output data and an inversion bit output from the conventional data processing apparatus, and a bit change number. In the conventional data processing apparatus, the input data as shown in FIG. 25A is sequentially input in time series from a top column to a bottom column. Each time the input data is input, the conventional data processing apparatus detects the bit change number and performs the inversion process or the non-inversion-process on all the bit of the input data according to the detected bit change number to output the output data as shown in FIG. 25B. Hereinafter, for convenience of description, a case in which 8-bit input data is input to the conventional data processing apparatus and 8-bit output data is output will be described.

As can be seen from FIG. 25A, if the values of the respective bit of the input data are sequentially compared each time the input data is input, that is, in a column of the input data shown in FIG. 25A, if the value of each bit is compared with the value of the input data in an upper column, for example, there is the input data in which the bit change number occupies the majority, like the input data in columns "A" of FIG. 25A.

Further, a sum of the bit change numbers in all the input data shown in FIG. 25A is 38-bit.

In the conventional data processing apparatus, the output data obtained by subjecting the input data to the inversion process or the non-inversion process in flows such as flows 1 to 4 described above is output, the bit change number is equal to or less than half, as in columns "A" of FIG. 25B. Accordingly, the sum of the bit change numbers in all the output data is 30-bit and the data change amount is reduced by 8 bit. Thus, as the values of the respective bit of the input data are sequentially compared and the input data in which the bit change number is great is inversion-processed and then output, a total data change amount in data transfer can be reduced over a case in which data is transferred without being subjected to the inversion process.

FIGS. 26A and 26B are diagrams showing an example of a data change amount in image data. For example, as shown in FIG. 26A, when 8-bit image data is sequentially input as a natural image data, the case in which an image data in the natural image data changes from a value of top column to a value of bottom column is considered. In the following explanation, as shown in FIG. 26A, a data correlation of 4 upper bit of image data is high and a data correlation of lower 4 bit of image data is low.

In a conventional data processing apparatus disclosed in Japanese Unexamined Patent Application, First Publication No. 2000-148605, a data change amount is detected based on bit of data of all 8-bit in frame A shown in FIG. 26A. An example shown in FIGS. 26A and 26B, bit change amount is detected as 3 bit.

In the conventional data processing apparatus disclosed in Japanese Unexamined Patent Application, First Publication No. 2000-148605, a majority decision id performed based on a detected bit change amount.

SUMMARY OF INVENTION

According to a first aspect of the present invention, a data processing apparatus includes a data conversion unit for, when converting a plurality of sequentially input data into transfer data of the same bit number as a data bus having a prescribed bit number and sequentially transferring the transfer data, arranging the input data in each transfer data in a conversion unit using one transfer data as one transfer unit and a prescribed number of transfer units as one conversion unit. The data conversion unit includes: a first bit division unit, a bit comparison unit, a bit determination unit a first bit inversion unit and a first bit coupling unit. The first bit division unit divides the input data into a first divided data having a first prescribed bit number and a second divided data having a second prescribed bit number. The bit comparison unit compares a value of each bit in first output data according to the first divided data output at an n-th time (n is a natural number equal to or more than 1) from the data conversion unit with a value of each bit in the first divided data input at an (n+1)-th time to the data conversion unit, and outputs comparison information of the compared bit. The bit determination unit calculate a bit change number indicating the number of bit whose values are different based on the comparison information, determine whether the value of each bit of the first divided data input at the (n+1)-th time is to be inverted for each bit based on the calculated bit change number and a prescribed bit number, and output the determination result as inversion information. The first bit inversion unit outputs either first inverted data obtained by inverting values of bit of the first divided data input at the (n+1)-th time for each bit or the first divided data input at the (n+1)-th time as first inversion-processed data based on the inversion information. The first bit coupling unit generates first transfer data in which each bit of the first inversion-processed data and each bit of the second divided data are arranged in respective bit of the data bus, to couple generates coupling data, which the inversion information is coupled, at a position of a prescribed unused bit of the first transfer data containing unused bit in which data has not been arranged among the first transfer data in the conversion unit to when the first transfer data is output as the transfer data, and to output either the first transfer data or the coupling data as the transfer data in the data conversion unit.

Further, according to a second aspect of the present invention, the bit determination unit determines that the values of bit of the first divided data input at the (n+1)-th time are to be inverted for each bit if the bit change number occupies a majority of the bit number of the first divided data, and determines that the values of bit of the first divided data input at the (n+1)-th time are not to be inverted for each bit if the bit change number is equal to or less than half of the bit number of the first divided data.

Further, according to a third aspect of the present invention, the bit determination unit makes the determination as to whether that the values of bit of the first divided data input at the (n+1)-th time are to be inverted for each bit to be the same in result as a determination made for the first divided data input at the n-th time is obtained, if the bit change number is half of the bit number of the first divided data.

Further, according to a forth aspect of the present invention, the data conversion unit further includes a first code conversion unit which represents the second divided data in gray code in which only one bit is changed when a data change is 1. Furthermore, the first bit coupling unit generates the first transfer data in which each bit of the first inversion-processed data and each bit of the second divided data represented in the gray code are arranged in respective bit of the data bus.

Further, according to a fifth aspect of the present invention, the first bit division unit collects the respective first divided data of the plurality of input data arranged in the same transfer unit to obtain one first divided data. Furthermore, the bit comparison unit compares values of respective bit in a unit of the first collected divided data. Furthermore, the bit determination unit determines whether values of respective bit are to be inverted for each bit in a unit of the first collected divided data. Furthermore, the first bit inversion unit outputs the first inversion-processed data of the unit of the first collected divided data. Furthermore, the first bit coupling unit arranges each bit of the first inversion-processed data in a unit of the collected data and each bit of the respective second divided data in respective bit of the data bus, and couples the inversion information determined in a unit of the collected data.

Further, according to a sixth aspect of the present invention, a data processing apparatus includes a data conversion unit which arranges the input data in each transfer data in a conversion unit using one transfer data as one transfer unit and a prescribed number of transfer units as one conversion unit, wherein, in the data conversion unit, when converting a plurality of sequentially input data into transfer data of the same bit number as a data bus having a prescribed bit number and sequentially transferring the transfer data. In the data conversion unit, first bit position and a second bit position in which values of bit of the input data are inverted for each bit are prescribed. Furthermore, the data conversion unit includes a first bit inversion unit, a first data selection unit, a bit comparison unit, a bit change number calculation unit, a data determination unit and a first bit coupling unit. The first bit inversion unit generates first inverted data in which values of bit in the first bit position is inverted for each bit, and second inverted data in which values of bit in the second bit position is inverted for each bit in the input data. The first data selection unit selects either the first inverted data or the second inverted data and outputs the selected data as selection data. The bit comparison unit compares a value of each bit in first output data according to the selected data output at the n-th time (n is a natural number equal to or more than 1) from the data conversion unit with a value of each bit of the first inverted data or the second inverted data of the (n+1)-th time according to the input data input at the (n+1)-th time to the data conversion unit, and outputs respective comparison information of the compared bit as first comparison information detected corresponding to the first inverted data and second comparison information detected corresponding to the second inverted data. The bit change number calculation unit calculates a first bit change number indicating the number of bit whose values are different based on the first comparison information, and calculates a second bit change number indicating the number of bit whose values are different based on the second comparison information. The data determination unit determines whether the first inverted data or the second inverted data of the (n+1)-th time is to be output based on the first bit change number and the second bit change number, and outputs the determination result as inversion information. The first bit coupling unit generates coupling data, which the inversion information is coupled, at a position of a prescribed unused bit of the selection data containing unused bit in which data has not been arranged among the selection data in the conversion unit, and outputs either the selection data or the coupling data as the transfer data in the data conversion unit when the selection data is output as the transfer data. Furthermore, the first data selection unit selects either the first inverted data or the second inverted data of the (n+1)-th time based on the inversion information, and outputs the selected inverted data as (n+1)-th selection data.

Further, according to a seventh aspect of the present invention, the first bit inversion unit inverts the values of bit in the first bit position of the input data for each bit and generates first inverted data in which data of bit in a position other than the first bit position is represented in gray code in which only one bit is changed when a data change is 1. Furthermore, the first bit inversion unit inverts the values of bit in the second bit position for each bit and generates second inverted data in which data of bit in a position other than the second bit position is represented in the gray code to.

Further, according to an eighth aspect of the present invention, the first bit inversion unit obtains the input data by collecting the plurality of input data arranged in the same transfer unit. Furthermore, the first data selection unit selects either the first inverted data or the second inverted data according to the collected input data. Furthermore, the bit comparison unit compares the values of the respective bit in a unit of the collected selection data. Furthermore, the bit change number calculation unit calculates the number of bit whose values are different in a unit of the collected selection data. Furthermore, the data determination unit determines whether the first inverted data or the second inverted data is to be output in a unit of the collected selection data. Furthermore, the first bit coupling unit couples the inversion information determined in the unit of the collected data when the selection data of the collected data unit is output as the transfer data.

Further, according to a ninth aspect of the present invention, a data processing apparatus includes a data inverse-conversion unit which converts a plurality of input data into transfer data having the same bit number as a data bus having a prescribed bit number, and sequentially inverse-converts transfer data sequentially transferred in a unit of conversion unit using one transfer data as one transfer unit and a prescribed number of transfer units as one conversion unit to restore the plurality of original input data. The data inverse-conversion unit includes: a second bit division unit, a second bit inversion unit and a second bit coupling unit. In the second bit inversion unit, a data processing apparatus of a transfer source of the transfer data from the data bus, the data processing apparatus of the transfer source of the transfer data divides the input data as the transfer data into a first prescribed bit number of first divided data and a second prescribed bit number of second divided data. Furthermore, the second bit inversion unit, the first inverted data obtained by inverting values of bit of the first divided data for each bit or the first divided data being the first inversion-processed data. Furthermore, the first transfer data in which each bit of the second divided data and each bit of the first inversion-processed data being arranged in respective bit of the data bus, and the inversion information indicating whether the first inverted data or the first divided data has been selected as the first inversion-processed data are input from the data bus to the second bit inversion unit as the transfer data from the data processing apparatus of the transfer source of the transfer data. Furthermore, the second bit inversion unit divides the transfer data into the inversion information coupled in a position of a prescribed bit of either of the transfer data and the first transfer data, and divides the first transfer data into the second divided data and the first inversion-processed data. Furthermore; a second bit inversion unit outputs either second inverted data obtained by inverting values of bit of the first inversion-processed data for each bit or the first inversion-processed data as the first divided data based on the inversion information. Furthermore; a second bit coupling unit couples the first divided data and the second divided data to restore the original input data. Further, according to a tenth aspect of the present invention, the data inverse-conversion unit further includes a second code conversion unit which represents the second divided data from gray code back to binary code. Furthermore, the second bit coupling unit couples the first divided data and the second divided data restored to the binary code to restore the original input data.

Further, according to an eleventh aspect of the present invention, for the transfer data, the respective first divided data of the plurality of input data arranged in the same transfer unit is collected and processed as one first divided data. Furthermore, the second bit division unit divides the first inversion-processed data including the first divided data of the collected data unit from the first transfer data, the second bit inversion unit outputs the first divided data of the collected data unit from the first inversion-processed data. Furthermore, the second bit coupling unit divides the first divided data of the collected data unit into the respective first divided data. Furthermore, the second bit coupling unit couples the first divided data and the corresponding second divided data to restore the original input data.

Further, according to a twelfth aspect of the present invention, a data processing apparatus includes a data inverse-conversion unit. The data inverse-conversion unit converts a plurality of input data into transfer data having the same bit number as a data bus having a prescribed bit number. Furthermore, the data inverse-conversion unit sequentially inverse-converts transfer data sequentially transferred in each conversion unit using one transfer data as one transfer unit and a prescribed number of transfer units as one conversion unit to restore the plurality of original input data. Furthermore, the data inverse-conversion unit includes a second bit division unit, a second bit inversion unit and a second data selection unit. In the second bit division unit, the same setting as setting of a first bit position and a second bit position in which values of bit of the input data are inverted for each bit when a data processing apparatus of a transfer source for the transfer data outputs the transfer data in the conversion unit is prescribed. Furthermore, in the second bit division unit, the data processing apparatus of the transfer source for the transfer data generates first inverted data obtained by inverting values of bit in the first bit position of the input data for each bit and second inverted data obtained by inverting values of bit in the second bit position for each bit based on the first bit position as the transfer data, based on the first bit position and the second bit position set in the data processing apparatus of the transfer source for the transfer data. Furthermore, in the second bit division unit, either the first inverted data or the second inverted data being the selection data. Furthermore, in the second bit division unit, the selection data and the inversion information indicating whether the first inverted data or the second inverted data has been selected as the selection data are input from the data bus as the transfer data from the data processing apparatus of the transfer source for the transfer data. Furthermore, the second bit division unit divides the transfer data into the inversion information coupled in a position of a prescribed bit of either of the transfer data and the first transfer data. Furthermore, the second bit inversion unit restores the input selection data to the first inverted data obtained by inverting values of bit in the first bit position of the input data for each bit and the second inverted data obtained by inverting values of bit in the second bit position for each bit. Furthermore, the second data selection unit selects either the first inverted data or the second inverted data based on the inversion information, and outputs the selected data as the original input data restored by the data inverse-conversion unit.

Further, according to a thirteenth aspect of the present invention, the second bit inversion unit restores the first inverted data obtained by inverting values of bit in the first bit position of the selection data for each bit and representing data of bit in a position other than the first bit position from gray code back to binary code; and the second inverted data obtained by inverting values of bit in the second bit position of the selection data for each bit and representing data of bit in a position other than the second bit position from gray code back to binary code.

Further, according to a fourteenth aspect of the present invention, for the transfer data, the plurality of input data arranged in the same transfer unit is collected and processed as one selection data. Furthermore, the second bit division unit divides the selection data of the collected data unit from the transfer data. Furthermore, the second bit inversion unit restores the selection data of the collected data unit to the first inverted data of the collected data unit and the second inverted data of the collected data unit. Furthermore, the second data selection unit selects the first inverted data of the collected data unit or the second inverted data of the collected data unit, then divides the selected data into respective original input data, and then outputs the respective original input data.

Further, according to a fifteenth aspect of the present invention, a data processing method includes a data conversion step of, when converting a plurality of sequentially input data into transfer data of the same bit number as a data bus having a prescribed bit number and sequentially transferring the transfer data, arranging the input data in each transfer data in a conversion unit using one transfer data as one transfer unit and a prescribed number of transfer units as one conversion unit. The data conversion step includes a first bit division step, a bit comparison step, a bit determination step a first bit inversion step and a first bit coupling step. The first bit division step of dividing the input data into first divided data having a first prescribed bit number and second divided data having a second prescribed bit number. Furthermore, the bit comparison step of comparing a value of each bit in first output data according to the first divided data output at an n-th time (n is a natural number equal to or more than 1) in the data conversion step with a value of each bit in the first divided data input at an (n+1)-th time in the data conversion, and outputting comparison information for the compared bit. Furthermore, the bit determination step of calculating a bit change number indicating the number of bit whose values are different based on the comparison information, determining whether the value of each bit of the first divided data input at the (n+1)-th time is to be inverted for each bit based on the calculated bit change number and a prescribed bit number, and outputting the determination result as inversion information. Furthermore, the first bit inversion step of outputting either first inverted data obtained by inverting values of bit of the first divided data input at the (n+1)-th time for each bit or the first divided data input at the (n+1)-th time as first inversion-processed data based on the inversion information. Furthermore, the first bit coupling step of generating first transfer data in which each bit of the first inversion-processed data and each bit of the second divided data are arranged in respective bit of the data bus, generating coupling data in which the inversion information is coupled at a position of a prescribed unused bit of the first transfer data containing unused bit in which data has not been arranged among the first transfer data in the conversion unit when the first transfer data is output as the transfer data, and outputting either the first transfer data or the coupling data as the transfer data in the data conversion step.

Further, according to a sixteenth aspect of the present invention, a data processing method includes a data conversion step of, when converting a plurality of sequentially input data into transfer data of the same bit number as a data bus having a prescribed bit number and sequentially transferring the transfer data, arranging the input data in each transfer data in a conversion unit using one transfer data as one transfer unit and a prescribed number of transfer units as one conversion unit. In the data conversion step, a first bit position and a second bit position in which values of bit of the input data are inverted for each bit are prescribed. The data conversion step includes a first bit inversion step, a first data selection step, a bit comparison step, a bit change number calculation step, a data determination step and a first bit coupling step. The first bit inversion step of generating first inverted data by inverting values of bit in the first bit position of the input data for each bit and generating second inverted data by inverting values of bit in the second bit position of the input data for each bit. The first data selection step of selecting either the first inverted data or the second inverted data, and outputting the selected data as selection data. The bit comparison step of comparing a value of each bit in first output data according to the selection data output at the n-th time (n is a natural number equal to or more than 1) in the data conversion step with a value of each bit of the first inverted data or the second inverted data of the (n+1)-th time according to the input data input at the (n+1)-th time in the data conversion step, and outputting respective comparison information for the compared bit as first comparison information detected corresponding to the first inverted data and second comparison information detected corresponding to the second inverted data, respectively. The bit change number calculation step of calculating a first bit change number indicating the number of bit whose values are different based on the first comparison information, and calculating a second bit change number indicating the number of bit whose values are different based on the second comparison information. The data determination step of determining whether the first inverted data or the second inverted data of the (n+1)-th time is to be output based on the first bit change number and the second bit change number, and outputting the determination result as inversion information. The first bit coupling step of, when the selection data is output as the transfer data, generating coupling data, which the inversion information is coupled, at a position of a prescribed unused bit of the selection data containing unused bit in which data has not been arranged among the selection data in the conversion unit, and outputting either the selection data or the coupling data as the transfer data in the data conversion step. Further, the first data selection step includes selecting either the first inverted data or the second inverted data of the (n+1)-th time based on the inversion information, and outputting the selected inverted data as (n+1)-th selection data.

Further, according to a seventeenth aspect of the present invention, a data processing method includes a data inverse-conversion step of converting a plurality of input data into transfer data having the same bit number as a data bus having a prescribed bit number, and sequentially inverse-converting transfer data sequentially transferred in a unit of a conversion unit using one transfer data as one transfer unit and a prescribed number of transfer units as one conversion unit to restore the plurality of original input data. The data inverse-conversion step includes a second bit division step, a second bit inversion step and a second bit coupling step. In the second bit division step, a data processing apparatus of a transfer source for the transfer data divides the input data as the transfer data into a first prescribed bit number of first divided data and a second prescribed bit number of second divided data. Furthermore, in the second bit division step, the first inverted data obtained by inverting values of bit of the first divided data for each bit or the first divided data being the first inversion-processed data. Furthermore, in the second bit division step, first transfer data, which each bit of the second divided data and each bit of the first inversion-processed data being arranged in respective bit of the data bus, and inversion information, which indicates whether the first inverted data or the first divided data has been selected as the first inversion-processed data, are input from the data bus as the transfer data from the data processing apparatus of the transfer source. Furthermore, the second bit division step of dividing the transfer data into the inversion information coupled in a position of a prescribed bit of either of the transfer data and the first transfer data; and dividing the first transfer data into the second divided data and the first inversion-processed data. The second bit inversion step of outputting either second inverted data obtained by inverting values of bit of the first inversion-processed data for each bit or the first inversion-processed data as the first divided data based on the inversion information. The second bit coupling step of coupling the first divided data and the second divided data to restore the original input data.

Further, according to a eighteenth aspect of the present invention, a data processing method includes a data inverse-conversion step of converting a plurality of input data into transfer data having the same bit number as a data bus having a prescribed bit number, and sequentially inverse-converting transfer data sequentially received in each conversion unit using one transfer data as one transfer unit and a prescribed number of transfer units as one conversion unit to restore the plurality of original input data. In the data inverse-conversion step, the same setting as setting of a first bit position and a second bit position in which values of bit of the input data are inverted for each bit when a data processing apparatus of a transfer source for the transfer data outputs the transfer data in the conversion unit is prescribed, and the data inverse-conversion step includes: a second bit division step of receiving selection data and inversion information as the transfer data from the data processing apparatus of the transfer source for the transfer data from the data bus, the data processing apparatus of the transfer source for the transfer data generating, as the transfer data, first inverted data obtained by inverting values of bit in the first bit position of the input data for each bit and second inverted data obtained by inverting values of bit in the second bit position for each bit based on the first bit position and the second bit position set in the data processing apparatus of the transfer source for the transfer data, either the first inverted data or the second inverted data being the selection data, and the inversion information indicating whether the first inverted data or the second inverted data has been selected as the selection data, and dividing the transfer data into the inversion information coupled in a position of a prescribed bit of either of the transfer data and the first transfer data; a second bit inversion step of restoring the input selection data to the first inverted data obtained by inverting values of bit in the first bit position of the input data for each bit and the second inverted data obtained by inverting values of bit in the second bit position for each bit; and a second data selection step of selecting either the first inverted data or the second inverted data based on the inversion information, and outputting the selected data as the original input data restored by the data inverse-conversion unit.

BRIEF DESCRIPTION OF DRAWINGS

FIG. 4A is a diagram illustrating a method of generating transfer pixel data in the data conversion unit of the first configuration included in the imaging apparatus of the present embodiment.

FIG. 4B is a diagram illustrating a method of generating transfer pixel data in the data conversion unit of the first configuration included in the imaging apparatus of the present embodiment.

FIG. 5A is a diagram illustrating a method of generating transfer pixel data in the data conversion unit of the first configuration included in the imaging apparatus of the present embodiment.

FIG. 5B is a diagram illustrating a method of generating transfer pixel data in the data conversion unit of the first configuration included in the imaging apparatus of the present embodiment.

FIG. 7A is a diagram illustrating a second data arranging method in the data conversion unit of the first configuration included in the imaging apparatus of the present embodiment.

FIG. 7B is a diagram illustrating a second data arranging method in the data conversion unit of the first configuration included in the imaging apparatus of the present embodiment.

FIG. 10A is a diagram illustrating a method of generating transfer pixel data in the data conversion unit of the second configuration included in the imaging apparatus of the present embodiment.

FIG. 10B is a diagram illustrating a method of generating transfer pixel data in the data conversion unit of the second configuration included in the imaging apparatus of the present embodiment.

FIG. 12 is a diagram illustrating an example of an inversion process application range in the data conversion unit of the third configuration included in the imaging apparatus of the present embodiment.

FIG. 14A is a diagram showing an example in which a data arranging method in the data conversion unit included in the imaging apparatus of the present embodiment is applied to other image data.

FIG. 14B is a diagram showing an example in which the data arranging method in the data conversion unit included in the imaging apparatus of the present embodiment is applied to other image data.

FIG. 15A is a diagram showing an example in which the data arranging method in the data conversion unit included in the imaging apparatus of the present embodiment is applied to other image data.

FIG. 15B is a diagram showing an example in which the data arranging method in the data conversion unit included in the imaging apparatus of the present embodiment is applied to other image data.

FIG. 15C is a diagram showing an example in which the data arranging method in the data conversion unit included in the imaging apparatus of the present embodiment is applied to other image data.

FIG. 16A is a diagram showing an example in which the data arranging method in the data conversion unit included in the imaging apparatus of the present embodiment is applied to other image data.

FIG. 16B is a diagram showing an example in which the data arranging method in the data conversion unit included in the imaging apparatus of the present embodiment is applied to other image data.

FIG. 17A is a diagram showing an example in which the data arranging method in the data conversion unit included in the imaging apparatus of the present embodiment is applied to other data.

FIG. 17B is a diagram showing an example in which the data arranging method in the data conversion unit included in the imaging apparatus of the present embodiment is applied to other data.

FIG. 19 is a diagram showing an example of an arrangement of image data.

FIG. 20A is a diagram showing an example of conventional data packing.

FIG. 20B is a diagram showing an example of conventional data packing.

FIG. 25A is a diagram showing an example in which a data change amount is reduced in a conventional data processing apparatus.

FIG. 25B is a diagram showing an example in which the data change amount is reduced in the conventional data processing apparatus.

FIG. 26A is a diagram showing an example of a data change amount in image data.

FIG. 26B is a diagram showing an example of a data change amount in image data.

DETAILED DESCRIPTION OF EXEMPLARY EMBODIMENTS

Figure 1:
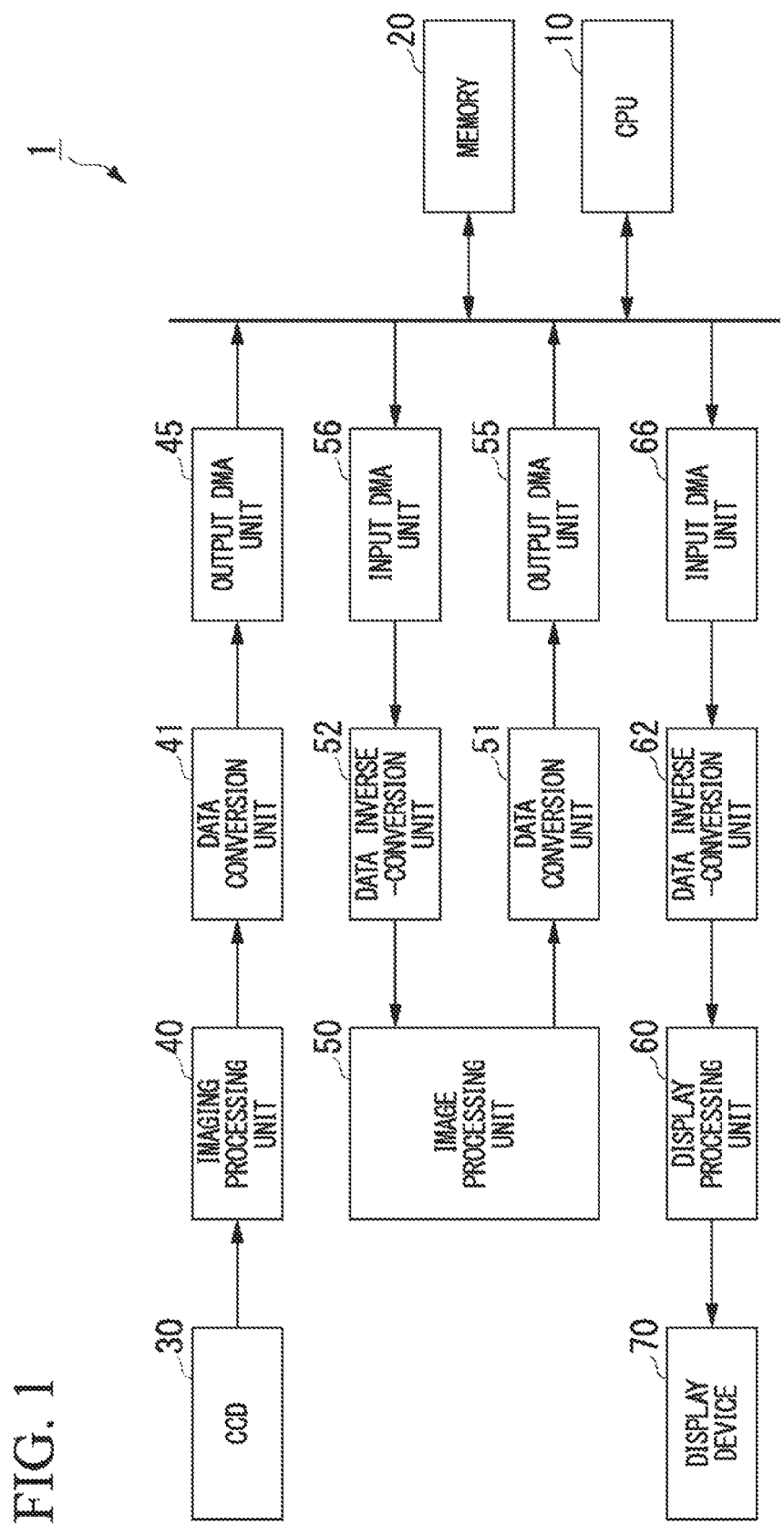
FIG. 1 is a block diagram showing a schematic configuration of an imaging apparatus in an embodiment of the present invention.

Hereinafter, an embodiment of the present invention will be described with reference to the accompanying drawings. FIG. 1 is a block diagram showing a schematic configuration of an imaging apparatus in the present embodiment. The imaging apparatus 1 shown in FIG. 1 includes a CPU 10, a memory 20, a CCD 30, an imaging processing unit 40, an image processing unit 50, a display processing unit 60, a display device 70, data conversion units 41 and 51, data inverse-conversion units 52 and 62, output DMA units 45 and 55, and input DMA units 56 and 66. The imaging apparatus 1 has a function of recording image data obtained through photographing. However, for convenience of description, a case in which image data obtained through photographing is displayed will be described hereinafter. Only a connection of a memory bus that is a data bus associated with pixel data delivery between respective components (processing blocks) in the imaging apparatus 1 is shown in FIG. 1.

The CPU 10 is a control device that performs overall control of the imaging apparatus 1.

The memory 20, for example, is a memory such as a DRAM (Dynamic Random Access Memory) for temporarily storing pixel data processed by each processing block in the imaging apparatus 1. Pixel data in each processing step of each processing block in the imaging apparatus 1 is temporarily stored in the memory 20.

The CCD 30, for example, is a solid-state imaging device having a Bayer arrangement for converting incident subject light into an image signal. The CCD 30 outputs a pixel signal of a subject to the imaging processing unit 40.

The imaging processing unit 40 performs prescribed signal processing on the pixel signal input from the CCD 30 to generate image data.

The image processing unit 50 performs various image processing in the imaging apparatus 1 on the image data generated by the imaging processing unit 40 to generate image data.

The display processing unit 60 converts the image data image-processed by the image processing unit 50 into display data according to the display device 70. The display processing unit 60 outputs the converted display data to the display device 70.

The display device 70, for example, is a display device such as a liquid crystal display for displaying the display data.

In the imaging apparatus 1 of the present embodiment, a pixel signal of a subject captured by the CCD 30 is processed by the imaging processing unit 40, the image processing unit 50, and then the display processing unit 60, and displayed on the display device 70. In this case, the image data in each processing step is delivered between the respective processing blocks via the memory 20. The data conversion units 41 and 51, the data inverse-conversion units 52 and 62, the output DMA units 45 and 55, and the input DMA units 56 and 66 in the imaging apparatus 1 are processing blocks associated with delivery of the image data in each processing step.

The data conversion unit 41 or 51 arranges respective pixel data in the image data input from a preceding processing block (the imaging processing unit 40 or the image processing unit 50 in the present embodiment shown in FIG. 1) in respective bit of the memory bus using a prescribed arranging (packing) method. Configurations of the data conversion units 41 and 51 and a pixel data packing method in the data conversion units 41 and 51 will be described in detail later.

The output DMA unit 45 or 55 writes (stores) the image data consisting of the pixel data packed in respective bit of the memory bus by the data conversion unit 41 or 51 to the memory 20 through DMA access.

The input DMA unit 56 or 66 reads the image data stored in the memory 20 through DMA access. The input DMA unit 56 or 66 outputs the read image data to the data inverse-conversion unit 52 or 62.

The data inverse-conversion unit 52 or 62 restores the pixel data contained in the image data input from the DMA unit 56 or 66 to original image data using a method reverse to the prescribed arranging (packing) method and outputs the original image data to a subsequent processing block (the image processing unit 50 or the display processing unit 60 in the present embodiment shown in FIG. 1). Configurations of the data inverse-conversion units 52 and 62 will be described in detail later.

Here, image data processing in the imaging apparatus 1 shown in FIG. 1 will be described. In a photographing operation in the imaging apparatus 1, image data processing is performed in the following order.

(Step 1): First, the imaging processing unit 40 performs prescribed signal processing on a pixel signal of a subject captured by the CCD 30 to generate image data (e.g., image data according to a pixel arrangement of the CCD 30). The imaging processing unit 40 transfers the generated image data to the memory 20 via the data conversion unit 41 and the output DMA unit 45 and temporarily stores the image data.

(Step 2): Subsequently, the image processing unit 50 reads the image data temporarily stored in the memory 20 via the input DMA unit 56 and the data inverse-conversion unit 52. The image processing unit 50 performs image processing for recording or display on the read image data to generate image data (e.g., RGB data, or YCbCr data having a YC422 dot sequential format). Then, the image processing unit 50 transfers the generated image data to the memory 20 via the data conversion unit 51 and the output DMA unit 55 again and temporarily stores the image data.

(Step 3): Subsequently, the display processing unit 60 reads the image data subjected to image processing for displaying by the image processing unit 50 or image data for OSD (On-Screen Display) for displaying separately stored in the memory 20, via the input DMA unit 66 and the data inverse-conversion unit 62, and causes the display device 70 to display the image data.

When recording the image data obtained through photographing by the imaging apparatus 1, a recording processing unit for performing an image data recording process, which is not shown, reads the image data subjected to image processing for recording by the image processing unit 50 via an input DMA unit and a data inverse-conversion unit, which are not shown. Furthermore, the recording processing unit records the read image data for recording in an image data recording unit, such as a memory card, that is not shown. Furthermore, when the imaging apparatus 1, for example, has a function of inputting/outputting sound, an audio processing unit for performing audio processing, which is not shown, stores audio data upon photographing in the memory 20 via a data conversion unit and an output DMA unit that are not shown. Furthermore, the audio processing unit reads audio data stored in the memory 20 via an input DMA unit and a data inverse-conversion unit, which are not shown, and causes a sound output unit such as a speaker, which is not shown, to output sound according to the read audio data.

<First Configuration>

Next, the data conversion units in the imaging apparatus 1 will be described. As described above, the data conversion unit 41 and the data conversion unit 51 differ from each other only in preceding and subsequent processing blocks connected thereto. More specifically, as shown in FIG. 1, the data conversion unit 41 is arranged between the preceding imaging processing unit 40 and the subsequent output DMA unit 45. The data conversion unit 51 is arranged between the preceding image processing unit 50 and the subsequent output DMA unit 55. Accordingly, the data conversion unit 41 and the data conversion unit 51 differ from each other only in data formats (formats) of input image data and output image data. Hereinafter, the data conversion unit 41 will be described as representative.

Figure 19:
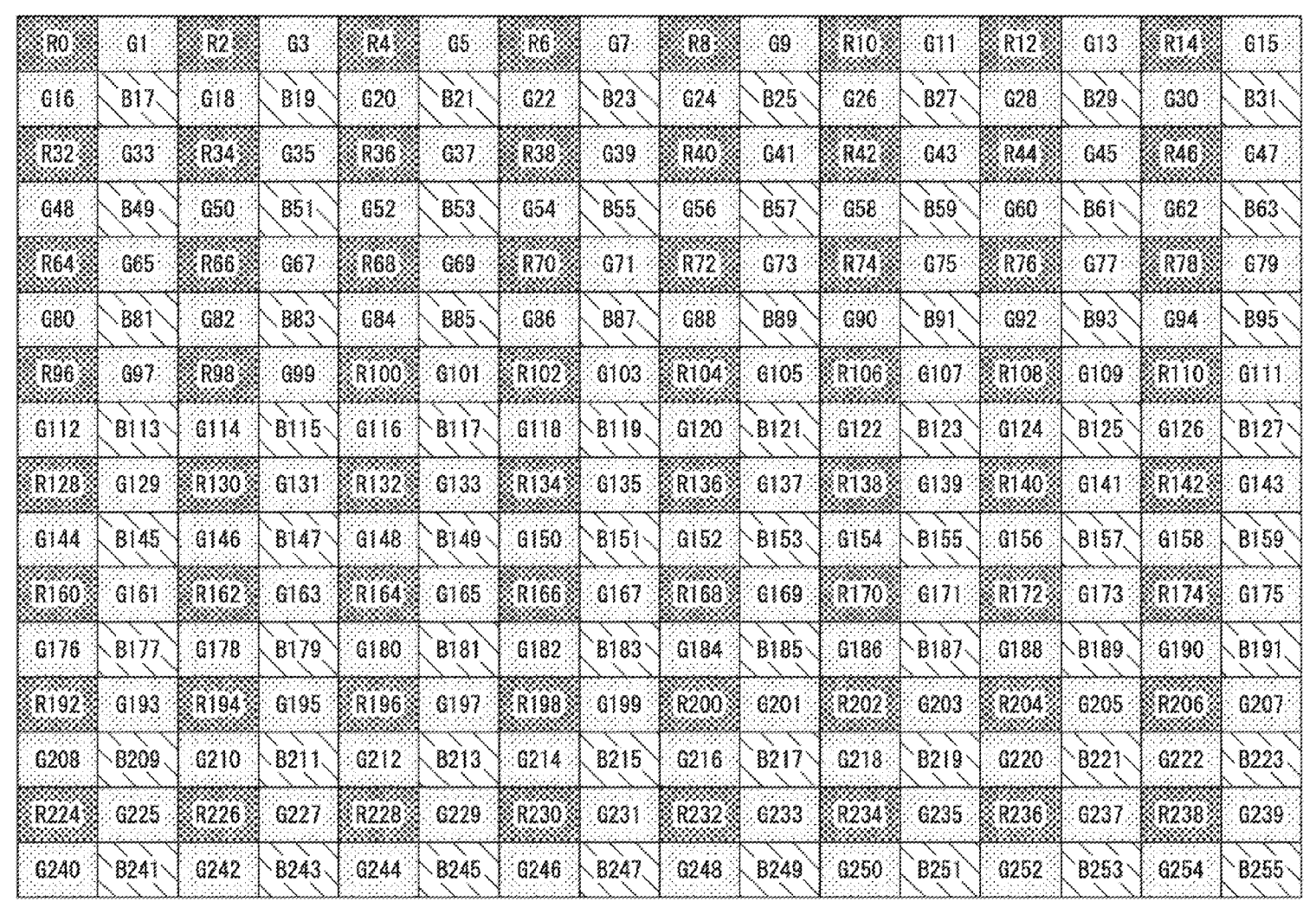

The image data having a 16×16 Bayer arrangement as shown in FIG. 19 (hereinafter referred to as "Bayer data") is input to the data conversion unit 41. The data conversion unit 41 arranges (packs) pixel data in the input Bayer data in a memory bus using a prescribed packing method to output packed data. For example, when a bit number of each pixel data in the Bayer data is 10 and a bus width of the memory bus (memory bus width) is 32 bit, the data conversion unit 41 set a packing unit of each pixel data in the Bayer data is four transfers and the four transfers form a unit of one burst transfer. That is, the data conversion unit 41 outputs 32-bit packed data which is packed in one burst is a pixel data packing unit. In the Bayer data shown in FIG. 19, numbers of the pixel data represent positions of a pixel in the CCD 30, and "R", "G", and "B" before the numbers represent colors of the pixel in the CCD 30. More specifically, "R" represents pixel data of a red pixel of the CCD 30, "G" represents pixel data of a green pixel of the CCD 30, and "B" represents pixel data of a blue pixel of the CCD 30.

The data conversion unit 41 arranges data of each bit of 10-bit pixel data sequentially input from the imaging processing unit 40 in each bit of a memory bus to generate 32-bit packed data using any one of prescribed packing methods, which will be described. The data conversion unit 41, for example, sequentially outputs the generated packed data based on a data enable signal, which is not shown, input from the output DMA unit 45. The data enable signal is a signal indicating timing to transfer packed data when the output DMA unit 45 performs burst transfer.

When the data conversion unit 41 generates packed data, the data conversion unit 41 first compares input pixel data for each bit to generate pixel data in which a bit change is small (hereinafter referred to as "transfer pixel data"). More specifically, the data conversion unit 41 divides the input pixel data into a prescribed bit number of upper pixel data and lower pixel data. The data conversion unit 41 compares a value of each bit of previously output lower pixel data with a value of each bit of the currently divided lower pixel data to generate lower pixel data in which the number of bit whose values have changed from the previously output lower pixel data is small. The data conversion unit 41 then couples the lower pixel data and the currently divided upper pixel data to obtain transfer pixel data. Also, the data conversion unit 41 outputs information when the transfer pixel data is generated, according to the number of bit of the lower pixel data whose values have changed (bit change number).

The data conversion unit 41 then arranges (packs) data of each bit of the transfer pixel data in each bit of a data bus corresponding to the memory bus (since this data bus corresponds to each bit of the memory bus, it is hereinafter described as "memory bus") using a prescribed packing method, and outputs packed data to be finally output. The data conversion unit 41 adds information when the transfer pixel data is generated, in an unused bit present in the packing unit (four transfers) and outputs the information together with the packed data.

As described above, the data conversion unit 41 can generate the transfer pixel data each time the pixel data is input, and sequentially pack the generated transfer pixel data and the information when the transfer pixel data is generated, to sequentially output the packed data. On the other hand, the data conversion unit 41, for example, may include a memory unit for temporarily storing 32-bit packed data for one burst, that is, the packing unit (four transfers). In this case, the data conversion unit 41 temporarily stores the input pixel data in the memory unit, and generates the transfer pixel data based on each stored pixel data. Furthermore, the data conversion unit 41 performs packing of the generated transfer pixel data and addition of the information when the transfer pixel data is generated.

Alternatively, the data conversion unit 41 may packs the input pixel data firstly, and then may performs generation of the packed data in which bit change is small and addition of the information when the packed data is generated. In this case, the data conversion unit 41 treats the first packed data as the input pixel data and then processes.

Figure 2:
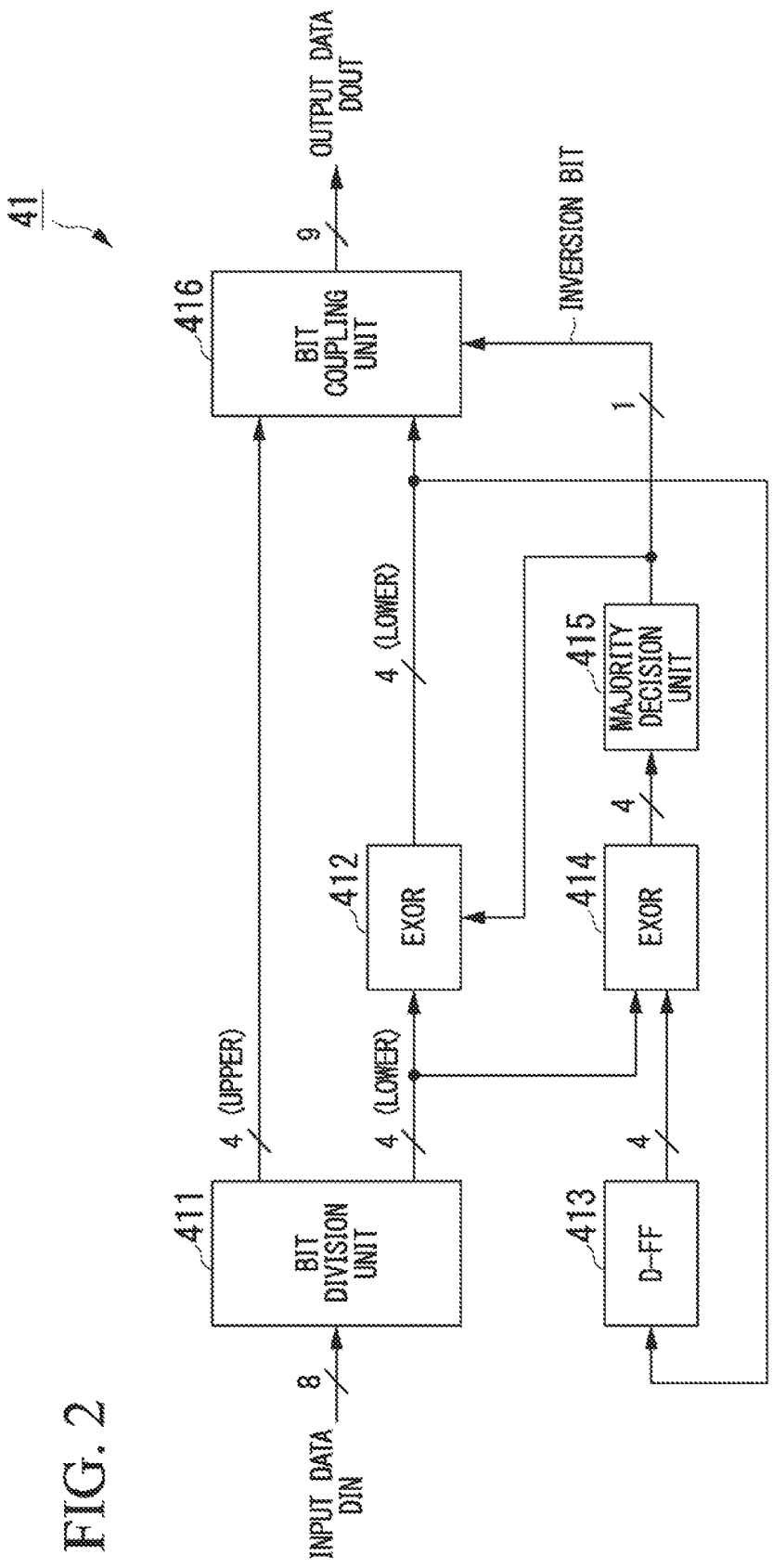
FIG. 2 is a block diagram showing a schematic configuration of a data conversion unit of a first configuration included in the imaging apparatus of the present embodiment.

FIG. 2 is a block diagram showing a schematic configuration of the data conversion unit 41 of the first configuration included in the imaging apparatus 1 of the present embodiment. As shown in FIG. 2, the data conversion unit 41 includes a bit division unit 411, an EXOR (exclusive OR) circuit 412, a D-FF 413, an EXOR circuit 414, a majority decision unit 415, and a bit coupling unit 416.

As described above, the data conversion unit 41 packs transfer pixel data in which the number of bit in the input 10-bit pixel data whose values have changed is small and generates 32-bit packed data to be finally output by the data conversion unit 41. However, for convenience of a description, a case in which 8-bit pixel data is sequentially input to the data conversion unit 41, transfer pixel data is generated from the input pixel data, and 9-bit packed data in which information when the transfer pixel data is generated has been added is output will be hereinafter described. That is, a case in which the data conversion unit 41 packs one transfer pixel data to generate packed data will be described. A detailed description of a method of packing a plurality of transfer pixel data to generate packed data will be described later.

Hereinafter, in order to distinguish between 10-bit pixel data and 8-bit pixel data input to the data conversion unit 41, the 8-bit pixel data is represented as input data DIN [7:0]. In order to distinguish between 32-bit packed data and 9-bit packed data, the 9-bit packed data is hereinafter represented as output data DOUT [8:0]. Hereinafter, bit of the input data DIN or the output data DOUT are not specified. That is, when an entire bit range of the input data DIN or the output data DOUT is indicated, numbers in "[ ]: brackets" indicating a bit range of the data will be omitted.

Hereinafter, a case in which the 8-bit input data DIN is divided into 4 upper bit and 4 lower bit to generate transfer pixel data in which a bit change is small will be described.

The bit division unit 411 divides the input 8-bit input data DIN [7:0] into 4-bit upper input data DIN [7:4] and 4-bit lower input data DIN [3:0]. The bit division unit 411 outputs the input data DIN [7:4] to the bit coupling unit 416 and outputs the input data DIN [3:0] to the EXOR circuit 412 and the EXOR circuit 414.

The EXOR circuit 412 outputs inverted data [3:0] obtained by inverting values of bit of the lower input data DIN input from the bit division unit 411 for each bit ("1"→"0", or "0"→"1") or non-inverted data [3:0] containing the value of each bit of the lower input data DIN as it is, to the bit coupling unit 416 and the D-FF 413 according to an inversion bit input from the majority decision unit 415. Hereinafter, the inverted data or the non-inverted data output from the EXOR circuit 412 is referred to as "lower image data". The 4-bit upper input data DIN output from the bit division unit 411 is referred to as "upper image data". Hereinafter, a process in which the EXOR circuit 412 outputs the inverted data or the non-inverted data according to the inversion bit input from the majority decision unit 415 is referred to as "inversion process".

The D-FF 413 stores the lower image data [3:0] output from the EXOR circuit 412. The lower image data stored in the D-FF 413 is output as 4-bit lower output data DOUT [3:0] of previous output data DOUT to the EXOR circuit 414.

The EXOR circuit 414 compares values of the respective bit of two data, i.e., the lower input data DIN [3:0] input from the bit division unit 411 and the lower output data DOUT [3:0] input from the D-FF 413, and detects whether or not there is a bit whose value has changed. The EXOR circuit 414 outputs, for each compared bit, a value "1" indicating that the bit is a bit whose value has changed or a value "0" indicating that the bit is not the bit whose value has changed.

More specifically, in the comparison of the two data in the EXOR circuit 414, exclusive OR of each bit of the lower input data DIN and each bit of the lower output data DOUT is taken. Accordingly, when the value of the bit of the lower input data DIN is equal to that of the bit of the lower output data DOUT, "0" is output. When the value of the bit of the lower input data DIN is not equal to that of the bit of the lower output data DOUT, "1" is output.

The majority decision unit 415 calculates the number of bit whose values change (a bit change number) when the lower input data DIN [3:0] is next output as the lower output data DOUT [3:0] based on the result of detecting whether or not there is a bit whose value has changed, which is input from the EXOR circuit 414. The majority decision unit 415 performs majority decision of the calculated bit change number and the bit number (data width: 4 bit) of the lower input data DIN, and determines whether the inverted data or the non-inverted data is to be output as lower image data. Accordingly, the majority decision unit 415 performs the majority decision based on the bit change number between the output data DOUT obtained by subjecting the previous input data DIN to the inversion process and the current input data DIN. The majority decision unit 415 outputs information indicating the determined data as the inversion bit to the EXOR circuit 412 and the bit coupling unit 416.

The majority decision in the majority decision unit 415 is made based on whether or not the calculated bit change number is a majority of the bit number of the lower input data DIN. More specifically, if the bit change number accounts the majority of the bit number of the lower input data DIN (>2), the majority decision unit 415 determines that the inverted data is to be output and outputs a value "1" as the inversion bit. If the bit change number is equal to or less than half of the bit number of the lower input data DIN (≤2), the majority decision unit 415 determines that the non-inverted data is to be output, and outputs a value "0" as the inversion bit. The inversion process in the EXOR circuit 412 is performed according to the value of the inversion bit.

In the inversion process in the EXOR circuit 412, exclusive OR of each bit of the lower input data DIN and the inversion bit is taken. Accordingly, the lower image data according to the inversion bit is output from the EXOR circuit 412. More specifically, if the inversion bit is "1", the inverted data [3:0] obtained by inverting the value of each bit of the lower input data DIN [3:0] is output. If the inversion bit is "0", non-inverted data [3:0] containing the value of each bit of the lower input data DIN [3:0] as it is output.

Further, the majority decision in the majority decision unit 415 is performed based on the bit change number between the previously output lower output data DOUT and the currently output lower output data DOUT, as described above. However, for example, if the bit number of the lower input data DIN is an even number, there is a case in which the bit change number is half of the bit number of the lower input data DIN. In this case, the EXOR circuit 412 may output either the inverted data or the non-inverted data as the lower image data.

However, since the inversion bit is added to the output data DOUT (packed data) and then output, if the inversion bit is changed to the other value according to the inversion processing result, the change in the inversion bit is added to the change number of each bit of the lower output data DOUT. Accordingly, for a bit change number of the currently output lower output data DOUT with respect to the previously output lower output data DOUT to be minimized, it is preferable to output the lower image data in consideration of the whole involving the lower output data DOUT and the inversion bit. Accordingly, the majority decision unit 415 performs the majority decision involving the inversion bit. More specifically, the majority decision unit 415 performs the majority decision based on whether the previously output lower output data DOUT was the inverted data or the non-inverted data, that is, whether the inversion bit is "1" or "0". If the bit change number is half (=2) of the bit number of the lower input data DIN, the majority decision unit 415 outputs an inversion bit having the same value as the inversion bit corresponding to the previously output lower output data DOUT, as the inversion bit corresponding to the currently output lower output data DOUT. Accordingly, it is possible to prevent the change in the inversion bit from being added to the change number of each bit of the lower output data DOUT.

The bit coupling unit 416 couples the upper image data [7:4] input from the bit division unit 411 and the lower image data [3:0] output from the EXOR circuit 412 to generate transfer pixel data [7:0]. The bit coupling unit 416 also adds (bit-couples) the inversion bit input from the majority decision unit 415 in an upper bit next to the most significant bit of the generated transfer pixel data to generate output data DOUT [8:0]. The output data DOUT generated here is output to the output DMA unit 45 as the output data DOUT (packed data) to be finally output from the data conversion unit 41.

Next, the data inverse-conversion units in the imaging apparatus 1 will be described. As described above, the data inverse-conversion unit 52 and the data inverse-conversion unit 62 differ from each other only in the preceding and subsequent processing blocks connected thereto. More specifically, as shown in FIG. 1, the data inverse-conversion unit 52 is arranged between the preceding input DMA unit 56 and the subsequent image processing unit 50. On the other hand, the data inverse-conversion unit 62 is arranged between the preceding input DMA unit 66 and the subsequent display processing unit 60. Accordingly, the data inverse-conversion unit 52 and the data inverse-conversion unit 62 differ from each other only in data formats (formats) of input image data and output image data. Hereinafter, the data inverse-conversion unit 52 will be described as representative.

Hereinafter, a case in which the packed data of one burst in which four transfers constitute a packing unit, which has been packed by the data conversion unit 41, is input to the data inverse-conversion unit 52 via the input DMA unit 56 and restores the Bayer data shown in FIG. 19 will be described. Accordingly, a description will be given on the assumption that a bit number of each pixel data in the Bayer data is 10 and a memory bus width is 32 bit.

The data inverse-conversion unit 52 restores data arranged in each bit of 32-bit packed data sequentially input from the input DMA unit 56 to original image data (Bayer data) to be image-processed by the image processing unit 50 using a method that is reverse to any of prescribed packing methods, which will be described later, to restore the 10-bit pixel data. The data inverse-conversion unit 52 sequentially outputs the restored original pixel data, for example, based on a data enable signal, which is not shown, input from the image processing unit 50. The data enable signal is a signal indicating timing to output to the image processing unit 50.

When the data inverse-conversion unit 52 restores the pixel data, the data inverse-conversion unit 52 first sequentially splits (unpacks) respective data (hereinafter described as "transfer pixel data" since this data is the same as the transfer pixel data generated by the data conversion unit 41) from the input 32-bit packed data (this packed data is the same as the packed data generated by the data conversion unit 41) using a method reverse to the packing method in the data conversion unit 41.

The data inverse-conversion unit 52 then generates each pixel data using a method reverse to the method of generating the packed data in the data conversion unit 41 based on information when the transfer pixel data is generated, which has been added in the unused bit present in the packing unit (four transfers).

More specifically, the data inverse-conversion unit 52 divides the transfer pixel data into a prescribed bit number of upper transfer pixel data and lower transfer pixel data. The data inverse-conversion unit 52 performs the inversion process on the lower transfer pixel data based on the information when the transfer pixel data is generated. The data inverse-conversion unit 52 then couples the inverted lower transfer pixel data to the currently divided upper transfer pixel data to generate original pixel data.

Each time the packed data is input from the input DMA unit 56, the data inverse-conversion unit 52 can split the packed data into transfer pixel data and sequentially perform the inversion process on the split transfer pixel data, as described above. However, the data inverse-conversion unit 52, for example, may include a memory unit for temporarily storing 32-bit packed data for one burst, that is, the packing unit (four transfers). In this case, the data inverse-conversion unit 52 temporarily stores the packed data input from the input DMA unit 56 in the memory unit, and splits the transfer pixel data from the respective stored packed data, and performs the inversion process based on the information when the transfer pixel data is generated.

Alternatively, the data inverse-conversion unit 52 may includes a configuration that the packed data input from the input DMA unit 56 is first split into packed data in which a bit change is small and the information when the packed data is generated, restored to the original packed data, and split (unpacked) into the respective pixel data arranged in the original packed data. In this case, the data inverse-conversion unit 52 treats and then processed the packed data input from the input DMA unit 56 as the transfer pixel data.

Figure 3:
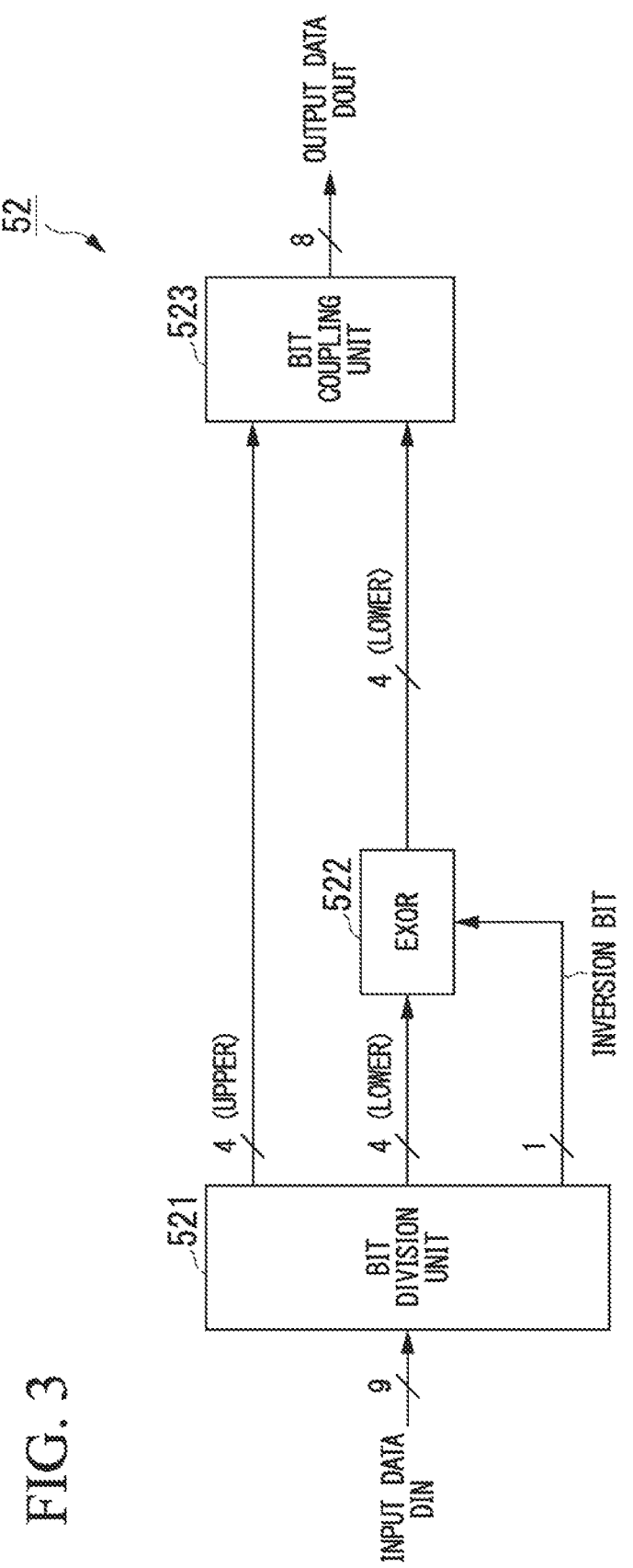
FIG. 3 is a block diagram showing a schematic configuration of a data inverse-conversion unit of the first configuration included in the imaging apparatus of the present embodiment.

FIG. 3 is a block diagram showing a schematic configuration of the data inverse-conversion unit 52 of the first configuration included in the imaging apparatus 1 of the present embodiment. As shown in FIG. 3, the data inverse-conversion unit 52 includes a bit division unit 521, an EXOR circuit 522, and a bit coupling unit 523.

As described above, the data inverse-conversion unit 52 splits transfer pixel data from the 32-bit packed data input from the input DMA unit 56 and performs an inversion process on the split transfer pixel data to generate original pixel date. However, for convenience of description, a case in which 9-bit packed data in which the information when the transfer pixel data is generated has been added is input from the input DMA unit 56 to the data inverse-conversion unit 52 and the original pixel data is generated from the transfer pixel data split from the packed data will be hereinafter described. That is, a case in which the data inverse-conversion unit 52 restores one pixel data from the packed data in which one transfer pixel data has been packed will be described.

Hereinafter, in order to distinguish between 32-bit packed data and 9-bit packed data, the 9-bit packed data is represented as input data DIN [8:0]. In order to distinguish between 10-bit pixel data and 8-bit pixel data, the 8-bit pixel data is hereinafter referred to as output data DOUT [7:0]. Hereinafter, bit of the input data DIN or the output data DOUT are not specified. That is, when an entire bit range of the input data DIN or the output data DOUT is indicated, numbers in "[ ]: brackets" indicating a bit range of the data will be omitted.

Hereinafter, a case in which an inversion bit, which is information when the transfer pixel data is generated, has been added in the most significant bit (input data DIN [8]) of the 9-bit packed data and the transfer pixel data is divided into 4 upper bit and 4 lower bit to restore original pixel data will be described.

The bit division unit 521 divides the input 9-bit input data DIN [8:0] into the highest input data DIN [8], that is, the inversion bit and input data DIN [7:0], that is, the transfer pixel data. Further, the bit division unit 521 divides the input data DIN [7:0] into 4-bit upper input data DIN [7:4] and 4-bit lower input data DIN [3:0]. The bit division unit 521 outputs the input data DIN [7:4] to the bit coupling unit 523 and outputs the input data DIN [8] and the input data DIN [3:0] to the EXOR circuit 522.

The EXOR circuit 522 outputs lower data [3:0] obtained by inverting the values of bit of the lower input data DIN input from the same bit division unit 521 for each bit ("1"→"0", or "0"→"1") or lower data [3:0] containing a value of each bit of the lower input data DIN as it is, to the bit coupling unit 523 according to the inversion bit input from the bit division unit 521. Since the lower data output by the EXOR circuit 522 is the same as the inverted data or the non-inverted data generated by the data conversion unit 41, the lower data is hereinafter described as "inverted data" or "non-inverted data". Hereinafter, the inverted data or the non-inverted data output from the EXOR circuit 522 is referred to as "lower image data", similar to the data conversion unit 41. Since the 4-bit upper input data DIN output from the bit division unit 521 is the same as the upper image data in the data conversion unit 41, the upper input data DIN is referred to as "upper image data". Hereinafter, a process in which the EXOR circuit 522 outputs the inverted data or the non-inverted data according to the inversion bit input from the bit division unit 521 is referred to as "inversion process", similar to the data conversion unit 41.

In the inversion process in the EXOR circuit 522, exclusive OR of each bit of the lower input data DIN and the inversion bit is taken, similar to the EXOR circuit 412 in the data conversion unit 41. Accordingly, the lower image data according to the inversion bit is output from the EXOR circuit 522. That is, when the inversion bit is "1", the inverted data [3:0] obtained by inverting the value of each bit of the lower input data DIN [3:0] is output from the EXOR circuit 522, and when the inversion bit is "0", non-inverted data [3:0] containing the value of each bit of the lower input data DIN [3:0] as it is output, similar to the EXOR circuit 412.

The bit coupling unit 523 couples the upper image data [7:4] input from the bit division unit 521 and the lower image data [3:0] output from the EXOR circuit 522 to generate output data DOUT [7:0]. The output data DOUT generated here is output as original pixel data restored by the data inverse-conversion unit 52, that is, input to the data conversion unit 41 to the image processing unit 50.

<Inversion Processing Method>

Next, a method of generating transfer pixel data in the data conversion unit 41 will be described. FIGS. 4A and 4B are diagrams illustrating the method of generating transfer pixel data in the data conversion unit 41 of the first configuration included in the imaging apparatus 1 of the present embodiment. Hereinafter, for convenience of description, a case in which 8-bit input data DIN is input to the data conversion unit 41 and 9-bit output data DOUT is output will be described. Here, a case in which the same data as input data shown in FIG. 25A is input as input data DIN to the data conversion unit 41 is considered. A case in which the data conversion unit 41 packs one transfer pixel data to generate packed data will be described. FIG. 4A shows the input data shown in FIG. 25A (input data DIN) and a bit change number of lower input data DIN. FIG. 4B shows output data DOUT output from the data conversion unit 41 and an inversion bit (packed data), and a bit change number of all output data DOUT.

The input data DIN as shown in FIG. 4A is sequentially input to the data conversion unit 41 in time series from a top column to a bottom column. Each time the input data DIN is input, the data conversion unit 41 sequentially compares values of respective bit of the lower input data DIN. More specifically, the data conversion unit 41 compares a value of each bit of the lower input data DIN with a value of the lower input data DIN in an upper column in each column of the input data DIN shown in FIG. 4A to calculate a bit change number.

Accordingly, the bit change numbers of the lower input data DIN as shown in FIG. 4A are obtained.

As can be seen from FIG. 4A, in the bit change numbers of the lower input data DIN [3:0] in the input data DIN input to the data conversion unit 41, the bit change numbers of columns "A" exceed half.

The data conversion unit 41 performs an inversion process on the lower input data DIN to generate transfer pixel data according to the calculated bit change number. Furthermore, the data conversion unit 41 adds an inversion bit in an upper bit next to the most significant bit of the generated transfer pixel data, and sequentially outputs the packed data as shown in FIG. 4B as packed data to be finally output. As can be seen from FIG. 4B, a sum of the bit change numbers in the transfer pixel data contained in the packed data generated by the data conversion unit 41 is 26 bit. A data change amount is reduced by 4 bit over the inversion process performed in a conventional data processing apparatus shown in FIG. 25B.

Thus, the data conversion unit 41 sequentially compares the values of the respective bit of the lower input data DIN in which data correlation is low (a data change frequency is high), and performs the inversion process on the lower input data DIN in which the bit change number is great. Accordingly, a total data change amount in data transfer can be reduced over the inversion process performed in the conventional data processing apparatus shown in FIG. 24. That is, a greater effect of reduction of the data change amount can be obtained by the inversion process. In column "B" of FIG. 4B, the bit change number of the transfer pixel data accounts a majority. This is caused by a great bit change number of the upper input data DIN.

Figure 24:
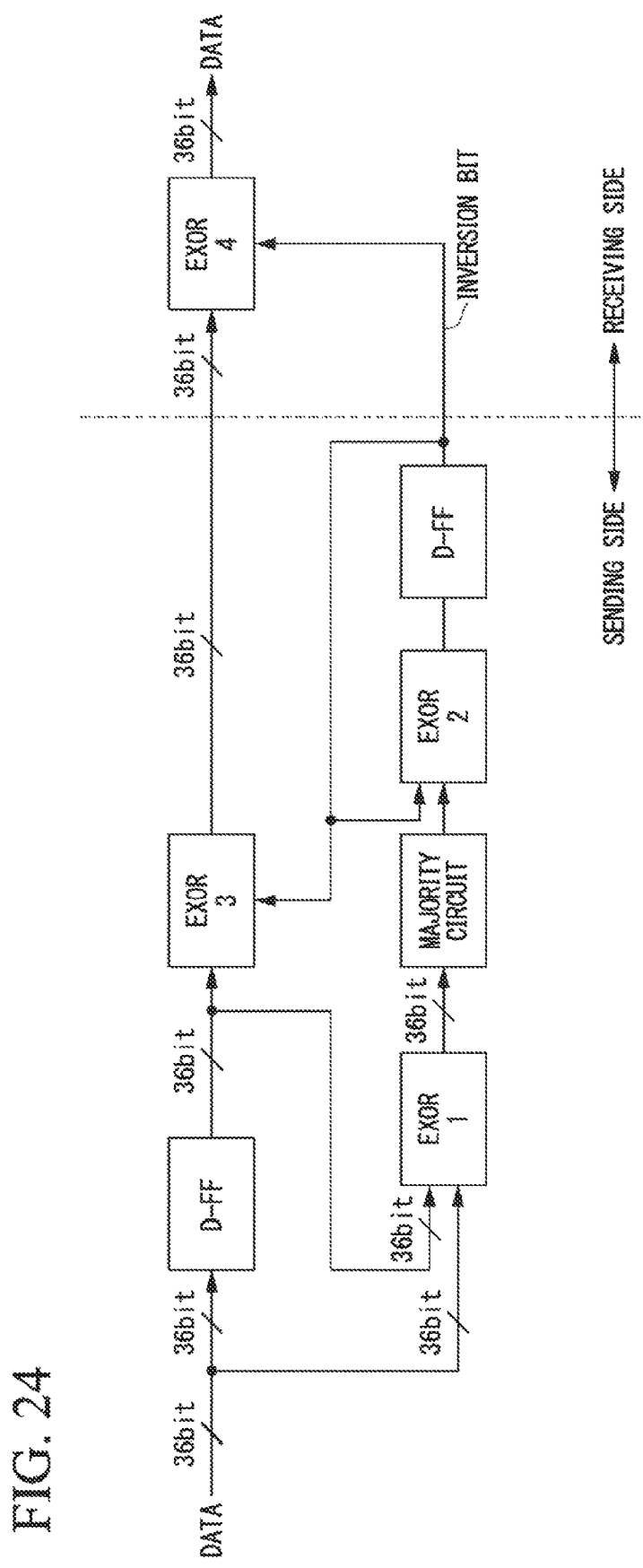
FIG. 24 is a block diagram showing a schematic configuration of a conventional data processing apparatus.

Further, the conventional data processing apparatus shown in FIG. 24 performs the inversion process on all bit of the input data. On the other hand, the data conversion unit 41 performs the inversion process on the lower bit of the input data DIN. Accordingly, an effect of reduction of a circuit scale, including the majority decision unit 415, in the data conversion unit 41 according to the inversion process can also be obtained.

Here, the bit change number considering the inversion bit is considered. FIGS. 5A and 5B are diagrams illustrating a method of generating transfer pixel data in the data conversion unit 41 of the first configuration included in the imaging apparatus 1 of the present embodiment. In FIGS. 5A and 5B, a method of generating packed data in which the output data DOUT plus the inversion bit shown in FIG. 4B has been considered is shown. In FIG. 5A, the output data DOUT and the inversion bit (packed data) shown in FIG. 4B, and a bit change number of the all output data DOUT including the inversion bit are shown. In FIG. 5B, output data DOUT, which is generated by the determination in consideration of the inversion bit and the inversion bit (packed data), and the bit change number of all packed data are shown.

For the bit change number of the output data DOUT plus the inversion bit shown in FIG. 4B, the change of the inversion bit is added to the bit change number, as shown in FIG. 5A. Accordingly, in the case of FIG. 5A, the bit change number can be reduced over the bit change number when the inversion bit is included in the conventional data processing apparatus shown in FIG. 25B, but the effect of reduction of the data change amount that can be obtained is small. As can be seen from FIG. 5A, the bit change numbers of columns "C" exceed half.

As the majority decision unit 415 performs the majority decision involving the inversion bit, the packed data as shown in FIG. 5B is packed data to be finally output. As can be seen from FIG. 5B, a sum of the bit change numbers in transfer pixel data contained in the packed data that the data conversion unit 41 has generated in consideration of the inversion bit is 28 bit. Although not shown, a sum of the bit change numbers when the inversion bit is considered in the conventional data processing apparatus shown in FIG. 25B is 33 bit. Thus, even when the inversion bit is included; the data change amount can be reduced over the inversion process in a conventional data processing apparatus. In column "D" of FIG. 5B, the bit change number of the transfer pixel data holds a majority. This is caused by a great bit change number of the upper input data DIN.

Next, a method of arranging (packing) the pixel data will be described. In the imaging apparatus 1 of the present embodiment, the data conversion unit 41 or 51 arranges input pixel data on the memory bus to generate packed data, and the data inverse-conversion unit 52 or 62 restores the input packed data to the original pixel data. Hereinafter, a case in which respective pixel data in the Bayer data shown in FIG. 19 is sequentially input to the data conversion unit 41 and packed into packed data of one burst in which four transfers constitute a packing unit will be described. It is assumed that a bit number of each pixel data in the Bayer data is 10 bit, and a memory bus width is 32 bit. It is also assumed that pixel data for 3 pixels per one transfer is arranged in the 32-bit memory bus.

Further, since a method of restoring the packed data to the original pixel data in the data inverse-conversion unit 52 or 62 is reverse to the pixel data packing method in the data conversion unit 41 or 51, a detailed description thereof will be omitted.

Hereinafter, a case in which each 10-bit pixel data is divided into 6 upper bit and 4 lower bit, and an inversion bit common to 4 lower bit of three pixel data included in one transfer is added in a lower bit among unused bit present in one transfer will be described. Accordingly, the majority decision unit 415 treats 12-bit pixel data (=4 bit×3 pixels) as the lower input data DIN in the description of FIG. 2, performs majority decision, and outputs one inversion bit according to the result of the majority decision. The upper input data DIN in the description of FIG. 2 is 18-bit pixel data (=6 bit×3 pixels).

<First Data Arranging Method>

Figures 6A, 6B:
FIG. 6A is a diagram illustrating a first data arranging method in the data conversion unit of the first configuration included in the imaging apparatus of the present embodiment.
FIG. 6B is a diagram illustrating a first data arranging method in the data conversion unit of the first configuration included in the imaging apparatus of the present embodiment.

FIGS. 6A and 6B are diagrams illustrating a first data arranging method in the data conversion unit 41 of the first configuration included in the imaging apparatus 1 of the present embodiment. In FIG. 6A, packed data in which each bit of pixel data is arranged using a conventional burst unit-based data arranging method (packing method) is shown. In FIG. 6B, an arrangement of data in the packed data in which an inversion bit for the pixel data in the packed data has been added by the data conversion unit 41 is shown. Hereinafter, a case in which the data conversion unit 41 generates the packed data shown in FIG. 6B in which inversion-processed pixel data is arranged in the same arrangement as the arrangement of the pixel data in the packed data shown in FIG. 6A will be described.

In the first packing method, lower bit of respective pixel data to be arranged in the memory bus of one transfer are collected and inversion-processed, and upper bit of the pixel data and the inversion-processed lower bit of the pixel data are arranged in the memory bus of one transfer. Further, the inversion bit indicating information when the lower bit of the pixel data are inversion-processed is added in an unused bit present in the memory bus of one transfer to obtain final data of one transfer.

As shown in FIGS. 6A and 6B, since three pixel data are contained in each data of one transfer, the data conversion unit 41 treats the three pixel data as one data. Accordingly, the data conversion unit 41, for example, includes a memory unit for temporarily storing three pixel data. The data conversion unit 41 temporarily stores three sequentially input pixel data in the memory unit, and performs an inversion process, packing, and addition of the inversion bit based on the respective stored pixel data.

More specifically, first, when three pixel data "R0", "G1" and "R2" of the first transfer are input to the bit division unit 411, the bit division unit 411 stores the respective input pixel data. The bit division unit 411 outputs data of 18 bit, bit [9] to [4] of "R0", bit [9] to [4] of "G1", and bit [9] to [4] of "R2" stored in the memory unit, as the upper image data [17:0] of the first transfer, to the bit coupling unit 416. The bit division unit 411 outputs data of 12 bit, bit [3] to [0] of "R0", bit [3] to [0] of "G1", and bit [3] to [0] of "R2" stored in the memory unit, as the lower pixel data [11:0] of the first transfer, to the EXOR circuit 412 and the EXOR circuit 414.

Here, since the lower pixel data [11:0] of the first transfer is data to be first output in burst transfer, a value "0" is output as the inversion bit from the majority decision unit 415. Accordingly, the EXOR circuit 412 outputs the lower image data [11:0] of the first transfer, which is the lower pixel data [11:0] of the first transfer as it is. The D-FF 413 stores the lower image data [11:0] of the first transfer.

The bit coupling unit 416 then arranges the upper image data [17:0] of the first transfer input from the bit division unit 411 and the lower image data [11:0] of the first transfer input from the EXOR circuit 412 in the 32-bit memory bus for respective pixel data ("R0", "G1" and "R2"), as shown in the first transfer of FIG. 6B. More specifically, the bit coupling unit 416 arranges the lower image data [3:0] of the first transfer, that is, the inversion-processed bit [3] to [0] of "R0", in bit [3] to [0] of the memory bus, and arranges upper image data [5:0] of the first transfer, that is, bit [9] to [4] of "R0", in bit [9] to [4] of the memory bus. Also, the bit coupling unit 416 arranges the lower image data [7:4] of the first transfer, that is, the inversion-processed bit [3] to [0] of "G1", in bit [13] to [10] of the memory bus, and arranges the upper image data [11:6] of the first transfer, that is, bit [9] to [4] of "G1", in bit [19] to [14] of the memory bus. Also, the bit coupling unit 416 arranges the lower image data [11:8] of the first transfer, that is, the inversion-processed bit [3] to [0] of "R2", in bit [23] to [20] of the memory bus, and arranges the upper image data [17:12] of the first transfer, that is, bit [9] to [4] of "R0", in bit [29] to [24] of the memory bus.

Also, the bit coupling unit 416 arranges the inversion bit corresponding to the lower image data [11:0] of the first transfer input from the majority decision unit 415 in bit [30] of the memory bus.

Bit [31] of the memory bus is an unused bit.

Subsequently, when three pixel data "G3", "R4" and "G5" of the second transfer are input to the bit division unit 411, the bit division unit 411 stores the respective input pixel data. The bit division unit 411 outputs data of 18 bit, bit [9] to [4] of "G3", bit [9] to [4] of "R4", and bit [9] to [4] of "G5" stored in the memory unit, as upper image data [17:0] of the second transfer, to the bit coupling unit 416. Further, the bit division unit 411 outputs data of 12 bit, bit [3] to [0] of "G3", bit [3] to [0] of "R4", and bit [3] to [0] of "G5" stored in the memory unit, as the lower pixel data [11:0] of the second transfer, to the EXOR circuit 412 and the EXOR circuit 414.

The EXOR circuit 414 compares a value of each bit of the lower pixel data [11:0] of the second transfer input from the bit division unit 411 with a value of each bit of lower image data [11:0] of the first transfer input from the D-FF 413, and detects whether or not there is a bit whose value has changed. The EXOR circuit 414 outputs a value indicating whether or not there is a bit whose value has changed to the majority decision unit 415 for each bit. The majority decision unit 415 performs majority decision based on the result of detecting whether or not there is a bit whose value has changed, which is input from the EXOR circuit 414, and outputs the inversion bit. Accordingly, the EXOR circuit 412 inversion-processes the lower pixel data [11:0] of the second transfer to output lower image data [11:0] of the second transfer. The D-FF 413 stores the lower image data [11:0] of the second transfer.

Then, the bit coupling unit 416 arranges the upper image data [17:0] of the second transfer input from the bit division unit 411 and the lower image data [11:0] of the second transfer input from the EXOR circuit 412 in the 32-bit memory bus for respective pixel data ("G3", "R4" and "G5"), as shown in the second transfer of FIG. 6B. More specifically, the bit coupling unit 416 arranges lower image data [3:0] of the second transfer, that is, inversion-processed bit [3] to [0] of "G3", in bit [3] to [0] of the memory bus, and arranges the upper image data [5:0] of the second transfer, that is, bit [9] to [4] of "G3", in bit [9] to [4] of the memory bus. Also, the bit coupling unit 416 arranges lower image data [7:4] of the second transfer, that is, inversion-processed bit [3] to [0] of "R4", in bit [13] to [10] of the memory bus, and arranges upper image data [11:6] of the second transfer, that is, bit [9] to [4] of "R4", in bit [19] to [14] of the memory bus. Also, the bit coupling unit 416 arranges lower image data [11:8] of the second transfer, that is, inversion-processed bit [3] to [0] of "G5", in bit [23] to [20] of the memory bus, and arranges the upper image data [17:12] of the second transfer, that is, bit [9] to [4] of "G5", in bit [29] to [24] of the memory bus.

Also, the bit coupling unit 416 arranges the inversion bit corresponding to the lower image data [11:0] of the second transfer input from the majority decision unit 415 in bit [30] of the memory bus.

Bit [31] of the memory bus is an unused bit.

Similarly, each time three input pixel data "R6", "G7" and "R8" of the third transfer and three pixel data "G9", "R10" and "G11" of the fourth transfer are input, the data conversion unit 41 arranges the processed pixel data in bit [29] to [0] of the memory bus, and arranges the inversion bit corresponding to the lower image data [11:0] in bit [30] of the memory bus. Similarly, bit [31] of the memory bus is an unused bit.

By doing so, in the first packing method, the upper bit of the pixel data, the inversion-processed lower bit of the pixel data, and the inversion bit are arranged in the respective bit of the memory bus in each memory access (one transfer) for one cycle in the burst transfer. Accordingly, it is possible to reduce a change amount of respective bit of the memory bus between the respective transfers in the burst transfer.

<Second Data Arranging Method>

FIGS. 7A and 7B are diagrams illustrating a second data arranging method in the data conversion unit 41 of the first configuration included in the imaging apparatus 1 of the present embodiment. In FIG. 7A, an example of a first data arrangement of the packed data in the second data arranging method (packing method) is shown. In FIG. 7B, an example of a second data arrangement of the packed data in the second data arranging method (packing method) is shown.

Usually, a change amount of pixel data is small between adjacent pixels in the image data. Accordingly, when the packed data is built, it is preferable to arrange the same bit of pixel data of adjacent pixels in the same bit of the memory bus in each transfer so that a change amount of respective bit of the memory bus in burst transfer is minimized.

Further, information of colors represented by respective pixel data in the image data is different according to an image format, such as Bayer, RGB, or YC422 dot sequential, when the image processing unit 50 performs image processing. Accordingly, when the packed data is built, it is preferable to arrange the pixel data with the same color in the same bit of the memory bus in each transfer so that a change amount of respective bit of the memory bus in burst transfer is minimized.

In the second packing method, lower bit of respective pixel data arranged in the memory bus of one transfer are collected and inversion-processed, and the inversion-processed lower bit of the pixel data and the upper bit are arranged in the memory bus of one transfer, similar to the first packing method.

In this case, in the second packing method, the upper bit of the pixel data and the inversion-processed lower bit of the pixel data are arranged in the memory bus of one transfer so that positions of bit of adjacent pixel data with the same color arranged on the memory bus in data between two continuous transfers in the burst transfer are the same. Further, the inversion bit indicating information when the lower bit of the pixel data are inversion-processed is added in the unused bit present in the memory bus of one transfer to obtain final data of one transfer, similar to the first packing method.

The second packing method differs from the first packing method only in arrangement positions of the upper image data and the lower image data. However, the pixel data arranged in the same memory bus of one transfer is not pixel data that is continuously input to the data conversion unit 41, unlike the first packing method. Accordingly, the data conversion unit 41 includes a memory unit for temporarily storing 10-bit pixel data for one burst, that is, the packing unit (4 transfers). The data conversion unit 41 temporarily stores all pixel data for one burst (four transfers) in the memory unit. The data conversion unit 41 treats three pixel data arranged in the same memory bus of one transfer among respective pixel data stored in the memory unit as one data and performs the inversion process. Since the inversion process, the majority decision, and the addition of the inversion bit based on the stored pixel data are the same as those in the first packing method, a detailed description thereof will be omitted.

In the example of the first data arrangement of the packed data in the second packing method shown in FIG. 7A, the upper image data and the lower image data are arranged on the memory bus so that positions of bit of adjacent pixel data with the same color in data between two continuous transfers in burst transfer are the same.

More specifically, as shown in FIG. 7A, in an arrangement of the upper image data and the lower image data on the memory bus in the first transfer, the lower image data [3:0] (inversion-processed bit [3] to [0] of "R0") of the first transfer is arranged in bit [3] to [0] of the memory bus, and upper image data [5:0] (bit [9] to [4] of "R0") of the first transfer is arranged in bit [9] to [4] of the memory bus. Furthermore, the lower image data [7:4] (inversion-processed bit [3] to [0] of "G1") of the first transfer is arranged in bit [13] to [10] of the memory bus, and the upper image data [11:6] (bit [9] to [4] of "G1") of the first transfer is arranged in bit [19] to [14] of the memory bus. Furthermore, the lower image data [11:8] (inversion-processed bit [3] to [0] of "R8") of the first transfer is arranged in bit [23] to [20] of the memory bus, and upper image data [17:12] (bit [9] to [4] of "R8") of the first transfer is arranged in bit [29] to [24] of the memory bus. Furthermore, an inversion bit corresponding to the lower image data [11:0] of the first transfer is arranged in bit [30] of the memory bus, and bit [31] of the memory bus is an unused bit.

In an arrangement of the upper image data and the lower image data on the memory bus in the second transfer, lower image data [3:0] (inversion-processed bit [3] to [0] of "R2") of the second transfer is arranged in bit [3] to [0] of the memory bus, and the upper image data [5:0] (bit [9] to [4] of "R2") of the second transfer is arranged in bit [9] to [4] of the memory bus. The lower image data [7:4] (inversion-processed bit [3] to [0] of "G3") of the second transfer is arranged in bit [13] to [10] of the memory bus, and upper image data [11:6] (bit [9] to [4] of "G3") of the second transfer is arranged in bit [19] to [14] of the memory bus. The lower image data [11:8] (inversion-processed bit [3] to [0] of "R10") of the second transfer is arranged in bit [23] to [20] of the memory bus, and the upper image data [17:12] (bit [9] to [4] of "R10") of the second transfer is arranged in bit [29] to [24] of the memory bus. An inversion bit corresponding to the lower image data [11:0] of the second transfer is arranged in bit [30] of the memory bus, and bit [31] of the memory bus is an unused bit.

Since then, similarly, the data conversion unit 41 arranges upper image data and lower image data respectively corresponding to three pixel data "R4", "G5" and "G9" of the third transfer and three pixel data "R6", "G7" and "G11" of the fourth transfer, in bit [29] to bit [0] of the memory bus. The data conversion unit 41 similarly arranges the inversion bit corresponding to each lower image data, in bit [30] of the memory bus, and bit [31] of the memory bus is an unused bit.

In the example of the second data arrangement of the packed data in the second packing method shown in FIG. 7B, the upper image data and the lower image data are arranged on the memory bus so that positions of bit of adjacent pixel data with the same color in data between two continuous transfers in burst transfer are the same, similar to the example of the first data arrangement. In this case, in the example of the second data arrangement, the upper image data and the lower image data are divided and arranged on the memory bus.

More specifically, as shown in FIG. 7B, in the arrangement of the upper image data and the lower image data on the memory bus in the first transfer, upper image data [5:0] (bit [9] to [4] of "R0") of the first transfer is arranged in bit [5] to [0] of the memory bus, the upper image data [11:6] (bit [9] to [4] of "G1") of the first transfer is arranged in bit [11] to [6] of the memory bus, and upper image data [17:12] (bit [9] to [4] of "R8") of the first transfer is arranged in bit [17] to [12] of the memory bus. Furthermore, the lower image data [3:0] (inversion-processed bit [3] to [0] of "R0") of the first transfer is arranged in bit [21] to [18] of the memory bus, the lower image data [7:4] (inversion-processed bit [3] to [0] of "G1") of the first transfer is arranged in bit [25] to [22] of the memory bus, and the lower image data [11:8] (inversion-processed bit [3] to [0] of "R8") of the first transfer is arranged in bit [29] to [26] of the memory bus. Further, an inversion bit corresponding to the lower image data [11:0] of the first transfer is arranged in bit [30] of the memory bus, and bit [31] of the memory bus is an unused bit.

In the arrangement of the upper image data and the lower image data on the memory bus in the second transfer, the upper image data [5:0] (bit [9] to [4] of "R2") of the second transfer is arranged in bit [5] to [0] of the memory bus, the upper image data [11:6] (bit [9] to [4] of "G3") of the second transfer is arranged in bit [11] to [6] of the memory bus, and the upper image data [17:12] (bit [9] to [4] of "R10") of the second transfer is arranged in bit [17] to [12] of the memory bus. Furthermore, the lower image data [3:0] (inversion-processed bit [3] to [0] of "R2") of the second transfer is arranged in bit [21] to [18] of the memory bus, the lower image data [7:4] (inversion-processed bit [3] to [0] of "G3") of the second transfer is arranged in bit [25] to [22] of the memory bus, and lower image data [11:8] (inversion-processed bit [3] to [0] of "R10") of the second transfer is arranged in bit [29] to [26] of the memory bus. An inversion bit corresponding to the lower image data [11:0] of the second transfer is arranged in bit [30] of the memory bus, and bit [31] of the memory bus is an unused bit.

Since then, similarly, the data conversion unit 41 arranges upper image data respectively corresponding to three pixel data "R4", "G5" and "G9" of the third transfer and three pixel data "R6", "G7" and "G11" of the fourth transfer, in bit [17] to [0] of the memory bus. Also, the data conversion unit 41 arranges lower image data respectively corresponding to three pixel data "R4", "G5" and "G9" of the third transfer and three pixel data "R6", "G7" and "G11" of the fourth transfer in bit [29] to [18] of the memory bus. The data conversion unit 41 similarly arranges an inversion bit corresponding to each lower image data in bit [30] of the memory bus, and bit [31] of the memory bus is an unused bit.

Thus, even in the second packing method, the upper bit of the pixel data, the inversion-processed lower bit of the pixel data, and the inversion bit are arranged in the respective bit of the memory bus in each memory access (one transfer) for one cycle in burst transfer, similar to the first packing method. In the second packing method, the inversion-processed lower bit of the pixel data and the upper bit are arranged in the memory bus of one transfer so that positions of bit of adjacent pixel data with the same color in data between two continuous transfers in the burst transfer arranged on the memory bus are the same. Accordingly, there is a case in which a change amount of respective bit of the memory bus between the respective transfers in the burst transfer is further reduced.

In the second packing method shown in FIGS. 7A and 7B, the case in which, when the inversion-processed lower bit of the pixel data and the upper bit are arranged in the memory bus, respective bit of the pixel data are collected and arranged in the memory bus of one transfer has been described. However, the method of arranging the pixel data in the memory bus is not limited to the second packing method. That is, other arranging methods may be applied as long as the methods are methods in which pixel data of the same bit with the same color are arranged in the same bit on the memory bus between two continuous transfers. For example, each pixel data may be split into respective bit, and the pixel data of the same bit with the same color may be arranged in the same bit on the memory bus between two continuous transfers, for each split bit.

As described above, in the data conversion unit 41 or 51 of the first configuration, the values of the respective bit of the lower pixel data in which the data correlation is low (the data change frequency is high) are sequentially compared, the inversion process is performed on the lower pixel data in which the bit change number is great, and the pixel data that reduces a change amount of respective bit of the memory bus in the burst transfer can be arranged in the memory bus. Accordingly, in the data conversion unit 41 or 51 of the first configuration, similar to the conventional burst unit-based packing method, the image data transfer efficiency can be maintained and the power consumption concerning transfer of the image data can be reduced over the conventional burst unit-based packing method. Accordingly, the power consumption concerning pixel data transfer between each component (processing block) and the memory 20 in the imaging apparatus 1, that is, pixel data delivery between the respective components in the imaging apparatus 1, can be reduced.

In general, pixel data is represented by binary code. However, in the case of the binary code, even in data in which the correlation is high and the value change is small (the data change frequency is low), values of respective bit may all be changed into the other values depending on some data change. For example, when a value of data is changed from "128" to "127", the binary code is changed from "1000_0000" to "0111_1111", and the values of all the bit are changed. Therefore, representation of pixel data using gray code instead of the binary code will be examined.

The gray code is data code having a feature in that, when a data change is "1", only 1 bit is necessarily changed. Representation of the pixel data using the gray code can prevent values of all bit from being changed despite the data change being "1" as in the binary code. For example, when the pixel data consists of 8 bit, if the value of the pixel data minutely fluctuates in the vicinity of "128" and "64," an effect can be obtained in that a change in the value of the bit in the gray code is small.

<Second Configuration>

Figure 8:
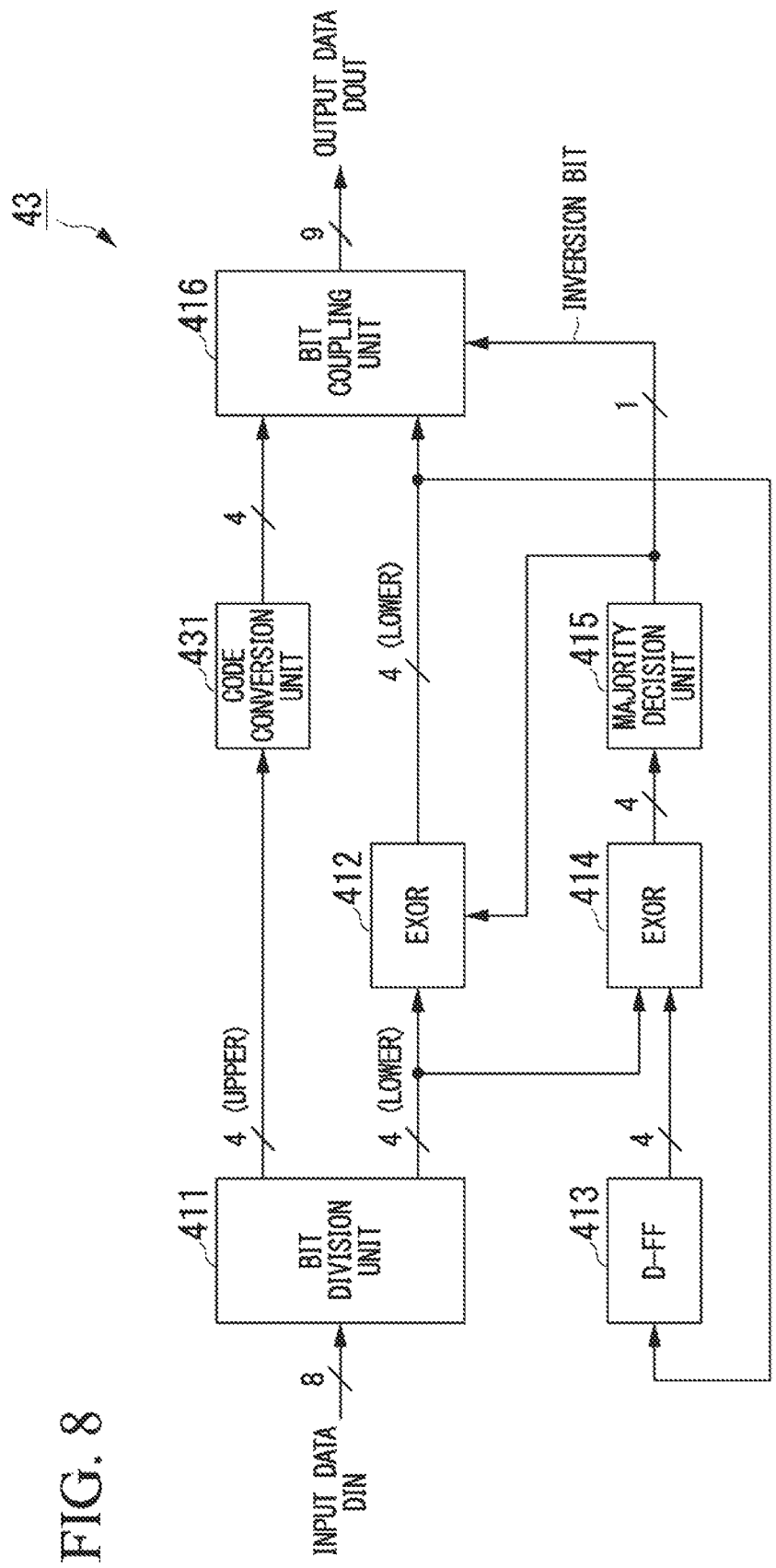
FIG. 8 is a block diagram showing a schematic configuration of a data conversion unit of a second configuration included in the imaging apparatus of the present embodiment.

Next, a data conversion unit of a second configuration will be described. FIG. 8 is a block diagram showing a schematic configuration of a data conversion unit 43 of the second configuration included in the imaging apparatus 1 of the present embodiment. The data conversion unit 43 shown in FIG. 8 is included in the imaging apparatus 1 instead of the data conversion unit 41 of the first configuration. Accordingly, the data conversion unit 43 may also be included in the imaging apparatus 1 instead of the data conversion unit 51. As shown in FIG. 8, the data conversion unit 43 includes a bit division unit 411, an EXOR circuit 412, a D-FF 413, an EXOR circuit 414, a majority decision unit 415, a bit coupling unit 416, and a code conversion unit 431.

The data conversion unit 43 of the second configuration and the data conversion unit 41 of the first configuration shown in FIG. 2 differ from each other in that the code conversion unit 431 is provided in addition to the data conversion unit 41 of the first configuration. Accordingly, hereinafter, the same reference numerals are given to the same components as those in the data conversion unit 41 of the first configuration, and a detailed description of the components will be omitted.

Hereinafter, a case in which the 16×16 Bayer data as shown in FIG. 19 is input to the data conversion unit 43, four transfers constitute a packing unit for each pixel data in the Bayer data, a bit number of each pixel data in the Bayer data is 10 bit, and a memory bus width is 32 bit, similar to the first configuration, will be described.

The data conversion unit 43 arranges data of each bit of 10-bit pixel data sequentially input from the imaging processing unit 40, in each bit of the memory bus using the prescribed packing method as described above to output 32-bit packed data, similar to the data conversion unit 41 of the first configuration. However, a method of generating transfer pixel data by comparing input pixel data for each bit when the data conversion unit 43 generates the packed data differs from that in the data conversion unit 41 of the first configuration.

More specifically, the data conversion unit 43 divides the input pixel data into a prescribed bit number of upper pixel data and lower pixel data, similar to the data conversion unit 41 of the first configuration. The data conversion unit 43 inversion-processes divided lower pixel data, similar to the data conversion unit 41 of the first configuration, and generates lower pixel data in which the number of bit whose values have changed is small. Also, the data conversion unit 43 converts data code of the divided upper pixel data from binary code to gray code. The data conversion unit 43 then couples the upper pixel data converted into the gray code and the inversion-processed lower pixel data to obtain transfer pixel data. Furthermore, the data conversion unit 43 adds an inversion bit indicating information when the lower pixel data is inversion-processed, similar to the data conversion unit 41 of the first configuration.

The data conversion unit 43 then arranges the data of each bit of the transfer pixel data and the inversion bit, in respective bit of the memory bus using the prescribed packing method as described above, and outputs the resultant data as packed data to be finally output, similar to the data conversion unit 41 of the first configuration.

As described above, the data conversion unit 43 packs transfer pixel data in which the number of bit whose values have changed in the input 10-bit pixel data is small, to generate 32-bit packed data to be finally output. However, hereinafter, for convenience of a description, a case in which 8-bit pixel data is sequentially input to the data conversion unit 43, transfer pixel data is generated from the input pixel data, and 9-bit packed data to which information when the transfer pixel data is generated has been added is output will be described. That is, a case in which the data conversion unit 43 packs one transfer pixel data to generate packed data, similar to the data conversion unit 41 of the first configuration, will be described. Since the method of packing a plurality of transfer pixel data to generate packed data is the same as the first packing method described above shown in FIGS. 6A and 6B and the second packing method described above shown in FIGS. 7A and 7B, a detailed description thereof will be omitted.

Hereinafter, in order to distinguish between 10-bit pixel data and 8-bit pixel data input to the data conversion unit 43, the 8-bit pixel data is represented as input data DIN [7:0], similar to the data conversion unit 41 of the first configuration. In order to distinguish between 32-bit packed data and 9-bit packed data, the 9-bit packed data is represented as output data DOUT [8:0]. When bit of the input data DIN or the output data DOUT are not specified, that is, an entire bit range of the input data DIN or the output data DOUT is indicated, numbers in "[ ]: brackets" indicating a bit range of the data will be omitted.

Hereinafter, a case in which 8-bit input data DIN is divided into 4 upper bit and 4 lower bit and transfer pixel data in which a bit change is small is generated will be described.

The code conversion unit 431 converts data code of the upper image data [7:4] input from the bit division unit 411 from binary code to gray code. The code conversion unit 431 outputs the upper image data converted into the gray code to the bit coupling unit 416.

The bit coupling unit 416 couples the upper image data [7:4] converted into the gray code, which is input from the code conversion unit 431, and the lower image data [3:0] output from the EXOR circuit 412 to generate transfer pixel data [7:0]. The bit coupling unit 416 also adds (bit-couples) an inversion bit input from the majority decision unit 415 in an upper bit next to the most significant bit of the generated transfer pixel data to generate output data DOUT [8:0]. The output data DOUT generated here is output as output data DOUT (packed data) to be finally output from the data conversion unit 43 to the output DMA unit 45.

Figure 9:
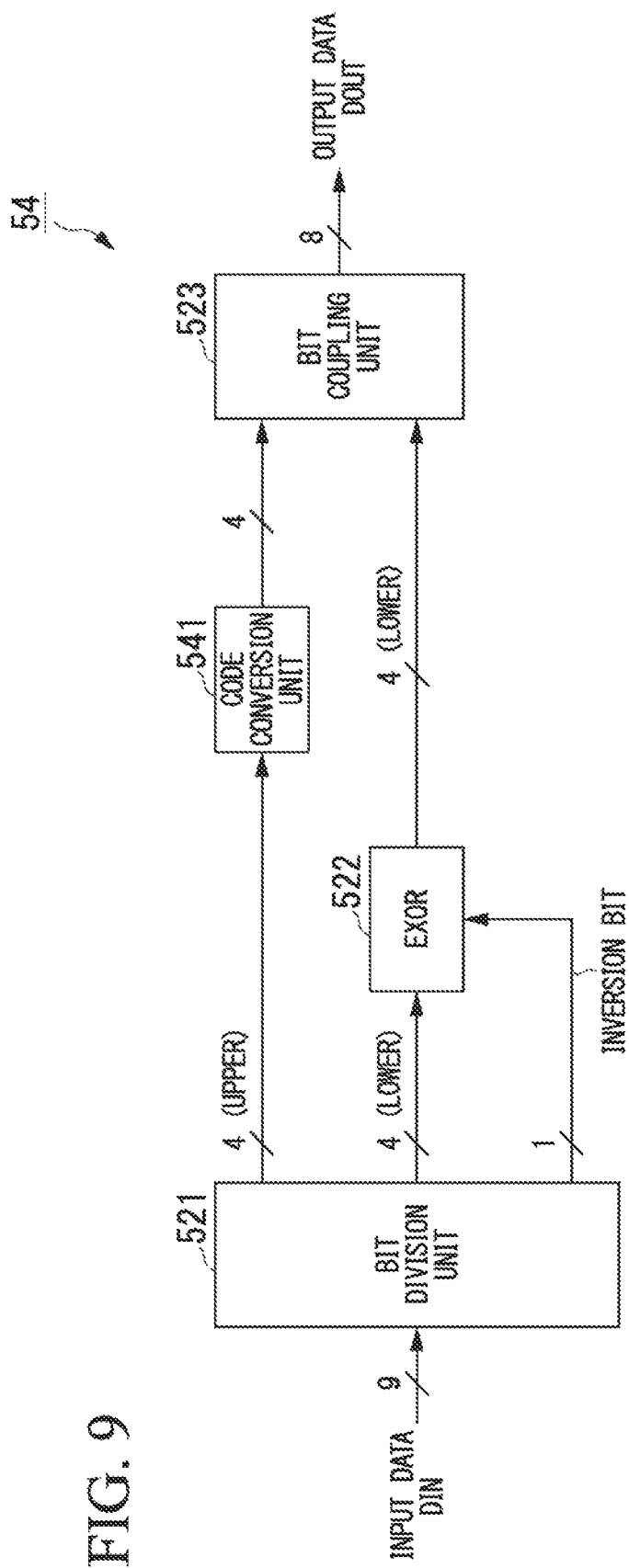
FIG. 9 is a block diagram showing a schematic configuration of a data inverse-conversion unit of the second configuration included in the imaging apparatus of the present embodiment.

Next, a data inverse-conversion unit of the second configuration will be described. FIG. 9 is a block diagram showing a schematic configuration of a data inverse-conversion unit 54 of the second configuration included in the imaging apparatus 1 of the present embodiment. The data inverse-conversion unit 54 shown in FIG. 9 is included in the imaging apparatus 1 instead of the data inverse-conversion unit 52 of the first configuration. Accordingly, the data inverse-conversion unit 54 may also be included in the imaging apparatus 1 instead of the data inverse-conversion unit 62. As shown in FIG. 9, the data inverse-conversion unit 54 includes a bit division unit 521, an EXOR circuit 522, a bit coupling unit 523, and a code conversion unit 541.

The data inverse-conversion unit 54 of the second configuration differs from the data inverse-conversion unit 52 of the first configuration shown in FIG. 3 in that a code conversion unit 541 is provided in addition to the data inverse-conversion unit 52 of the first configuration. Accordingly, hereinafter, the same reference numerals are given to the same components as those in the data inverse-conversion unit 52 of the first configuration, and a detailed description of the components will be omitted.

Hereinafter, a case in which the packed data of one burst in which four transfers constitute a packing unit, which has been packed by the data conversion unit 43, is input to the data inverse-conversion unit 54 via the input DMA unit 56 and is restored to the Bayer data shown in FIG. 19, similarly to the first configuration, will be described. Accordingly, a description will be given on the assumption that a bit number of each pixel data in the Bayer data is 10 bit, and a memory bus width is 32 bit.

The data inverse-conversion unit 54 restores the data arranged in each bit of the 32-bit packed data sequentially input from the input DMA unit 56 to the original image data (Bayer data) to be image-processed by the image processing unit 50 to restore the 10-bit pixel data using a method reverse, to any of the prescribed packing methods as described above, similar to the data inverse-conversion unit 52 of the first configuration. However, a method of restoring the original pixel data from the respective split transfer pixel data when the data inverse-conversion unit 54 restores the pixel data differs from that in the data inverse-conversion unit 52 of the first configuration.

More specifically, the data inverse-conversion unit 54 sequentially splits (unpacks) respective transfer pixel data from the input 32-bit packed data, using a method reverse to the packing method in the data conversion unit 43, similar to the data inverse-conversion unit 52 of the first configuration.

Then, the data inverse-conversion unit 54 divides the transfer pixel data into a prescribed bit number of upper transfer pixel data and lower transfer pixel data, similar to the data inverse-conversion unit 52 of the first configuration. The data inverse-conversion unit 54 performs an inversion process on the currently divided lower transfer pixel data based on the inversion bit indicating the information when the transfer pixel data is generated, which has been added in the unused bit present in the packing unit (four transfers). Also, the data inverse-conversion unit 54 converts data code of the currently divided upper transfer pixel data from gray code to binary code. The data inverse-conversion unit 54 then couples the upper transfer pixel data converted into the binary code and the inversion-processes lower transfer pixel data to obtain original pixel data.

As described above, the data inverse-conversion unit 54 splits the transfer pixel data from the 32-bit packed data input from the input DMA unit 56. Furthermore, the data inverse-conversion unit 54 performs the inversion process on the split transfer pixel data to generate the original pixel data. However, hereinafter, for convenience of description, a case in which 9-bit packed data in which the information when the transfer pixel data is generated has been added is input from the input DMA unit 56 to the data inverse-conversion unit 54 and the original pixel data is generated from the transfer pixel data split from the packed data will be described. That is, a case in which, in the data inverse-conversion unit 54, one pixel data is restored from the packed data in which one transfer pixel data has been packed, similar to the data inverse-conversion unit 52 of the first configuration, will be described.

Hereinafter, in order to distinguish between 32-bit packed data and 9-bit packed data, the 9-bit packed data is represented as input data DIN [8:0], similar to the data inverse-conversion unit 52 of the first configuration. In order to distinguish between 10-bit pixel data and 8-bit pixel data, the 8-bit pixel data is represented as output data DOUT [7:0].

When bit of the input data DIN or the output data DOUT are not specified, that is, an entire bit range of the input data DIN or the output data DOUT is indicated, numbers in "[ ]: brackets" indicating a bit range of the data will be omitted.

Further, hereinafter, a case in which an inversion bit, which is information when the transfer pixel data is generated, has been added in the most significant bit (input data DIN [8]) of 9-bit packed data, and the transfer pixel data is divided into 4 upper bit and 4 lower bit to restore the original pixel data will be described.

The code conversion unit 541 converts data code of the upper image data [7:4] input from the bit division unit 521 from gray code to binary code. The code conversion unit 541 outputs the upper image data converted into the binary code to the bit coupling unit 523.

The bit coupling unit 523 couples the upper image data [7:4] converted into the binary code, which is input from the code conversion unit 541, and the lower image data [3:0] output from the EXOR circuit 522 to generate output data DOUT [7:0]. The output data DOUT generated here is output to the image processing unit 50 as original pixel data restored by the data inverse-conversion unit 54, that is, input to the data conversion unit 43.

<Inversion Processing Method>

Next, a method of generating transfer pixel data in the data conversion unit 43 will be described. FIGS. 10A and 10B are diagrams illustrating a method of generating transfer pixel data in the data conversion unit 43 of the second configuration included in the imaging apparatus 1 of the present embodiment. Hereinafter, for convenience of description, a case in which 8-bit input data DIN is divided into 4 upper bit and 4 lower bit and transfer pixel data in which a bit change is small is generate when the 8-bit input data DIN is input to the data conversion unit 43 and 9-bit output data DOUT is output will be described. A case in which the data conversion unit 43 packs one transfer pixel data to generate packed data will also be described. FIG. 10A shows the input data DIN and bit change numbers of upper and lower input data DIN. FIG. 10B shows the output data DOUT and the inversion bit (packed data) output from the data conversion unit 43, and bit change numbers of upper and lower output data DOUT.

Here, a case in which the input data DIN as shown in FIG. 10A is sequentially input to the data conversion unit 43 in time series from a top column to a bottom column is considered. FIG. 10A shows a case in which a value of the input data DIN minutely fluctuates in the vicinity of "128" or "64." As shown in FIG. 10A, even when data correlation of the input data DIN is high (data change frequency is low), values of respective bit change. Here, when the input data DIN shown in FIG. 10A is divided into the upper input data DIN and the lower input data DIN, and their bit change numbers are examined, a sum of the bit change numbers of the upper input data DIN is 27 bit, and a sum of the bit change numbers of the lower input data DIN is 26 bit. As shown in FIG. 10A, a change in the 4-bit upper input data DIN is "1."

Each time the input data DIN is input, the data conversion unit 43 sequentially compares values of the respective bit of the lower input data DIN and performs an inversion process on the lower input data DEN to generate lower image data, similar to the data conversion unit 41 of the first configuration. Also, the data conversion unit 43 converts binary code of the upper input data DIN into gray code to generate upper image data each time the input data DIN is input. The data conversion unit 43 couples the upper image data converted into the gray code and the inversion-processed lower image data to generate transfer pixel data. Furthermore, the data conversion unit 43 adds an inversion bit in an upper bit next to the most significant bit of the generated transfer pixel data, and sequentially outputs packed data as shown in FIG. 10B as packed data to be finally output.

As shown in FIG. 10B, a sum of the bit change numbers in the lower transfer pixel data contained in the packed data generated by the data conversion unit 43 is 16 bit. The data change amount is reduced by 10 bit over the bit change number of the lower input data DIN shown in FIG. 10A. As shown in FIG. 10B, a sum of the bit change numbers in the upper transfer pixel data contained in the packed data generated by the data conversion unit 43 is 9 bit. The data change amount is reduced by 18 bit over the bit change number of the upper input data DIN shown in FIG. 10A.

Thus, the data conversion unit 43 sequentially compares the values of the respective bit of the lower input data DIN in which data correlation is low (a data change frequency is high) and performs the inversion process on the lower input data DIN in which the bit change number is great, similar to the data conversion unit 41 of the first configuration. Also, the data conversion unit 43 converts the upper input data DIN in which the data correlation is high (data change frequency is low) from the binary code to the gray code. Accordingly, even when the data correlation of the input data DIN is high (the data change frequency is low), it is possible to generate packed data in which the bit change is small. In particular, the upper bit of the pixel data are data in which the correlation is high and the value change is small, but the image data of the upper bit has a higher correlation by converting the data code of the data of the upper bit from the binary code to the gray code. A total data change amount in data transfer can be reduced over the case in which only the lower input data DIN is inversion-processed as in the data conversion unit 41 of the first configuration. The bit change number of the upper transfer pixel data is "2" in a column "B" of FIG. 10B, but this is caused by the value of the input data DIN being changed from the value in the vicinity of "128" to the value in the vicinity of "64".

As described above, as the data conversion unit 43 of the second configuration performs the different processes on the lower pixel data in which the data correlation is low (the data change frequency is high) and the upper pixel data in which the data correlation is high (the data change frequency is low), the pixel data that a change amount of respective bit of the memory bus in the burst transfer is reduced can be arranged in the memory bus. Accordingly, the data conversion unit 43 of the second configuration can maintain image data transfer efficiency similar to the conventional burst unit-based packing method, and can reduce the power consumption concerning transfer of the image data over the conventional burst unit-based packing method and the data conversion unit 41 of the first configuration. Accordingly, the power consumption concerning pixel data transfer between each component (processing block) and the memory 20 in the imaging apparatus 1, that is, pixel data delivery between the respective components in the imaging apparatus 1, can be reduced.

The case in which the data conversion unit 41 of the first configuration and the data conversion unit 43 of the second configuration as described above perform the inversion process on a prescribed bit number of lower image data, that is, one bit range in the image data, has been described. However, the ranges of bit of the image data to be subjected to the inversion process are not limited to one prescribed range, and the inversion process may be performed on a plurality of bit ranges in the image data.

<Third Configuration>

Figure 11:
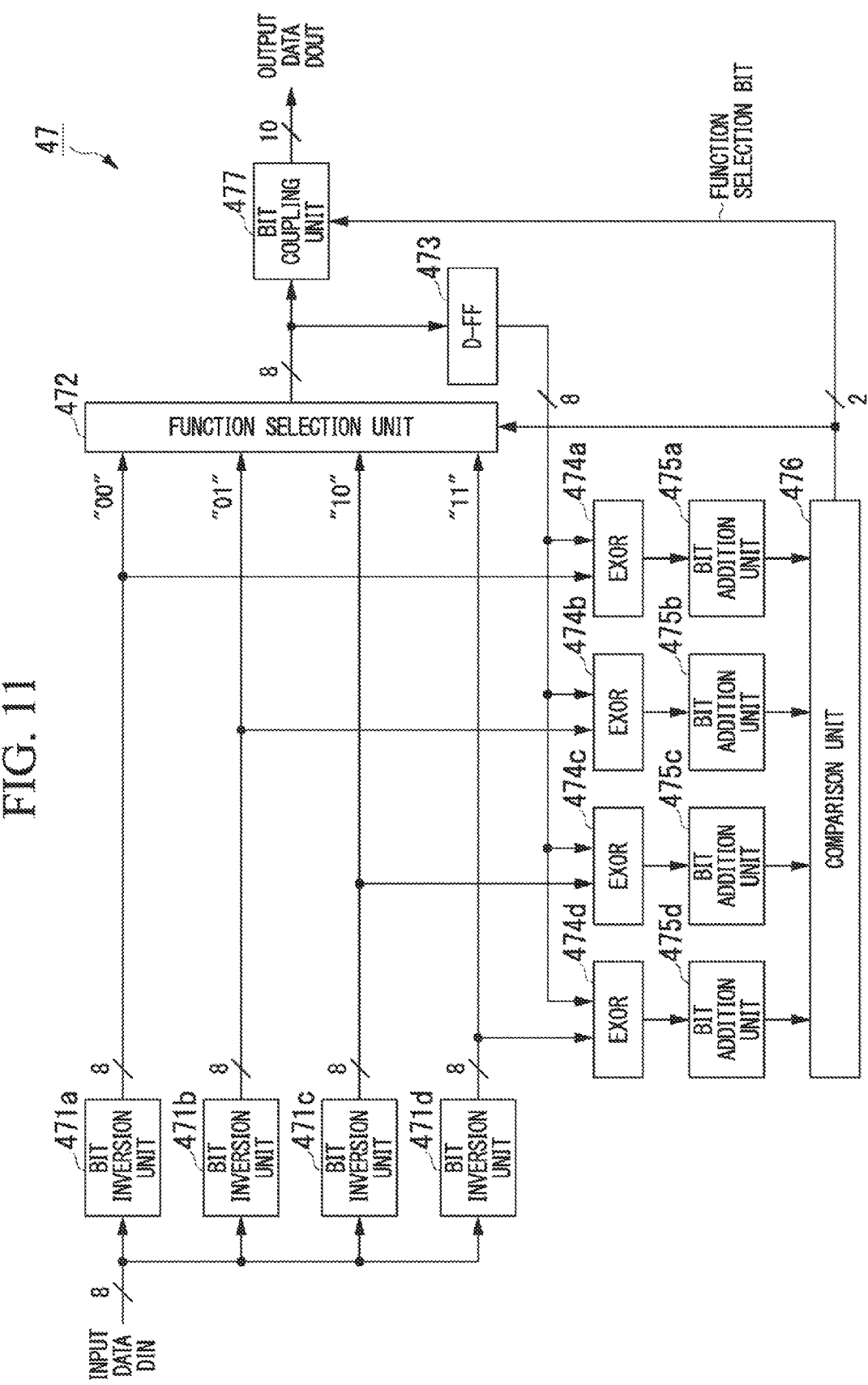
FIG. 11 is a block diagram showing a schematic configuration of a data conversion unit of a third configuration included in the imaging apparatus of the present embodiment.

Next, a data conversion unit of a third configuration will be described. FIG. 11 is a block diagram showing a schematic configuration of a data conversion unit 47 of the third configuration included in the imaging apparatus 1 of the present embodiment. The data conversion unit 47 shown in FIG. 11 is included in the imaging apparatus 1 instead of the data conversion unit 41 of the first configuration or the data conversion unit 43 of the second configuration. Accordingly, the data conversion unit 47 may also be included in the imaging apparatus 1 instead of the data conversion unit 51.

As shown in FIG. 11, the data conversion unit 47 includes four bit inversion units 471a to 471d (hereinafter referred to as "bit inversion unit 471" when indicating any one of the bit inversion units 471a to 471d), a function selection unit 472, a D-FF 473, four EXOR circuits 474a to 474d (hereinafter referred to as "EXOR circuit 474" when indicating any one of the EXOR circuits 474a to 474d), four bit addition units 475a to 475d (hereinafter referred to as "bit addition unit 475" when indicating any one of the bit addition units 475a to 475d), a comparison unit 476, and a bit coupling unit 477.

Hereinafter, a case in which the 16×16 Bayer data as shown in FIG. 19 is input to the data conversion unit 47, four transfers constitute a packing unit for each pixel data in the Bayer data, a bit number of each pixel data in the Bayer data is 10 bit, and a memory bus width is 32 bit, similar to the first and second configurations, will be described.

The data conversion unit 47 arranges data of each bit of 10-bit pixel data sequentially input from the imaging processing unit 40, in each bit of a memory bus to generate 32-bit packed data using any of the prescribed packing methods as described above. The data conversion unit 47 sequentially outputs the generated packed data, for example, based on a data enable signal that is not shown, which is input from the output DMA unit 45. The data enable signal is a signal indicating timing to transfer packed data when the output DMA unit 45 performs burst transfer.

When the data conversion unit 47 generates the packed data, the data conversion unit 47 first inversion-processes the input pixel data, for example, according to a prescribed inversion process application range as shown in FIG. 12 to generate each pixel data (hereinafter referred to as "inverted pixel data"). FIG. 12 is a diagram illustrating an example of the inversion process application range in the data conversion unit 47 of the third configuration included in the imaging apparatus 1 of the present embodiment. More specifically, inversion cases (inversion cases a to d) corresponding to four inversion process application ranges are prescribed in the data conversion unit 47 as shown in FIG. 12, and the inversion processes according to the respective inversion cases are performed on the input pixel data to generate respective inverted pixel data. Here, the inversion process is a process of inverting the values of bit of the pixel data for each bit ("1"→"0" or "0"→"1"), similar to the first and second configurations.

The data conversion unit 47 compares a value of each bit of previously output inverted pixel data with a value of each bit of currently generated inverted pixel data, and selects the inverted pixel data in which the number of bit whose values have changed from the previously output inverted pixel data is small. The selected inverted pixel data is the currently output inverted pixel data. Also, the data conversion unit 47 outputs a function selection bit corresponding to the selected inverted pixel data as information when the inverted pixel data is selected. This function selection bit indicates the inversion process range applied to the pixel data. In the inversion process application range shown in FIG. 12, since the four inversion process application ranges are set in advance, the bit number of the function selection bit is 2 bit.

Then, the data conversion unit 47 arranges (packs) the data of each bit of the inverted pixel data in each bit of a data bus corresponding to the memory bus (since this data bus corresponds to each bit of the memory bus, the data bus will be hereinafter described as "memory bus") using the prescribed packing method as described above, and outputs the resultant data as packed data to be finally output. The data conversion unit 47 adds the information when the inverted pixel data is selected (function selection bit), in an unused bit present in the packing unit (four transfers), and outputs the information together with the packed data.

The data conversion unit 47 can generate the inverted pixel data according to each inversion case each time pixel data is input, sequentially pack the selected inverted pixel data and the function selection bit, and sequentially output the packed data, as described above. However, the data conversion unit 47, for example, may include a memory unit for temporarily storing the 32-bit packed data for one burst, that is, the packing unit (four transfers). In this case, the data conversion unit 47 temporarily stores the input pixel data in the memory unit, generates the inverted pixel data based on the respective stored pixel data, and performs packing of selected inverted pixel data and addition of the function selection bit.

Alternatively, the data conversion unit 47 may first pack the input pixel data, and then may perform generation of the same packed data as the inverted pixel data according to the prescribed inversion case and addition of information when the packed data is selected (information indicating the inversion process range applied to the packed data). In this case, the data conversion unit 47 treats the first packed data as the input pixel data and then processes.

As described above, the data conversion unit 47 selects any of the inverted pixel data generated according to the prescribed inversion case from the input 10-bit pixel data and packs the selected inverted pixel data to generate the 32-bit packed data to be finally output by the data conversion unit 47. However, hereinafter, for convenience of description, a case in which 8-bit pixel data is sequentially input to the data conversion unit 47, any of the inverted pixel data generated from the input pixel data is selected, and a 2-bit function selection bit is added to the selected inverted pixel data to output 10-bit packed data will be described. That is, a case in which the data conversion unit 47 packs one inverted pixel data to generate packed data will be described. Since a method of packing a plurality of inverted pixel data to generate packed data is the same as the first packing method as described with reference to FIGS. 6A and 6B and the second packing method as described with reference to FIGS. 7A and 7B, a detailed description thereof will be omitted.

Hereinafter, in order to distinguish between 10-bit pixel data and 8-bit pixel data input to the data conversion unit 47, the 8-bit pixel data is represented as input data DIN [7:0], similar to the data conversion unit 41 of the first configuration and the data conversion unit 43 of the second configuration. In order to distinguish between 32-bit packed data and 10-bit packed data, the 10-bit packed data is hereinafter represented as output data DOUT [9:0].

Hereinafter, bit of the input data DIN or the output data DOUT are not specified. That is, when an entire bit range of the input data DIN or the output data DOUT is indicated, numbers in "[ ]: brackets" indicating a bit range of the data will be omitted.

Hereinafter, a case in which the 8-bit input data DIN is inversion-processed according to the prescribed inversion case as shown in FIG. 12 to generate each inverted pixel data will be described.

Each of the bit inversion units 471a to 471d inversion-processes values of bit of the input 8-bit input data DIN [7:0], for each bit, according to the inversion process application range shown in FIG. 12 to generate inverted pixel data. Each of the bit inversion units 471a to 471d outputs the generated inverted pixel data to the function selection unit 472 and the corresponding one of the EXOR circuits 474a to 474d. The bit inversion units 471a to 471d correspond to the inversion cases a to d, respectively. Hereinafter, in order to distinguish the inverted pixel data generated by the bit inversion units 471a to 471d, the last one of reference characters given to the bit inversion units 471a to 471d is given to the inverted pixel data, and the inverted pixel data is referred to as "inverted pixel data a," "inverted pixel data b," "inverted pixel data c" and "inverted pixel data d."

Respective processes in the bit inversion units 471a to 471d will be described herein in greater detail. The inversion process in the bit inversion unit 471a is inversion case a, that is, "no inversion." The bit inversion unit 471a outputs inverted pixel data a [7:0] in which a value of each bit of the input data DIN [7:0] is left as it is. The inversion process in the bit inversion unit 471b is inversion case b, that is, "lower 2-bit inversion." The bit inversion unit 471b outputs inverted pixel data b [7:0] in which values of 2 lower bit (input data DIN [1:0]) of the input data DIN [7:0] are inverted and values of other bit (input data DIN [7:2]) are left as they are. The inversion process in the bit inversion unit 471c is inversion case c, that is, "lower 4-bit inversion." The bit inversion unit 471c outputs inverted pixel data c [7:0] in which values of 4 lower bit (input data DIN [3:0]) of the input data DIN [7:0] are inverted and values of other bit (input data DIN [7:4]) are left as they are. The inversion process in the bit inversion unit 471d is inversion case d, that is, "all-bit inversion." The bit inversion unit 471d output inverted pixel data d [7:0] in which the values of all bit of the input data DIN [7:0] are inverted.

The function selection unit 472 selects any one of the inverted pixel data a to d input from the respective bit inversion units 471a to 471d according to the function selection bit input from the comparison unit 476. The function selection unit 472 outputs the selected inverted pixel data to the bit coupling unit 477 and the D-FF 473. Hereinafter, the inverted pixel data selected and output by the function selection unit 472 is referred to as "selected pixel data."

The D-FF 473 stores the selected pixel data [7:0] output from the function selection unit 472. The selected pixel data stored in the D-FF 473 is output as previous output data DOUT [7:0] to each of the EXOR circuits 474a to 474d.

The EXOR circuits 474a to 474d compare values of respective bit of two data of the inverted pixel data a[7:0] to d [7:0] input from the bit inversion units 471a to 471d with the output data DOUT [7:0] input from the D-FF 473 and detect whether or not there is a bit whose value has changed. Each of the EXOR circuits 474a to 474d outputs a value "1" indicating the bit is a bit whose value has changed or a value "0" indicating that the bit is not a bit whose value has changed, for each compared bit.

More specifically, in the comparison of the two data in each EXOR circuit 474, exclusive OR of each bit of the inverted pixel data and each bit of the output data DOUT is taken. Accordingly, when the value of the bit of the inverted pixel data and the value of the bit of the output data DOUT are the same, "0" is output. On the other hand, when the value of the bit of the inverted pixel data and the value of the bit of the output data DOUT differ, "1" is output.

The respective bit addition units 475a to 475d count the number of bit whose values have changed, which are input from the corresponding EXOR circuits 474a to 474d, and calculate a sum of the bit whose values have changed (hereinafter referred to as "bit change number"). The calculated bit change numbers are output to the comparison unit 476. For example, when values of bit whose values have changed, which are input from the EXOR circuit 474a, is "1111_ 0000," "4" is output as the value of the bit change number. Thus, each of the bit addition units 475a to 475d outputs the number of bit whose values have changed (bit change number) when the inverted pixel data [7:0] is next output as data DOUT [7:0].

The comparison unit 476 determines the smallest bit change number among the bit change numbers input from the respective bit addition units 475a to 475d and specifies (selects) the bit addition unit 475 that outputs the smallest bit change number. The comparison unit 476 outputs information indicating the bit addition unit 475 that outputs the smallest bit change number as a function selection bit to the function selection unit 472 and the bit coupling unit 477. Thus, the inverted pixel data in which the number of bit whose values have changed from previously output inverted pixel data (output data DOUT) is smallest is selected.

The bit coupling unit 477 adds (bit-couples) the function selection bit input from the comparison unit 476 in 2 upper bit next to the most significant bit of the selected pixel data [7:0] input from the function selection unit 472 to generate output data DOUT [9:0]. The output data DOUT generated here is output as output data DOUT (packed data) to be finally output from the data conversion unit 47 to the output DMA unit 45.

Figure 13:
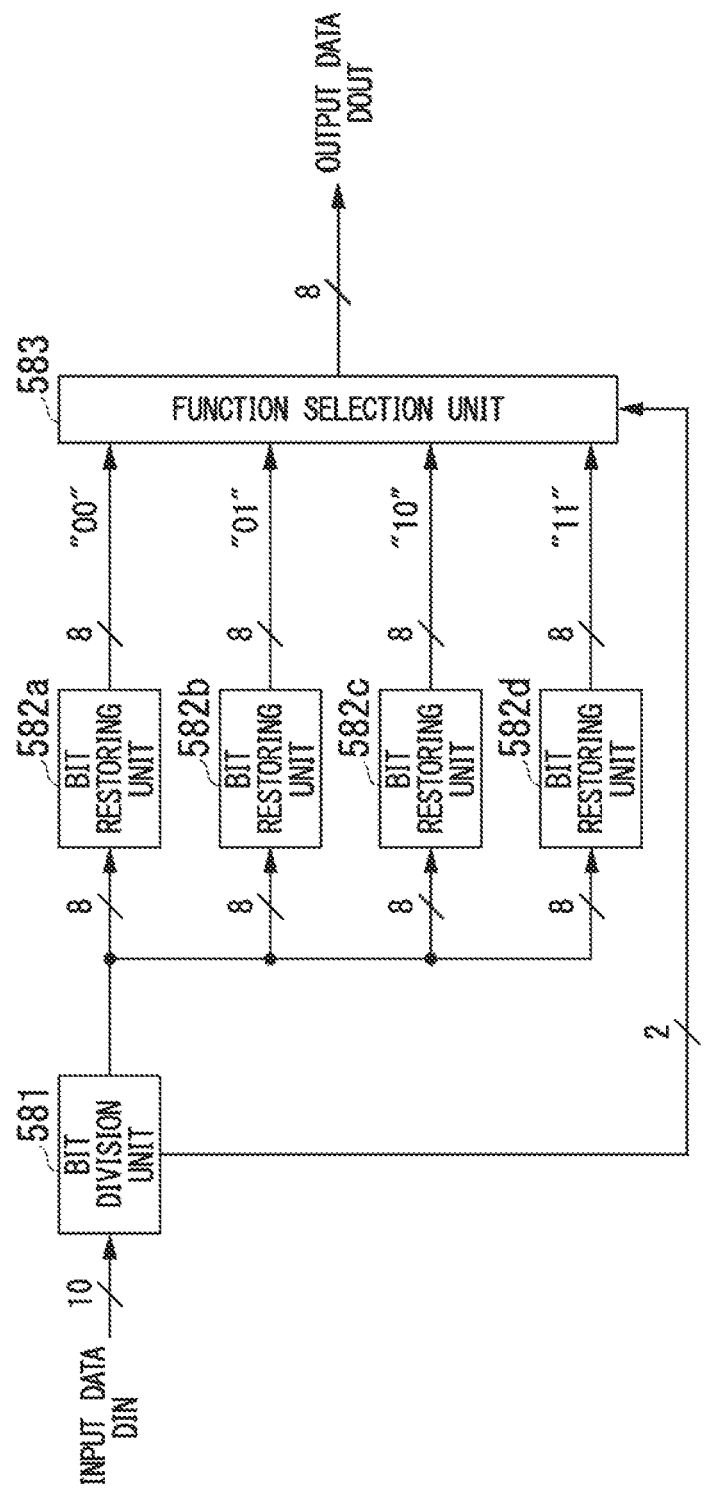
FIG. 13 is a block diagram showing a schematic configuration of a data inverse-conversion unit of the third configuration included in the imaging apparatus of the present embodiment.
Figure 18:
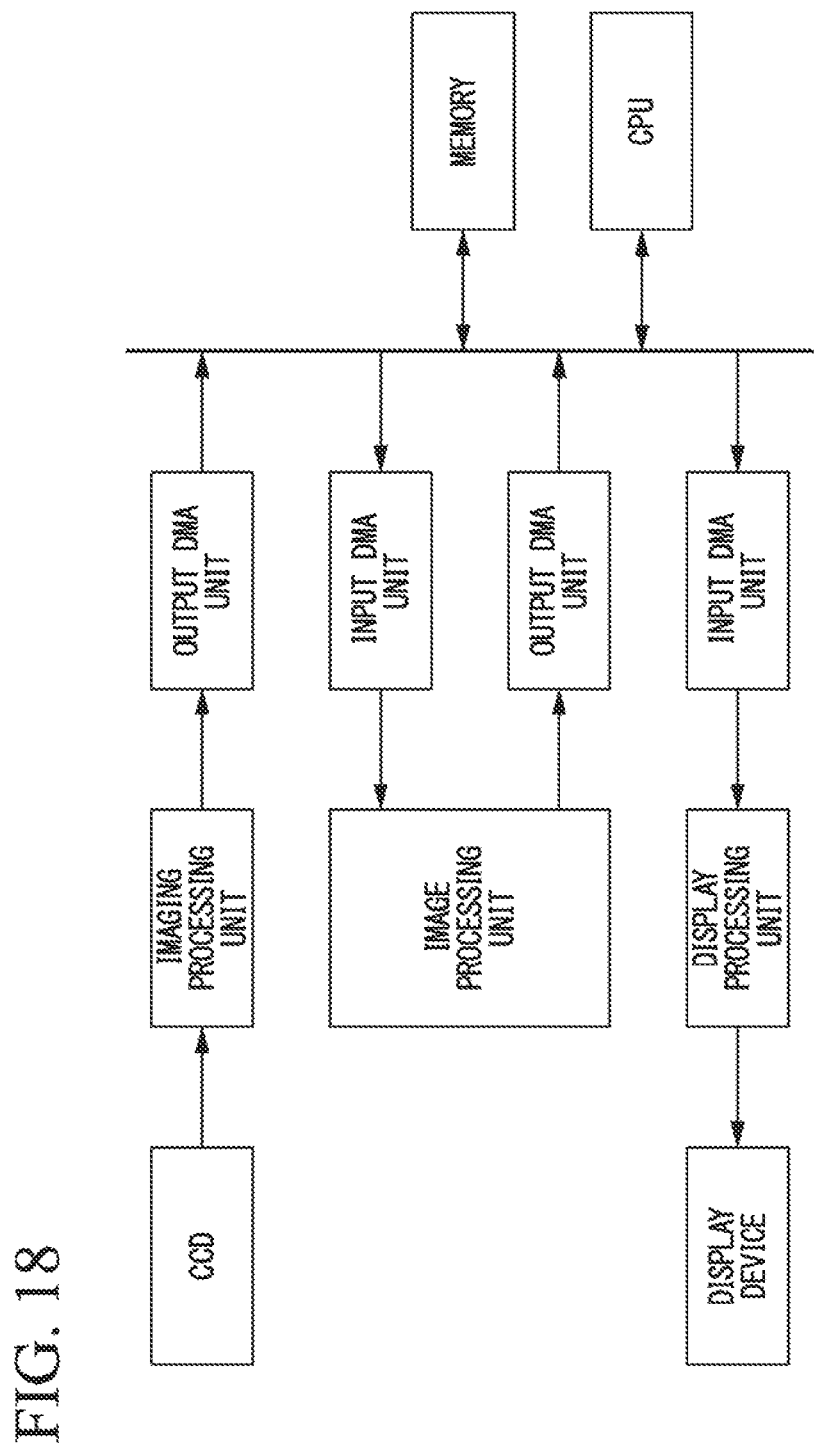
FIG. 18 is a block diagram showing a schematic configuration of a conventional imaging apparatus.
Figure 21A:
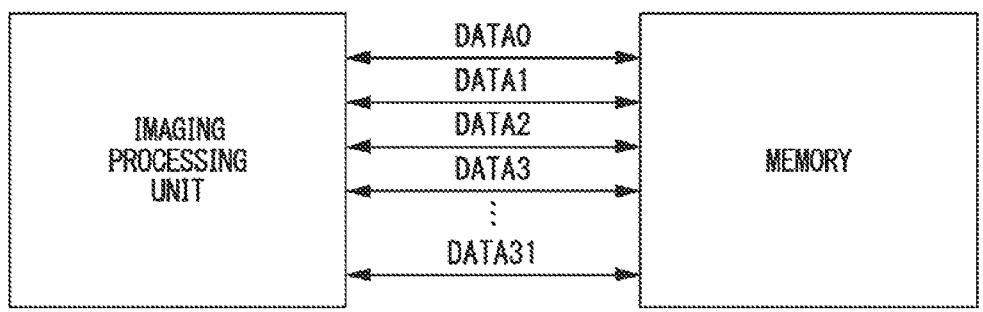
FIG. 21A is a diagram illustrating a relationship between data change on a data bus and power consumption.
Figure 21B:
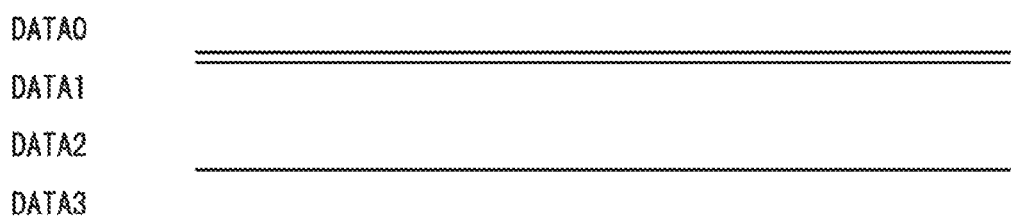
FIG. 21B is a diagram illustrating the relationship between the data change on the data bus and the power consumption.
Figure 21C:
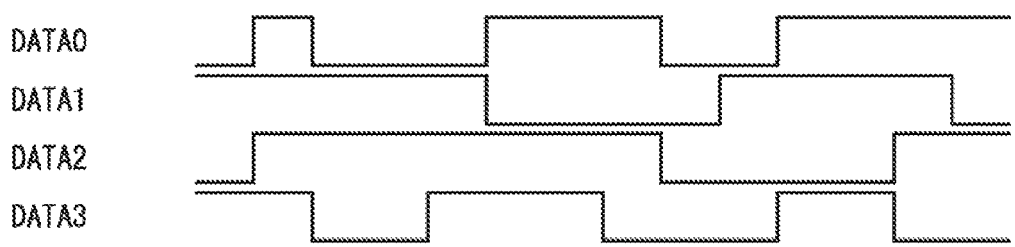
FIG. 21C is a diagram illustrating the relationship between the data change on the data bus and the power consumption.
Figure 21D:
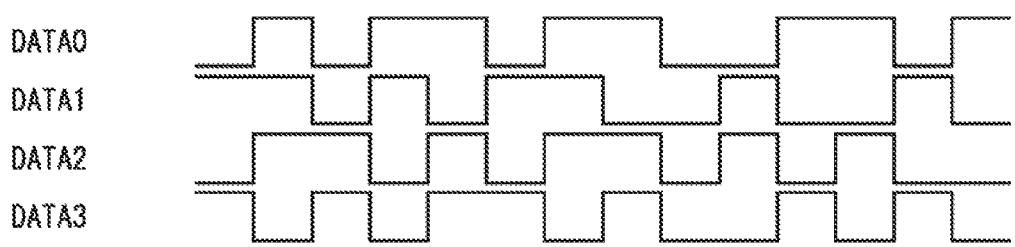
FIG. 21D is a diagram illustrating the relationship between the data change on the data bus and the power consumption.
Figure 22A:
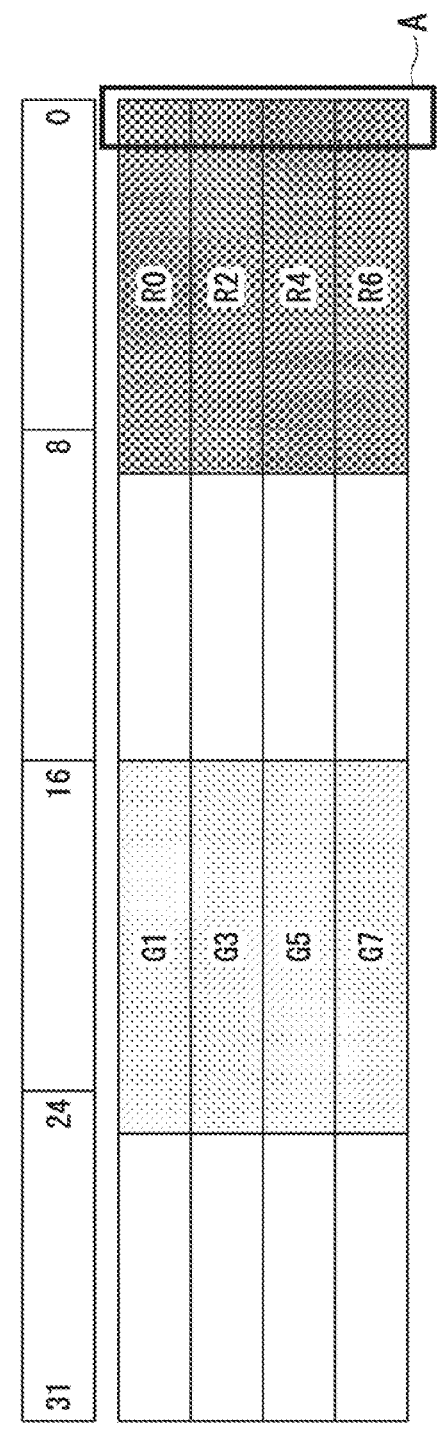
FIG. 22A is a diagram showing an example of a state of a data arrangement in a conventional data packing method.
Figure 22B:
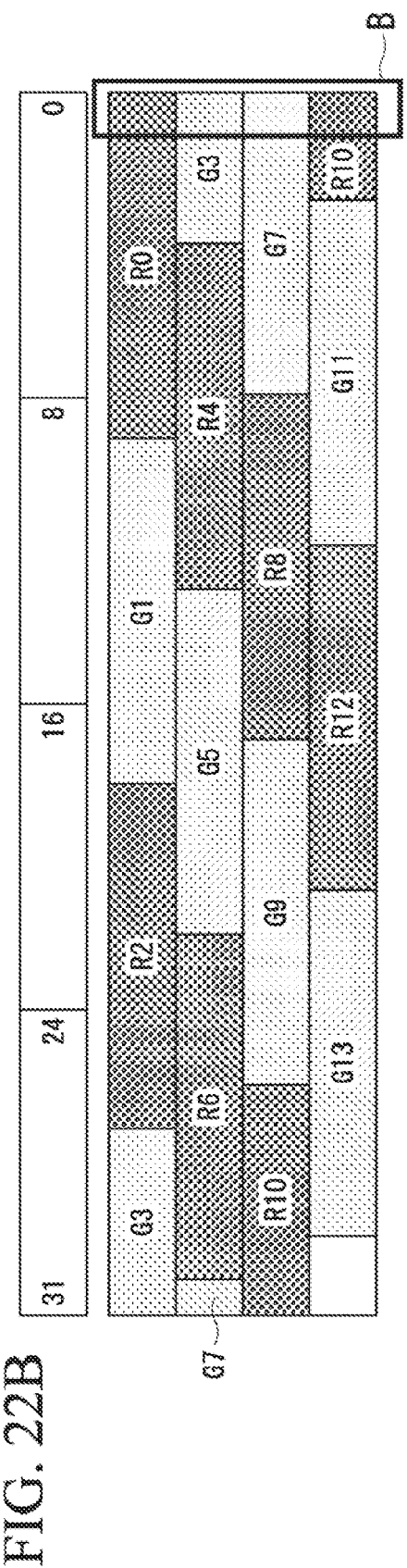
FIG. 22B is a diagram showing an example of the state of the data arrangement in the conventional data packing method.
Figure 23:
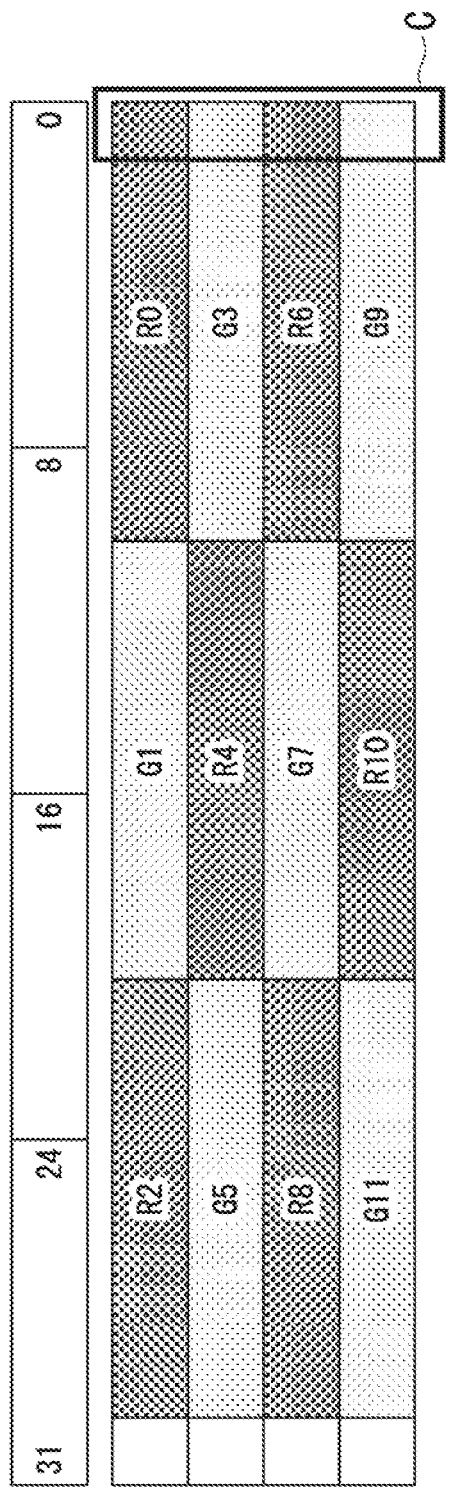
FIG. 23 is a diagram showing another example of a state of a data arrangement in a conventional data packing method.

Next, the data inverse-conversion unit of the third configuration will be described. FIG. 13 is a block diagram showing a schematic configuration of a data inverse-conversion unit 58 of the third configuration included in the imaging apparatus 1 of the present embodiment.

The data inverse-conversion unit 58 shown in FIG. 13 is included in the imaging apparatus 1 instead of the data inverse-conversion unit 52 of the first configuration or the data inverse-conversion unit 54 of the second configuration. Accordingly, the data inverse-conversion unit 58 may also be included in the imaging apparatus 1 instead of the data inverse-conversion unit 62.

As shown in FIG. 13, the data inverse-conversion unit 58 includes a bit division unit 581, four bit restoring units 582a to 582d (hereinafter referred to as "bit restoring unit 582" when indicating any one of the bit restoring units 582a to 582d), and a function selection unit 583.

Hereinafter, a case in which packed data of one burst in which four transfers constitute a packing unit, which is packed by the data conversion unit 47, is input to the data inverse-conversion unit 58 via the input DMA unit 56 and restored to the Bayer data shown in FIG. 19, similar to the first and second configurations, will be described. Accordingly, a description will be given on the assumption that a bit number of each pixel data in the Bayer data is 10 and a memory bus width is 32 bit.

The data inverse-conversion unit 58 restores data arranged in each bit of 32-bit packed data sequentially input from the input DMA unit 56 to 10-bit pixel data restored to original image data (Bayer data) which is image-processed by the image processing unit 50 using a method reverse to any of the prescribed packing methods as described above. The data inverse-conversion unit 58, for example, sequentially outputs the original pixel data restored based on a data enable signal (not shown) input from the image processing unit 50. The data enable signal is a signal indicating timing to output to the image processing unit 50.

Further, inversion cases (inversion cases a to d) having the same inversion process application range as the inversion cases when the data conversion unit 47 shown in FIG. 12 inversion-processes the pixel data are set in advance in the data inverse-conversion unit 58.

When the data inverse-conversion unit 58 restores pixel data, the data inverse-conversion unit 58 first sequentially splits (unpacks) respective data (since this data is the same as the selected pixel data generated by the data conversion unit 47, the data will be hereinafter described as "selected pixel data") from input 32-bit packed data (this packed data is the same as the packed data generated by the data conversion unit 47) using a method reverse to the packing method in the data conversion unit 47.

Then, the data inverse-conversion unit 58 inverts the selected pixel data using a method reverse to the inversion process performed on the pixel data by the data conversion unit 47 based on the information (function selection bit) indicating the inversion case applied to the pixel data, which has been added to the unused bit present in the packing unit (four transfers), and generates each pixel data. More specifically, the data inverse-conversion unit 58 selects an inversion case corresponding to the inversion case selected by the data conversion unit 47 based on the function selection bit. The data inverse-conversion unit 58 performs an inversion process according to the selected inversion case (inversion process application range) on the selected pixel data and restores the original pixel data.

Each time the packed data is input from the input DMA unit 56, the data inverse-conversion unit 58 splits the packed data into selected pixel data, and sequentially performs the inversion process on the split selected pixel data, as described above. However, the data inverse-conversion unit 58, for example, may include a memory unit for temporarily storing 32-bit packed data for one burst, that is, the packing unit (four transfers). In this case, the packed data input from the input DMA unit 56 is temporarily stored in the memory unit, and split of the selected pixel data from the respective stored packed data and the inversion process based on the information when the selected pixel data is generated are performed.

Alternatively, the packed data input from the input DMA unit 56 may be first split into the same packed data as the selected pixel data (inverted pixel data) and the information when the packed data is selected (the information indicating the inversion process range applied to the packed data), restored to original packed data, and then split (unpacked) into respective pixel data arranged in the original packed data. In this case, the packed data input from the input DMA unit 56 is treated as the selected pixel data (inverted pixel data) and processed.

As described above, the data inverse-conversion unit 58 splits the selected pixel data from the 32-bit packed data input from the input DMA unit 56 and performs the inversion process on the split selected pixel data to generate original pixel data. However, for convenience of a description, a case in which 10-bit packed data to which the 2-bit function selection bit indicating the inversion process range applied to the pixel data has been added is input from the input DMA unit 56 to the data inverse-conversion unit 58, and an inversion process in the same range as the application range of the inversion process performed on the pixel data in the data conversion unit 47, which is indicated by the function selection bit, is performed on the selected pixel data split from the packed data to generate original pixel data will be hereinafter described. That is, a case in which the data inverse-conversion unit 58 restores one pixel data from the packed data in which one selected pixel data has been packed will be described.

Hereinafter, in order to distinguish 32-bit packed data and 10-bit packed data, the 10-bit packed data is hereinafter represented as input data DIN [9:0], similar to the data inverse-conversion unit 52 of the first configuration and the data inverse-conversion unit 54 of the second configuration. In order to distinguish between 10-bit pixel data and 8-bit pixel data, the 8-bit pixel data is hereinafter referred to as output data DOUT [7:0]. Hereinafter, when bit of the input data DIN or the output data DOUT are not specified. That is, an entire bit range of the input data DIN or the output data DOUT is indicated, numbers in "[ ]: brackets" indicating a bit range of the data will be omitted.

Hereinafter, a case in which a function selection bit that is information indicating the inversion case applied to the pixel data is added in 2 bit (input data DIN [9:8]) from the most significant bit of the 10-bit packed data, and the selected pixel data is inversion-processed according to the inversion process application range indicated by the function selection bit to restore original pixel data will be described.

The bit division unit 581 divides the input 10-bit input data DIN [9:0] into 2-bit input data DIN [9:8] from the most significant bit, that is, the function selection bit, and input data DIN [7:0], that is, the selected pixel data. The bit division unit 581 outputs the divided selected pixel data to the bit restoring units 582*a* to 582*d*. The bit division unit 581 outputs the divided function selection bit to the function selection unit 583. The selected pixel data is the same as any one of the inverted pixel data a to d generated by the bit inversion unit 471 in the data conversion unit 47.

Each of the bit restoring units 582*a* to 582*d* inversion-processes values of bit of the input selected pixel data [7:0], for each bit, according to the same inversion process application range as that shown in FIG. 12, which is set in advance, to generate inverted output data. Each of the bit restoring units 582*a* to 582*d* outputs the generated inverted output data to the function selection unit 583.

The bit restoring units 582*a* to 582*d* correspond to inversion cases a to d shown in FIG. 12, respectively. Hereinafter, in order to distinguish the inverted output data generated by the bit restoring units 582*a* to 582*d*, the last characters of reference characters given to the bit restoring units 582*a* to 582*d* are given to the inverted output data, which will be referred to as "inverted output data a," "inverted output data b," "inverted output data c," and "inverted output data d".

Here, respective processes of the bit restoring units 582*a* to 582*d* will be described in greater detail. The inversion process in the bit restoring unit 582*a* is inversion case a, that is, "no inversion." The bit restoring unit 582*a* outputs the inverted output data a [7:0] in which a value of each bit of the selected pixel data [7:0] are left as it is. The inversion process in the bit restoring unit 582*b* is inversion case b, that is, "lower 2-bit inversion." The bit restoring unit 582*b* outputs the inverted output data b [7:0] in which values of 2 lower bit (selected pixel data [1:0]) of the selected pixel data [7:0] are inverted and values of other bit (selected pixel data [7:2]) are left as they are. The inversion process in the bit restoring unit 582*c* is inversion case c, that is, "lower 4-bit inversion." The bit restoring unit 582*c* outputs the inverted output data c [7:0] in which values of 4 lower bit (selected pixel data [3:0]) of the selected pixel data [7:0] are inverted and values of other bit (selected pixel data [7:4]) are left as they are. The inversion process in the bit restoring unit 582*d* is inversion case d, that is, "all-bit inversion." The bit restoring unit 582*d* outputs the resultant inverted output data d [7:0] in which the values of all bit of selected pixel data [7:0] are inverted.

The function selection unit 583 selects any one of the inverted output data a to d input from the bit restoring units 582a to 582d according to the function selection bit input from the bit division unit 581. The function selection unit 583 outputs the selected inverted output data as output data DOUT [7:0]. The output data DOUT output here is output as the original pixel data restored by the data inverse-conversion unit 58, that is, input to the data conversion unit 47, to the image processing unit 50.

As described above, in the data conversion unit 47 of the third configuration, the number of ranges of bit of the pixel data to be subjected to the inversion process is set to the number of a plurality of prescribed inversion process application ranges. The data conversion unit 47 generates a plurality of inverted pixel data according to the inversion process application ranges, and selects and outputs the inverted pixel data in which the bit change number is smallest. Accordingly, there is a case in which a change amount of respective bit of the memory bus in burst transfer is small.

Since a plurality of ranges of bit of the image data to be subjected to the inversion process are set, a plurality of information indicating the ranges of bit subjected to the inversion process is necessary. However, in the data conversion unit 47 of the third configuration, the number of bit used for the information indicating the inversion process application range is reduced by being set a prescribed number of the ranges of bit to be subjected to the inversion process (inversion process application ranges). Accordingly, a percentage of bit used for the information indicating the inversion process application range in the packed data is reduced, thus suppressing degradation of efficiency of the burst transfer and suppressing easy increase in a circuit scale related to selection of the inversion process application range.

Further, setting of the prescribed plurality of inversion process application ranges as the number of ranges of bit of the pixel data to be subjected to the inversion process is an effective method since information indicating the necessary inversion process application ranges can be added even when the bit number of unused bit contained in the packed data is small.

The case in which the inversion case in which the inversion process application range is set to the range of all the bit of the pixel data is also set in the data conversion unit 47 of the third configuration has been described. However, setting of the inversion process application range is not limited to the setting in the data conversion unit 47 of the third configuration. For example, the inversion process application range may be set in a range of lower pixel data in which the data correlation is low (the data change frequency is high). In this case, a change amount of bit is expected to be small in the lower pixel data.

Further, in the data conversion unit 47 of the third configuration, for example, the same function as that of the code conversion unit 431 included in the data conversion unit 43 of the second configuration may be applied for data output as it is without being inverted. For example, the function of the data conversion unit 47 of the third configuration may be applied to the lower pixel data in which the data correlation is low (the data change frequency is high), and the same function as that of the code conversion unit 431 included in the data conversion unit 43 of the second configuration may be applied to the upper pixel data in which the data correlation is high (the data change frequency is low). In this case, an effect of reduction of the data change amount by the gray code can also be obtained, in addition to the effect of the data conversion unit 47 of the third configuration.

While the data processing apparatus and the data processing method in which the packing method and the inversion processing method of the present embodiment have been applied to the Bayer data have been described in the embodiment described above. However, the packing method and the inversion processing method of the present embodiment are not limited to the application to the Bayer data and may be applied to several types of image data, such as RGB data, YCbCr data having YC422 or YC444 dot sequential format, and OSD data. Further, the packing method and the inversion processing method of the present embodiment are not limited to the application to the image data and may be applied to data having other formats, such as audio data.

<Application Example>

Next, an example in which the packing method of the present embodiment is applied to image data having other formats or data other than the image data will be described. Since a case in which the inversion processing method of the present embodiment is applied to the image data having other formats or data other than the image data may be considered to be the same as the above-described inversion processing method, a detailed description thereof will be omitted.

First, an example in which the packing method of the present embodiment is applied to RGB data will be described. FIGS. 14A and 14B are diagrams showing an example in which the data arranging method (packing method) in the data conversion unit 41 included in the imaging apparatus 1 of the present embodiment is applied to other image data (RGB data). An example of packed data in which, for 10-bit RGB data, each bit of pixel data is arranged using a conventional burst unit-based data arranging method (packing method) (see FIG. 14(A)) and an example of an arrangement of data in packed data in which an inversion bit for the pixel data in the packed data has been added using the packing method of the embodiment (see FIG. 14(B)) are shown in FIGS. 14A and 14B, respectively.

When inversion-processed pixel data is arranged in the same arrangement as that of pixel data in packed data in which the RGB data (10 bit×3 colors=30 bit) is simply arranged as shown in FIG. 14A, the data conversion unit 41 collects and inversion-processes lower bit of respective pixel data to be arranged in a memory bus of one transfer. As shown in FIG. 14B, upper bit of the pixel data and inversion-processed lower bit of the pixel data are arranged in the memory bus of one transfer. Further, an inversion bit indicating information when the lower bit of the pixel data are inversion-processed is added in an unused bit present in the memory bus of one transfer to generate final data of one transfer. Accordingly, a change amount of respective bit of the memory bus between two continuous transfers in the burst transfer is reduced.

In the example of FIGS. 14A and 14B, since three pixel data are contained in each data of one transfer, the data conversion unit 41 treats the three pixel data as one data. More specifically, for example, in the first transfer, lower 4 bit of respective pixel data (bit [3] to [0] of "R0," bit [3] to [0] of "G0," and bit [3] to [0] of "B0") are collected as lower pixel data [11:0] to be inversion-processed.

Then, the inversion-processed lower pixel data [11:0] is split into the respective pixel data, coupled to 6 upper bit of the respective pixel data (bit [9] to [4] of "R0," bit [9] to [4] of "G0," and bit [9] to [4] of "B0"), and arranged in the memory bus of one transfer. Further, an inversion bit corresponding to the lower pixel data [11:0] is arranged in bit [30] of the memory bus. Bit [31] of the memory bus remains as an unused bit. Accordingly, a change amount of the respective bit of the four packed data can be reduced and power consumption due to image data transfer can be reduced.

FIGS. 15A to 15C are diagrams showing an example in which the data arranging method (packing method) in the data conversion unit 41 included in the imaging apparatus 1 of the present embodiment is applied to other image data (YCbCr data). An example of packed data in which, for 9-bit Y data and 6-bit Cb and Cr data as shown in FIG. 15A, each bit of pixel data is arranged using the conventional burst unit-based data arranging method (packing method) (see FIG. 15B) and an example of an arrangement of data in the packed data in which an inversion bit for the pixel data in the packed data has been added using the packing method of the embodiment (see FIG. 15C) are shown in FIGS. 15A to 15C.

When the inversion-processed pixel data is arranged in the same arrangement as that of the pixel data in the packed data in which the YCbCr data is simply arranged as shown in FIG. 15B, the data conversion unit 41 collects and inversion-processes lower bit of respective pixel data to be arranged in the memory bus of one transfer. As shown in FIG. 15C, upper bit of the pixel data and the inversion-processed lower bit of the pixel data are arranged in the memory bus of one transfer. Further, an inversion bit indicating information when the lower bit of the pixel data are inversion-processed is added in an unused bit present in the memory bus of one transfer to generate final data of one transfer. Accordingly, a change amount of respective bit of the memory bus between two continuous transfers in the burst transfer is reduced.

In the example of FIGS. 15A to 15C, since four pixel data are contained in each data of one transfer, the data conversion unit 41 treats the four pixel data as one data. More specifically, for example, in the first transfer, 4 lower bit of Y data and 2 lower bit of Cb and Cr data (bit [3] to [0] of "Y0," bit [3] to [0] of "Y1," bit [1] to [0] of "Cb0," and bit [1] to [0] of "Cr0") are collected as lower pixel data [11:0] to be inversion-processed. Then, the inversion-processed lower pixel data [11:0] is split into the respective pixel data, coupled to 5 upper bit of the Y data (bit [8] to [4] of "Y0" and bit [8] to [4] of "Y1") and 4 upper bit of the Cb and Cr data (bit [5] to [2] of "Cb0" and bit [5] to [2] of "Cr0"), and arranged in the memory bus of one transfer.

In the example of FIGS. 15A to 15C, an example in which, when the respective pixel data is arranged in the memory bus as shown in FIG. 15C, the upper image data and the lower image data are divided and arranged on the memory bus so that positions of bit of adjacent pixel data with the same color arranged on the memory bus are the same is shown.

Further, the inversion bit corresponding to the lower pixel data [11:0] is arranged in bit [30] of the memory bus. Bit [31] of the memory bus remains as an unused bit. Accordingly, a change amount of the respective bit of the four packed data can be reduced and power consumption due to image data transfer can be reduced.

FIGS. 16A and 16B are diagrams showing an example in which the data arranging method (packing method) in the data conversion unit 41 included in the imaging apparatus 1 of the present embodiment is applied to other image data (OSD data). An example of packed data in which, for 6-bit OSD data, each bit of pixel data is arranged using the conventional burst unit-based data arranging method (packing method) (see FIG. 16A) and an example of an arrangement of the data in the packed data in which an inversion bit for the pixel data in the packed data has been added using the packing method of the embodiment (see FIG. 16B) are shown in FIGS. 16A and 16B, respectively.

When inversion-processed pixel data is arranged in the same arrangement as that of the pixel data in the packed data in which the OSD data is simply arranged as shown in FIG. 16A, the data conversion unit 41 collects and inversion-processes lower bit of the respective pixel data to be arranged in the memory bus of one transfer. As shown in FIG. 16B, upper bit of the pixel data and the inversion-processed lower bit of the pixel data are arranged in the memory bus of one transfer.

Further, an inversion bit indicating information when the lower bit of the pixel data are inversion-processed is added in an unused bit present in the memory bus of one transfer to generate final data of one transfer. Accordingly, a change amount of respective bit of the memory bus between two continuous transfers in the burst transfer is reduced.

In the example of FIGS. 16A and 16B, since five OSD data are contained in each data of one transfer, the data conversion unit 41 treats the five OSD data as one data. More specifically, for example, in the first transfer, 2 lower bit of the respective OSD data (bit [1] and [0] of "OSD0" to "OSD4") are collected as lower OSD data [9:0] to be inversion-processed. Then, the inversion-processed lower OSD data [9:0] is split into respective OSD data, coupled to 4 upper bit of the respective OSD data (bit [5] to [2] of "OSD0" to "OSD4"), and arranged in the memory bus of one transfer. Further, an inversion bit corresponding to the lower OSD data [9:0] is arranged in bit [31] of the memory bus. Bit [30] of the memory bus remains as an unused bit. Accordingly, a change amount of the respective bit of the four packed data can be reduced and power consumption due to image data transfer can be reduced.

As can be seen from FIG. 16B, the inversion bit is arranged on everywhere position as long as the bit is an unused bit. In the example of FIG. 16B, the example in which the inversion bit is arranged in bit [31] of the memory bus is shown.

FIGS. 17A and 17B are diagrams showing an example in which the data arranging method (packing method) in the data conversion unit 41 included in the imaging apparatus 1 of the present embodiment is applied to other data (audio data). Cases in which 24-bit R (right) data and L (left) data are applied to a 64-bit memory bus are shown in FIGS. 17A and 17B, respectively. In FIG. 17A, an example of packed data in which each bit of audio data is arranged using the conventional burst unit-based data arranging method (packing method) is shown. In FIG. 17B, an example of an arrangement of data in packed data in which an inversion bit for audio data in the packed data has been added using the packing method of the embodiment is shown. In FIGS. 17A and 17B, a case in which 24-bit R (right) data and L (left) data are discontinuously arranged in the memory bus is shown.

When inversion-processed audio data is arranged in the same arrangement as that of audio data in packed data in which the audio data is simply arranged as shown in FIG. 17A, the data conversion unit 41 collects and inversion-processes the lower bit of the respective audio data arranged in the memory bus of one transfer. As shown in FIG. 17B, upper bit of the audio data and the inversion-processed lower bit of the audio data are arranged in the memory bus of one transfer. Further, an inversion bit indicating information when the lower bit of the audio data are inversion-processed is added in an unused bit present in the memory bus of one transfer to generate final data of one transfer. Accordingly, a change amount of respective bit of the memory bus between two continuous transfers in the burst transfer is reduced.

In the example of FIGS. 17A and 17B, the R (right) data and the L (left) data are divided and arranged in each data of one transfer. However, there are a total of two audio data on the memory bus. The data conversion unit 41 treats the two audio data as one data. More specifically, for example, in the first transfer, 8 lower bit of the respective audio data (bit [7] to [0] of "R0" and bit [7] to [0] of "L0") are collected as lower audio data [15:0] to be inversion-processed. Then, the inversion-processed lower audio data [15:0] is divided into the respective audio data, coupled to 16 upper bit of the respective audio data (bit [23] to [8] of "R0" and bit [23] to [8] of "L0"), and arranged in the memory bus of one transfer. Further, an inversion bit corresponding to the lower audio data [15:0] is arranged in an unused bit on the memory bus. Accordingly, a change amount of the respective bit of the four packed data can be reduced and power consumption due to transfer of audio data can be reduced.

As can be seen from FIG. 17B, the inversion bit is arranged on everywhere position as long as the bit is an unused bit. In the example of FIG. 17B, an example in which the inversion bit corresponding to the R (right) data is arranged in bit [24] of the memory bus is shown. Further, an example in which the inversion bit corresponding to the L (left) data is arranged in bit [59] to [56] of the memory bus of the fourth transfer is shown. Thus, the inversion bit may be arranged in the memory bus for each transfer or a plurality of inversion bit may be collected and arranged in a prescribed memory bus of one transfer.

As described above, according to the embodiment of the present invention, data to be transferred is split in a prescribed bit range based also on the data correlation. A value of each bit of data in which the correlation is low (the change frequency is high) and a value of a previously transferred corresponding bit are compared for each bit, and when the number of changing bit is great, the inversion process is performed on the data. Also, the information when the inversion process is performed is added in the unused bit of the packed data and then output. Accordingly, data in which a change amount of respective bit is small can be arranged in the memory bus. In addition, the change amount of respective bit of the memory bus between two continuous transfers in the burst transfer can be reduced, and the packed data can be easily restored. Moreover, data transfer efficiency can be maintained to be the same as existing data transfer efficiency. Accordingly, the effect of reduction of power consumption due to data delivery between each component (processing block) and the memory in the imaging apparatus can be sufficiently obtained.

Further, in the embodiment of the present invention, the inversion process is not performed on all bit of the data, but a prescribed range of some bit based on the data correlation. The inversion process is performed on bit of the data in which the correlation is low (the change frequency is high). Accordingly, a greater effect of reduction of the data change amount by the inversion process can be obtained. Further, an effect of reduction of a circuit scale according to the inversion process can also be obtained.

Furthermore, according to the embodiment of the present invention, a plurality of bit ranges to which the inversion process is applied can be set, and the inversion-processed data in which the bit change number is smallest can be selected from among a plurality of inversion-processed data according to the respective inversion process application ranges and then output. Accordingly, it is possible to efficiently reduce the change amount of respective bit of the memory bus in the burst transfer. The number of set of bit ranges to which the inversion process is applied is determined as a prescribed number. Accordingly, it is possible to suppress an increase in the number of bit used for the information indicating the inversion process application ranges and in a percentage of bit in the packed data used for the information indicating the inversion process application ranges as the number of set bit ranges increases. It is also possible to suppress an increase in a circuit scale according to the inversion process and the selection of the inversion-processed data as the number of set bit ranges increases. Accordingly, it is possible to suppress degradation of data transfer efficiency.

Further, according to the embodiment of the present invention, the data in which the correlation is high (the change frequency is low) is represented using the gray code, which is a different process from the inversion process performed on data in which the correlation is low (the change frequency is high). Accordingly, it is possible to efficiently reduce the bit change amount according to the data correlation.

While the case in which the information (the inversion bit) for switching (selecting) the inversion-processed data is obtained from the result of the comparison of a value of each bit of previously output data with a value of each bit of currently input data has been described in the present embodiment, the method of obtaining the inversion bit is not limited to the embodiment of the present invention.

For example, the current inversion bit may be obtained from the result of the comparison of a value of each bit of previously input data with a value of each bit of currently input data and then compared with a previous inversion bit to generate a final current inversion bitimilar to the technique disclosed in Japanese Unexamined Patent Application, First Publication No. 2000-148605.

While the case in which four transfers form a burst transfer unit and one burst is a data packing unit has been described in the present embodiment, the number of transfers in one burst transfer and the data packing unit are not limited to the embodiment of the present invention. For example, 64 transfers may constitute the burst transfer unit and 16 transfers in one burst may be the data packing unit, that is, four packing units may be included in one burst. Alternatively, for example, 16 transfers may constitute the data packing unit and eight transfers may form the burst transfer unit, that is, the packing unit may include two burst transfers.

While the case in which the packing method when data delivery between components in the imaging apparatus is performed is applied to some data has been described in the present embodiment, an application range of the packing method of the present embodiment is not limited to the embodiment of the present invention, and the packing method may be applied to any system in which data delivery is performed between components.

While the example in which the data conversion unit is arranged as a preceding processing block of the output DMA unit and the data inverse-conversion unit is arranged as a subsequent processing block of the input DMA unit has been described in the present embodiment, the arrangements of the data conversion unit and the data inverse-conversion unit are not limited to the embodiment of the present invention. For example, the data conversion unit may be a component of the output DMA unit and the data inverse-conversion unit may be a component of the input DMA unit. Furthermore, for example, the data conversion unit may be a component of a preceding imaging processing unit and the data inverse-conversion unit may be a component of a subsequent image processing unit.

While the embodiment of the present invention has been described above with reference to the drawings, a concrete configuration is not limited to this embodiment and various variations without departing from the scope and spirit of the present invention fall within the present invention. The present invention is not limited by the descriptions above, but is limited only by the appended claims.

What is claimed is:

1. A data processing apparatus comprising:
a data conversion unit for, when converting a plurality of sequentially input data into transfer data of the same bit number as a data bus having a prescribed bit number and sequentially transferring the transfer data, arranging the input data in each transfer data in a conversion unit using one transfer data as one transfer unit and a prescribed number of transfer units as one conversion unit,
wherein the data conversion unit comprises:
a first bit division unit configured to divide the input data into a first divided data having a first prescribed bit number and a second divided data having a second prescribed bit number;
a bit comparison unit configured to compare a value of each bit in first output data according to the first divided data output at an n-th time (n is a natural number equal to or more than 1) from the data conversion unit with a value of each bit in the first divided data input at an (n+1)-th time to the data conversion unit, and outputs comparison information of the compared bit;
a bit determination unit configured to calculate a bit change number indicating the number of bit whose values are different based on the comparison information, determine whether the value of each bit of the first divided data input at the (n+1)-th time is to be inverted for each bit based on the calculated bit change number and a prescribed bit number, and output the determination result as inversion information;
a first bit inversion unit configured to output either first inverted data obtained by inverting values of bit of the first divided data input at the (n+1)-th time for each bit or the first divided data input at the (n+1)-th time as first inversion-processed data based on the inversion information; and
a first bit coupling unit configured to generate first transfer data in which each bit of the first inversion-processed data and each bit of the second divided data are arranged in respective bit of the data bus, to couple generates coupling data, which the inversion information is coupled, at a position of a prescribed unused bit of the first transfer data containing unused bit in which data has not been arranged among the first transfer data in the conversion unit to when the first transfer data is output as the transfer data, and to output either the first transfer data or the coupling data as the transfer data in the data conversion unit.

2. The data processing apparatus according to claim 1, wherein:
the bit determination unit
determines that the values of bit of the first divided data input at the (n+1)-th time are to be inverted for each bit if the bit change number occupies a majority of the bit number of the first divided data, and
determines that the values of bit of the first divided data input at the (n+1)-th time are not to be inverted for each bit if the bit change number is equal to or less than half of the bit number of the first divided data.

3. The data processing apparatus according to claim 2, wherein:
the bit determination unit makes the determination as to whether that the values of bit of the first divided data input at the (n+1)-th time are to be inverted for each bit to be the same in result as a determination made for the first divided data input at the n-th time is obtained, if the bit change number is half of the bit number of the first divided data.

4. The data processing apparatus according to claim 3, wherein:
the data conversion unit further comprises a first code conversion unit which represents the second divided data in gray code in which only one bit is changed when a data change is 1, and
the first bit coupling unit generates the first transfer data in which each bit of the first inversion-processed data and each bit of the second divided data represented in the gray code are arranged in respective bit of the data bus.

5. The data processing apparatus according to claim 1, wherein:
the first bit division unit collects the respective first divided data of the plurality of input data arranged in the same transfer unit to obtain one first divided data,
the bit comparison unit compares values of respective bit in a unit of the first collected divided data,
the bit determination unit determines whether values of respective bit are to be inverted for each bit in a unit of the first collected divided data,
the first bit inversion unit outputs the first inversion-processed data of the unit of the first collected divided data, and
the first bit coupling unit arranges each bit of the first inversion-processed data in a unit of the collected data and each bit of the respective second divided data, in respective bit of the data bus, and couples the inversion information determined in a unit of the collected data.

6. A data processing apparatus comprising:
a data conversion unit which arranges the input data in each transfer data in a conversion unit using one transfer data as one transfer unit and a prescribed number of transfer units as one conversion unit, when converting a plurality of sequentially input data into transfer data of the same bit number as a data bus having a prescribed bit number and sequentially transferring the transfer data,
wherein, in the data conversion unit,
a first bit position and a second bit position in which values of bit of the input data are inverted for each bit are prescribed,
the data conversion unit includes:
a first bit inversion unit generates first inverted data in which values of bit in the first bit position is inverted for each bit, and second inverted data in which values of bit in the second bit position is inverted for each bit in the input data;
a first data selection unit selects either the first inverted data or the second inverted data and outputs the selected data as selection data;
a bit comparison unit compares a value of each bit in first output data according to the selected data output at the n-th time (n is a natural number equal to or more than 1) from the data conversion unit with a value of each bit of the first inverted data or the second inverted data of the (n+1)-th time according to the input data input at the (n+1)-th time to the data conversion unit, and outputs respective comparison information of the compared bit as first comparison information detected corresponding to the first inverted data and second comparison information detected corresponding to the second inverted data;
a bit change number calculation unit calculates a first bit change number indicating the number of bit whose values are different based on the first comparison information, and calculates a second bit change number indicating the number of bit whose values are different based on the second comparison information;

a data determination unit determines whether the first inverted data or the second inverted data of the (n+1)-th time is to be output based on the first bit change number and the second bit change number, and outputs the determination result as inversion information; and a first bit coupling unit generates coupling data, which the inversion information is coupled, at a position of a prescribed unused bit of the selection data containing unused bit in which data has not been arranged among the selection data in the conversion unit, and outputs either the selection data or the coupling data as the transfer data in the data conversion unit when the selection data is output as the transfer data, and the first data selection unit selects either the first inverted data or the second inverted data of the (n+1)-th time based on the inversion information, and outputs the selected inverted data as (n+1)-th selection data.

7. The data processing apparatus according to claim 6, wherein:
the first bit inversion unit
inverts the values of bit in the first bit position of the input data for each bit and generates first inverted data in which data of bit in a position other than the first bit position is represented in gray code in which only one bit is necessarily changed when a data change is 1, and
inverts the values of bit in the second bit position for each bit and generates second inverted data in which data of bit in a position other than the second bit position is represented in the gray code to generate second inverted data.

8. The data processing apparatus according to claim 6, wherein:
the first bit inversion unit obtain the input data collecting the plurality of input data arranged in the same transfer unit,
the first data selection unit selects either the first inverted data or the second inverted data according to the collected input data,
the bit comparison unit compares the values of the respective bit in a unit of the collected selection data,
the bit change number calculation unit calculates the number of bit whose values are different in a unit of the collected selection data,
the data determination unit determines whether the first inverted data or the second inverted data is to be output in a unit of the collected selection data, and
the first bit coupling unit couples the inversion information determined in the unit of the collected data when the selection data of the collected data unit is output as the transfer data.

9. A data processing apparatus comprising:
a data inverse-conversion unit configured to convert a plurality of input data into transfer data having the same bit number as a data bus having a prescribed bit number, and sequentially inverse-converts transfer data sequentially transferred in a unit of conversion unit using one transfer data as one transfer unit and a prescribed number of transfer units as one conversion unit to restore the plurality of original input data,
wherein the data inverse-conversion unit comprises:
a second bit division unit where
a data processing apparatus of a transfer source of the transfer data divides the input data as the transfer data into a first prescribed bit number of first divided data and a second prescribed bit number of second divided data; the first inverted data obtained by inverting values of bit of the first divided data for each bit or the first divided data being the first inversion-processed data;
the first transfer data in which each bit of the second divided data and each bit of the first inversion-processed data being arranged in respective bit of the data bus, and the inversion information indicating whether the first inverted data or the first divided data has been selected as the first inversion-processed data are input from the data bus to the second bit inversion unit as the transfer data from the data processing apparatus of the transfer source of the transfer data;
the transfer data is divided into the inversion information coupled in a position of a prescribed bit of either of the transfer data and the first transfer data, and
the first transfer data is divided into the second divided data and the first inversion-processed data,
a second bit inversion unit outputs either second inverted data obtained by inverting values of bit of the first inversion-processed data for each bit or the first inversion-processed data as the first divided data based on the inversion information, and
a second bit coupling unit couples the first divided data and the second divided data to restore the original input data.

10. The data processing apparatus according to claim 9, wherein
the data inverse-conversion unit further comprises a second code conversion unit configured to restore the second divided data from gray code back to binary code, and
the second bit coupling unit couples the first divided data and the second divided data represented back in the binary code to restore the original input data.

11. The data processing apparatus according to claim 9, wherein:
for the transfer data, the respective first divided data of the plurality of input data arranged in the same transfer unit is collected and processed as one first divided data,
the second bit division unit divides the first inversion-processed data including the first divided data of the collected data unit from the first transfer data,
the second bit inversion unit outputs the first divided data of the collected data unit from the first inversion-processed data, and
the second bit coupling unit divides the first divided data of the collected data unit into the respective first divided data, and couples the first divided data and the corresponding second divided data to restore the original input data.

12. A data processing apparatus comprising:
a data inverse-conversion unit configured to convert a plurality of input data into transfer data having the same bit number as a data bus having a prescribed bit number, and sequentially inverse-convert transfer data sequentially transfered in each conversion unit using one transfer data as one transfer unit and a prescribed number of transfer units as one conversion unit to restore the plurality of original input data,
wherein, in the data inverse-conversion unit,
the same setting as setting of a first bit position and a second bit position in which values of bit of the input data are inverted for each bit when a data processing apparatus of a transfer source for the transfer data outputs the transfer data in the conversion unit is prescribed, and
the data inverse-conversion unit comprises:
a second bit division unit where the data processing apparatus of the transfer source for the transfer data generates first inverted data obtained by inverting values of bit in the first bit position of the input data for each bit and second inverted data obtained by inverting values of bit in the second bit position for each bit based on the first bit position as the transfer data, based on the first bit position and the second bit position set in the data processing apparatus of the transfer source for the transfer data;

either the first inverted data or the second inverted data being the selection data;

the selection data and the inversion information indicating whether the first inverted data or the second inverted data has been selected as the selection data are input from the data bus as the transfer data from the data processing apparatus of the transfer source for the transfer data; and the transfer data is divided into the inversion information coupled in a position of a prescribed bit of either of the transfer data and the first transfer data, a second bit inversion unit configured to restore the input selection data to the first inverted data obtained by inverting values of bit in the first bit position of the input data for each bit and the second inverted data obtained by inverting values of bit in the second bit position for each bit; and a second data selection unit configured to select either the first inverted data or the second inverted data based on the inversion information, and outputting the selected data as the original input data restored by the data inverse-conversion unit.

13. The data processing apparatus according to claim 10, wherein:

the second bit inversion unit restores the first inverted data obtained by inverting values of bit in the first bit position of the selection data for each bit and representing data of bit in a position other than the first bit position from gray code back to binary code; and the second inverted data obtained by inverting values of bit in the second bit position of the selection data for each bit and representing data of bit in a position other than the second bit position from gray code back to binary code.

14. The data processing apparatus according to claim 12, wherein:

for the transfer data, the plurality of input data arranged in the same transfer unit is collected and processed as one selection data, the second bit division unit divides the selection data of the collected data unit from the transfer data, the second bit inversion unit restores the selection data of the collected data unit to the first inverted data of the collected data unit and the second inverted data of the collected data unit, and the second data selection unit selects the first inverted data of the collected data unit or the second inverted data of the collected data unit, then divides the selected data into respective original input data, and then outputs the respective original input data.

15. A data processing method comprising:

a data conversion step of, when converting a plurality of sequentially input data into transfer data of the same bit number as a data bus having a prescribed bit number and sequentially transferring the transfer data, arranging the input data in each transfer data in a conversion unit using one transfer data as one transfer unit and a prescribed number of transfer units as one conversion unit, wherein the data conversion step comprises:

a first bit division step of dividing the input data into first divided data having a first prescribed bit number and second divided data having a second prescribed bit number;

a bit comparison step of comparing a value of each bit in first output data according to the first divided data output at an n-th time (n is a natural number equal to or more than 1) in the data conversion step with a value of each bit in the first divided data input at an (n+1)-th time in the data conversion, and outputting comparison information for the compared bit;

a bit determination step of calculating a bit change number indicating the number of bit whose values are different based on the comparison information, determining whether the value of each bit of the first divided data input at the (n+1)-th time is to be inverted for each bit based on the calculated bit change number and a prescribed bit number, and outputting the determination result as inversion information;

a first bit inversion step of outputting either first inverted data obtained by inverting values of bit of the first divided data input at the (n+1)-th time for each bit or the first divided data input at the (n+1)-th time as first inversion-processed data based on the inversion information; and a first bit coupling step of generating first transfer data in which each bit of the first inversion-processed data and each bit of the second divided data are arranged in respective bit of the data bus, generating coupling data in which the inversion information is coupled at a position of a prescribed unused bit of the first transfer data containing unused bit in which data has not been arranged among the first transfer data in the conversion unit when the first transfer data is output as the transfer data, and outputting either the first transfer data or the coupling data as the transfer data in the data conversion step.

16. A data processing method comprising:

a data conversion step of, when converting a plurality of sequentially input data into transfer data of the same bit number as a data bus having a prescribed bit number and sequentially transferring the transfer data, arranging the input data in each transfer data in a conversion unit using one transfer data as one transfer unit and a prescribed number of transfer units as one conversion unit, wherein, in the data conversion step, a first bit position and a second bit position in which values of bit of the input data are inverted for each bit are prescribed, the data conversion step comprises:

a first bit inversion step of generating first inverted data by inverting values of bit in the first bit position of the input data for each bit and generating second inverted data by inverting values of bit in the second bit position of the input data for each bit to generate second inverted data;

a first data selection step of selecting either the first inverted data or the second inverted data and outputting the selected data as selection data;

a bit comparison step of comparing a value of each bit in first output data according to the selection data output at an n-th time (n is a natural number equal to or more than 1) in the data conversion step with a value of each bit of the first inverted data or the second inverted data of an (n+1)-th time according to the input data input at the (n+1)-th time in the data conversion step, and outputting respective comparison information for the compared bit as first comparison information detected corresponding to the first inverted data and second comparison information detected corresponding to the second inverted data, respectively;
a bit change number calculation step of calculating a first bit change number indicating the number of bit whose values are different based on the first comparison information, and calculating a second bit change number indicating the number of bit whose values are different based on the second comparison information;
a data determination step of determining whether the first inverted data or the second inverted data of the (n+1)-th time is to be output based on the first bit change number and the second bit change number and outputting the determination result as inversion information; and
a first bit coupling step of, when the selection data is output as the transfer data, generating coupling data, which the inversion information is coupled, at a position of a prescribed unused bit of the selection data containing unused bit in which data has not been arranged among the selection data in the conversion unit, and outputting either the selection data or the coupling data as the transfer data in the data conversion step, and
the first data selection step includes selecting either the first inverted data or the second inverted data of the (n+1)-th time based on the inversion information, and outputting the selected inverted data as (n+1)-th selection data.

17. A data processing method comprising:
a data inverse-conversion step of converting a plurality of input data into transfer data having the same bit number as a data bus having a prescribed bit number, and sequentially inverse-converting transfer data sequentially transferred in a unit of conversion unit using one transfer data as one transfer unit and a prescribed number of transfer units as one conversion unit to restore the plurality of original input data,
wherein the data inverse-conversion step comprises:
a second bit division step of
receiving first transfer data, which each bit of the second divided data and each bit of the first inversion-processed data being arranged in respective bit of the data bus, and inversion information, which indicates whether the first inverted data or the first divided data has been selected as the first inversion-processed data, are input from the data bus as the transfer data from a data processing apparatus of a transfer source,
dividing the transfer data into the inversion information coupled in a position of a prescribed bit of either of the transfer data and the first transfer data, and
dividing the first transfer data into the second divided data and the first inversion-processed data;
a second bit inversion step of outputting either second inverted data obtained by inverting values of bit of the first inversion-processed data for each bit or the first inversion-processed data as the first divided data based on the inversion information; and
a second bit coupling step of coupling the first divided data and the second divided data to restore the original input data.

18. A data processing method comprising:
a data inverse-conversion step of converting a plurality of input data into transfer data having the same bit number as a data bus having a prescribed bit number, and sequentially inverse-converting transfer data sequentially received in each conversion unit using one transfer data as one transfer unit and a prescribed number of transfer units as one conversion unit to restore the plurality of original input data,
wherein, in the data inverse-conversion step,
the same setting as setting of a first bit position and a second bit position in which values of bit of the input data are inverted for each bit when a data processing apparatus of a transfer source for the transfer data outputs the transfer data in the conversion unit is prescribed, and
the data inverse-conversion step comprises:
a second bit division step of
receiving selection data and inversion information as the transfer data from the data processing apparatus of the transfer source for the transfer data from the data bus, the data processing apparatus of the transfer source for the transfer data generating, as the transfer data, first inverted data obtained by inverting values of bit in the first bit position of the input data for each bit and second inverted data obtained by inverting values of bit in the second bit position for each bit based on the first bit position and the second bit position set in the data processing apparatus of the transfer source for the transfer data, either the first inverted data or the second inverted data being the selection data, and the inversion information indicating whether the first inverted data or the second inverted data has been selected as the selection data, and
dividing the transfer data into the inversion information coupled in a position of a prescribed bit of either of the transfer data and the first transfer data;
a second bit inversion step of restoring the input selection data to the first inverted data obtained by inverting values of bit in the first bit position of the input data for each bit and the second inverted data obtained by inverting values of bit in the second bit position for each bit; and
a second data selection step of selecting either the first inverted data or the second inverted data based on the inversion information, and outputting the selected data as the original input data restored by the data inverse-conversion unit.

* * * * *